US011354092B2

(12) United States Patent
D'Amato et al.

(10) Patent No.: US 11,354,092 B2
(45) Date of Patent: *Jun. 7, 2022

(54) NOISE CLASSIFICATION FOR EVENT DETECTION

(71) Applicant: Sonos, Inc., Santa Barbara, CA (US)

(72) Inventors: Nick D'Amato, Santa Barbara, CA (US); Kurt Thomas Soto, Ventura, CA (US); Connor Kristopher Smith, New Hudson, MI (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/247,736

(22) Filed: Dec. 21, 2020

(65) Prior Publication Data

US 2021/0216278 A1 Jul. 15, 2021

Related U.S. Application Data

(63) Continuation of application No. 16/528,016, filed on Jul. 31, 2019, now Pat. No. 10,871,943.

(51) Int. Cl.
*G06F 3/16* (2006.01)
*H04L 12/28* (2006.01)
(Continued)

(52) U.S. Cl.
CPC .............. *G06F 3/167* (2013.01); *G06F 3/162* (2013.01); *G06F 3/165* (2013.01); *G10L 15/22* (2013.01);
(Continued)

(58) Field of Classification Search
CPC . G06F 3/16; G06F 3/162; G06F 3/165; G06F 3/167; G10L 15/22; H04L 12/2801; H04R 3/12; H04R 2227/005
(Continued)

(56) References Cited

U.S. PATENT DOCUMENTS

| | | | |
|---|---|---|---|
| 4,741,038 | A | 4/1988 | Elko et al. |
| 4,941,187 | A | 7/1990 | Slater |

(Continued)

FOREIGN PATENT DOCUMENTS

| | | | |
|---|---|---|---|
| AU | 2017100486 | A4 | 6/2017 |
| AU | 2017100581 | A4 | 6/2017 |

(Continued)

OTHER PUBLICATIONS

US 9,299,346 B1, 03/2016, Hart et al. (withdrawn)

(Continued)

*Primary Examiner* — Xu Mei
(74) *Attorney, Agent, or Firm* — Fortem IP LLP; Matthew Lincicum

(57) ABSTRACT

In one aspect, a network microphone device includes a plurality of microphones and is configured to detect sound via the one or more microphones. The network microphone device may capture sound data based on the detected sound in a first buffer, and capture metadata associated with the detected sound in a second buffer. The network microphone device may classify one or more noises in the detected sound and cause the network microphone device to perform an action based on the classification of the respective one or more noises.

21 Claims, 18 Drawing Sheets

(51) Int. Cl.
*H04R 3/12* (2006.01)
*G10L 15/22* (2006.01)

(52) U.S. Cl.
CPC .......... *H04L 12/2809* (2013.01); *H04R 3/12* (2013.01); *H04R 2227/005* (2013.01)

(58) Field of Classification Search
USPC ............................... 381/56, 59, 110; 700/94
See application file for complete search history.

(56) References Cited

U.S. PATENT DOCUMENTS 4,974,213 A 11/1990 Siwecki
5,036,538 A 7/1991 Oken et al.
5,440,644 A 8/1995 Farinelli et al.
5,588,065 A 12/1996 Tanaka et al.
5,740,260 A 4/1998 Odom
5,761,320 A 6/1998 Farinelli et al.
5,923,902 A 7/1999 Inagaki
5,949,414 A 9/1999 Namikata et al.
6,032,202 A 2/2000 Lea et al.
6,088,459 A 7/2000 Hobelsberger
6,256,554 B1 7/2001 Dilorenzo
6,301,603 B1 10/2001 Maher et al.
6,311,157 B1 10/2001 Strong
6,366,886 B1 4/2002 Dragosh et al.
6,404,811 B1 6/2002 Cvetko et al.
6,408,078 B1 6/2002 Hobelsberger
6,469,633 B1 10/2002 Wachter et al.
6,522,886 B1 2/2003 Youngs et al.
6,594,347 B1 7/2003 Calder et al.
6,594,630 B1 7/2003 Zlokarnik et al.
6,611,537 B1 8/2003 Edens et al.
6,611,604 B1 8/2003 Irby et al.
6,631,410 B1 10/2003 Kowalski et al.
6,757,517 B2 6/2004 Chang
6,778,869 B2 8/2004 Champion
6,937,977 B2 8/2005 Gerson
7,099,821 B2 8/2006 Visser et al.
7,103,542 B2 9/2006 Doyle
7,130,608 B2 10/2006 Hollstrom et al.
7,130,616 B2 10/2006 Janik
7,143,939 B2 12/2006 Henzerling
7,174,299 B2 2/2007 Fujii et al.
7,228,275 B1 6/2007 Endo et al.
7,236,773 B2 6/2007 Thomas
7,295,548 B2 11/2007 Blank et al.
7,356,471 B2 4/2008 Ito et al.
7,383,297 B1 6/2008 Atsmon et al.
7,391,791 B2 6/2008 Balassanian et al.
7,483,538 B2 1/2009 McCarty et al.
7,571,014 B1 8/2009 Lambourne et al.
7,577,757 B2 8/2009 Carter et al.
7,630,501 B2 12/2009 Blank et al.
7,643,894 B2 1/2010 Braithwaite et al.
7,657,910 B1 2/2010 McAulay et al.
7,661,107 B1 2/2010 Van Dyke et al.
7,702,508 B2 4/2010 Bennett
7,792,311 B1 9/2010 Holmgren et al.
7,853,341 B2 12/2010 McCarty et al.
7,961,892 B2 6/2011 Fedigan
7,987,294 B2 7/2011 Bryce et al.
8,014,423 B2 9/2011 Thaler et al.
8,019,076 B1 9/2011 Lambert
8,032,383 B1 10/2011 Bhardwaj et al.
8,041,565 B1 10/2011 Bhardwaj et al.
8,045,952 B2 10/2011 Qureshey et al.
8,073,125 B2 12/2011 Zhang et al.
8,073,681 B2 12/2011 Baldwin et al.
8,103,009 B2 1/2012 McCarty et al.
8,136,040 B2 3/2012 Fleming
8,165,867 B1 4/2012 Fish
8,234,395 B2 7/2012 Millington
8,239,206 B1 8/2012 LeBeau et al.
8,255,224 B2 8/2012 Singleton et al.
8,284,982 B2 10/2012 Bailey
8,290,603 B1 10/2012 Lambourne
8,340,975 B1 12/2012 Rosenberger
8,364,481 B2 1/2013 Strope et al.
8,385,557 B2 2/2013 Tashev et al.
8,386,261 B2 2/2013 Mellott et al.
8,386,523 B2 2/2013 Mody et al.
8,423,893 B2 4/2013 Ramsay et al.
8,428,758 B2 4/2013 Naik et al.
8,453,058 B1 5/2013 Coccaro et al.
8,473,618 B2 6/2013 Spear et al.
8,483,853 B1 7/2013 Lambourne
8,484,025 B1 7/2013 Moreno et al.
8,588,849 B2 11/2013 Patterson et al.
8,600,443 B2 12/2013 Kawaguchi et al.
8,710,970 B2 4/2014 Oelrich et al.
8,738,925 B1 5/2014 Park et al.
8,775,191 B1 7/2014 Sharifi et al.
8,831,761 B2 9/2014 Kemp et al.
8,831,957 B2 9/2014 Taubman et al.
8,848,879 B1 9/2014 Coughlan et al.
8,861,756 B2 10/2014 Zhu et al.
8,874,448 B1 10/2014 Kauffmann et al.
8,938,394 B1 1/2015 Faaborg et al.
8,942,252 B2 1/2015 Balassanian et al.
8,983,383 B1 3/2015 Haskin
8,983,844 B1 3/2015 Thomas et al.
9,015,049 B2 4/2015 Baldwin et al.
9,042,556 B2 5/2015 Kallai et al.
9,060,224 B1 6/2015 List
9,094,539 B1 7/2015 Noble
9,098,467 B1 8/2015 Blanksteen et al.
9,124,650 B2 9/2015 Maharajh et al.
9,124,711 B2 9/2015 Park et al.
9,148,742 B1 9/2015 Koulomzin et al.
9,190,043 B2 11/2015 Krisch et al.
9,208,785 B2 12/2015 Ben-David et al.
9,215,545 B2 12/2015 Dublin et al.
9,245,527 B2 1/2016 Lindahl
9,251,793 B2 2/2016 Lebeau et al.
9,253,572 B2 2/2016 Beddingfield, Sr. et al.
9,262,612 B2 2/2016 Cheyer
9,263,042 B1 2/2016 Sharifi
9,275,637 B1 3/2016 Salvador et al.
9,288,597 B2 3/2016 Carlsson et al.
9,300,266 B2 3/2016 Grokop
9,304,736 B1 4/2016 Whiteley et al.
9,307,321 B1 4/2016 Unruh
9,318,107 B1 4/2016 Sharifi
9,319,816 B1 4/2016 Narayanan
9,324,322 B1 4/2016 Torok et al.
9,335,819 B1 5/2016 Jaeger et al.
9,361,878 B2 6/2016 Boukadakis
9,368,105 B1 6/2016 Freed et al.
9,373,329 B2 6/2016 Strope et al.
9,374,634 B2 6/2016 Macours
9,386,154 B2 7/2016 Baciu et al.
9,390,708 B1 7/2016 Hoffmeister
9,401,058 B2 7/2016 De La Fuente et al.
9,412,392 B2 8/2016 Lindahl et al.
9,426,567 B2 8/2016 Lee et al.
9,431,021 B1 8/2016 Scalise et al.
9,443,527 B1 9/2016 Watanabe et al.
9,472,201 B1 10/2016 Sleator
9,472,203 B1 10/2016 Ayrapetian et al.
9,484,030 B1 11/2016 Meaney et al.
9,489,948 B1 11/2016 Chu et al.
9,494,683 B1 11/2016 Sadek
9,509,269 B1 11/2016 Rosenberg
9,510,101 B1 11/2016 Polleros
9,514,476 B2 12/2016 Kay et al.
9,514,752 B2 12/2016 Sharifi
9,516,081 B2 12/2016 Tebbs et al.
9,536,541 B2 1/2017 Chen et al.
9,548,053 B1 1/2017 Basye et al.
9,548,066 B2 1/2017 Jain et al.
9,552,816 B2 1/2017 Vanlund et al.
9,554,210 B1 1/2017 Ayrapetian et al.
9,560,441 B1 1/2017 McDonough, Jr. et al.

(56) References Cited

U.S. PATENT DOCUMENTS 9,576,591 B2 2/2017 Kim et al.
9,601,116 B2 3/2017 Casado et al.
9,615,170 B2 4/2017 Kirsch et al.
9,615,171 B1 4/2017 O'Neill et al.
9,626,695 B2 4/2017 Balasubramanian et al.
9,632,748 B2 4/2017 Faaborg et al.
9,633,186 B2 4/2017 Ingrassia, Jr. et al.
9,633,368 B2 4/2017 Greenzeiger et al.
9,633,660 B2 4/2017 Haughay et al.
9,633,661 B1 4/2017 Typrin et al.
9,633,671 B2 4/2017 Giacobello et al.
9,633,674 B2 4/2017 Sinha et al.
9,640,179 B1 5/2017 Hart et al.
9,640,183 B2 5/2017 Jung et al.
9,641,919 B1 5/2017 Poole et al.
9,646,614 B2 5/2017 Bellegarda et al.
9,648,564 B1 5/2017 Cui et al.
9,653,060 B1 5/2017 Hilmes et al.
9,653,075 B1 5/2017 Chen et al.
9,659,555 B1 5/2017 Hilmes et al.
9,672,821 B2 6/2017 Krishnaswamy et al.
9,674,587 B2 6/2017 Triplett et al.
9,685,171 B1 6/2017 Yang
9,691,378 B1 6/2017 Meyers et al.
9,691,379 B1 6/2017 Mathias et al.
9,697,826 B2 7/2017 Sainath et al.
9,697,828 B1 7/2017 Prasad et al.
9,698,999 B2 7/2017 Mutagi et al.
9,704,478 B1 7/2017 Vitaladevuni et al.
9,721,566 B2 8/2017 Newendorp et al.
9,721,568 B1 8/2017 Polansky et al.
9,721,570 B1 8/2017 Beal et al.
9,728,188 B1 8/2017 Rosen et al.
9,734,822 B1 8/2017 Sundaram et al.
9,736,578 B2 8/2017 Iyengar et al.
9,743,204 B1 8/2017 Welch et al.
9,743,207 B1 8/2017 Hartung
9,747,011 B2 8/2017 Lewis et al.
9,747,899 B2 8/2017 Pogue et al.
9,747,920 B2 8/2017 Ayrapetian et al.
9,747,926 B2 8/2017 Sharifi et al.
9,749,760 B2 8/2017 Lambourne
9,754,605 B1 9/2017 Chhetri
9,762,967 B2 9/2017 Clarke et al.
9,769,420 B1 9/2017 Moses
9,779,725 B2 10/2017 Sun et al.
9,779,735 B2 10/2017 Civelli et al.
9,811,314 B2 11/2017 Plagge et al.
9,813,810 B1 11/2017 Nongpiur
9,813,812 B2 11/2017 Berthelsen et al.
9,818,407 B1 11/2017 Secker-Walker et al.
9,820,036 B1 11/2017 Tritschler et al.
9,820,039 B2 11/2017 Lang
9,826,306 B2 11/2017 Lang
9,865,259 B1 1/2018 Typrin et al.
9,865,264 B2 1/2018 Gelfenbeyn et al.
9,881,616 B2 1/2018 Beckley et al.
9,900,723 B1 2/2018 Choisel et al.
9,916,839 B1 3/2018 Scalise et al.
9,947,316 B2 4/2018 Millington et al.
9,947,333 B1 4/2018 David
9,972,318 B1 5/2018 Kelly et al.
9,972,343 B1 5/2018 Thorson et al.
9,973,849 B1 5/2018 Zhang et al.
9,979,560 B2 5/2018 Kim et al.
10,013,381 B2 7/2018 Mayman et al.
10,013,995 B1 7/2018 Lashkari et al.
10,026,401 B1 7/2018 Mutagi et al.
10,048,930 B1 8/2018 Vega et al.
10,049,675 B2 8/2018 Haughay
10,051,366 B1 8/2018 Buoni et al.
10,051,600 B1 8/2018 Zhong et al.
10,057,698 B2 8/2018 Drinkwater et al.
RE47,049 E 9/2018 Zhu et al.
10,068,573 B1 9/2018 Aykac et al.
10,074,369 B2 9/2018 Devaraj et al.
10,074,371 B1 9/2018 Wang et al.
10,079,015 B1 9/2018 Lockhart et al.
10,108,393 B2 10/2018 Millington et al.
10,115,400 B2 10/2018 Wilberding
10,116,748 B2 10/2018 Farmer et al.
10,127,911 B2 11/2018 Kim et al.
10,134,399 B2 11/2018 Lang et al.
10,136,204 B1 11/2018 Poole et al.
10,152,969 B2 12/2018 Reilly et al.
10,181,323 B2 1/2019 Beckhardt et al.
10,186,265 B1 1/2019 Lockhart et al.
10,192,546 B1 1/2019 Piersol et al.
10,224,056 B1 3/2019 Torok et al.
10,225,651 B2 3/2019 Lang
10,248,376 B2 4/2019 Keyser-Allen et al.
10,276,161 B2 4/2019 Hughes et al.
10,297,256 B2 5/2019 Reilly et al.
10,339,917 B2 7/2019 Aleksic et al.
10,346,122 B1 7/2019 Morgan
10,354,650 B2 7/2019 Gruenstein et al.
10,365,887 B1 7/2019 Mulherkar
10,365,889 B2 7/2019 Plagge et al.
10,366,688 B2 7/2019 Gunn et al.
10,366,699 B1 7/2019 Dharia et al.
10,374,816 B1 8/2019 Leblang et al.
10,381,001 B2 8/2019 Gunn et al.
10,381,002 B2 8/2019 Gunn et al.
10,381,003 B2 8/2019 Wakisaka et al.
10,388,272 B1 8/2019 Thomson et al.
10,433,058 B1 10/2019 Torgerson et al.
10,445,057 B2 10/2019 Vega et al.
10,469,966 B2 11/2019 Lambourne
10,499,146 B2 12/2019 Lang et al.
10,510,340 B1 12/2019 Fu et al.
10,511,904 B2 12/2019 Buoni et al.
10,522,146 B1 12/2019 Tushinskiy
10,546,583 B2 1/2020 White et al.
10,573,321 B1 * 2/2020 Smith .................. H04R 29/004
10,586,540 B1 3/2020 Smith et al.
10,599,287 B2 3/2020 Kumar et al.
10,602,268 B1 * 3/2020 Soto ........................ G10L 25/84
10,614,807 B2 4/2020 Beckhardt et al.
10,622,009 B1 4/2020 Zhang et al.
10,624,612 B2 4/2020 Sumi et al.
10,645,130 B2 5/2020 Corbin et al.
10,672,383 B1 6/2020 Thomson et al.
10,679,625 B1 6/2020 Lockhart et al.
10,681,460 B2 6/2020 Woo et al.
10,694,608 B2 6/2020 Baker et al.
10,712,997 B2 7/2020 Wilberding et al.
10,740,065 B2 8/2020 Jarvis et al.
10,762,896 B1 9/2020 Yavagal et al.
10,847,143 B2 11/2020 Millington et al.
10,848,885 B2 11/2020 Lambourne
RE48,371 E 12/2020 Zhu et al.
10,871,943 B1 * 12/2020 D'Amato ............ H04L 12/2809
10,878,811 B2 12/2020 Smith et al.
10,897,679 B2 1/2021 Lambourne
10,943,598 B2 3/2021 Singh et al.
10,971,158 B1 4/2021 Patangay et al.
2001/0042107 A1 11/2001 Palm
2002/0022453 A1 2/2002 Balog et al.
2002/0026442 A1 2/2002 Lipscomb et al.
2002/0034280 A1 3/2002 Infosino
2002/0046023 A1 4/2002 Fujii et al.
2002/0072816 A1 6/2002 Shdema et al.
2002/0116196 A1 8/2002 Tran
2002/0124097 A1 9/2002 Isely et al.
2003/0015354 A1 1/2003 Edwards et al.
2003/0038848 A1 2/2003 Lee et al.
2003/0040908 A1 2/2003 Yang et al.
2003/0070182 A1 4/2003 Pierre et al.
2003/0070869 A1 4/2003 Hlibowicki
2003/0072462 A1 4/2003 Hlibowicki
2003/0095672 A1 5/2003 Hobelsberger
2003/0130850 A1 7/2003 Badt et al.
2003/0157951 A1 8/2003 Hasty
2003/0235244 A1 12/2003 Pessoa et al.

(56) References Cited

U.S. PATENT DOCUMENTS

2004/0024478 A1 2/2004 Hans et al.
2004/0093219 A1 5/2004 Shin et al.
2004/0105566 A1 6/2004 Matsunaga et al.
2004/0127241 A1 7/2004 Shostak
2004/0128135 A1 7/2004 Anastasakos et al.
2004/0234088 A1 11/2004 McCarty et al.
2005/0031131 A1 2/2005 Browning et al.
2005/0031132 A1 2/2005 Browning et al.
2005/0031133 A1 2/2005 Browning et al.
2005/0031134 A1 2/2005 Leske
2005/0031137 A1 2/2005 Browning et al.
2005/0031138 A1 2/2005 Browning et al.
2005/0031139 A1 2/2005 Browning et al.
2005/0031140 A1 2/2005 Browning
2005/0047606 A1 3/2005 Lee et al.
2005/0077843 A1 4/2005 Benditt
2005/0164664 A1 7/2005 DiFonzo et al.
2005/0195988 A1 9/2005 Tashev et al.
2005/0201254 A1 9/2005 Looney et al.
2005/0207584 A1 9/2005 Bright
2005/0235334 A1 10/2005 Togashi et al.
2005/0268234 A1 12/2005 Rossi et al.
2005/0283330 A1 12/2005 Laraia et al.
2005/0283475 A1 12/2005 Beranek et al.
2006/0004834 A1 1/2006 Pyhalammi et al.
2006/0023945 A1 2/2006 King et al.
2006/0041431 A1 2/2006 Maes
2006/0093128 A1 5/2006 Oxford
2006/0104451 A1 5/2006 Browning et al.
2006/0147058 A1 7/2006 Wang
2006/0190269 A1 8/2006 Tessel et al.
2006/0190968 A1 8/2006 Jung et al.
2006/0247913 A1 11/2006 Huerta et al.
2006/0262943 A1 11/2006 Oxford
2007/0018844 A1 1/2007 Sutardja
2007/0019815 A1 1/2007 Asada et al.
2007/0033043 A1 2/2007 Hyakumoto
2007/0071206 A1 3/2007 Gainsboro et al.
2007/0071255 A1 3/2007 Schobben
2007/0076131 A1 4/2007 Li et al.
2007/0076906 A1 4/2007 Takagi et al.
2007/0140058 A1 6/2007 McIntosh et al.
2007/0140521 A1 6/2007 Mitobe et al.
2007/0142944 A1 6/2007 Goldberg et al.
2007/0147651 A1 6/2007 Mitobe et al.
2007/0201639 A1 8/2007 Park et al.
2007/0254604 A1 11/2007 Kim
2008/0037814 A1 2/2008 Shau
2008/0090537 A1 4/2008 Sutardja
2008/0090617 A1 4/2008 Sutardja
2008/0146289 A1 6/2008 Korneluk et al.
2008/0182518 A1 7/2008 Lo
2008/0207115 A1 8/2008 Lee et al.
2008/0208594 A1 8/2008 Cross et al.
2008/0221897 A1 9/2008 Cerra et al.
2008/0247530 A1 10/2008 Barton et al.
2008/0248797 A1 10/2008 Freeman et al.
2008/0291896 A1 11/2008 Tuubel et al.
2008/0301729 A1 12/2008 Broos et al.
2009/0003620 A1 1/2009 McKillop et al.
2009/0005893 A1 1/2009 Sugii et al.
2009/0010445 A1 1/2009 Matsuo
2009/0018828 A1 1/2009 Nakadai et al.
2009/0043206 A1 2/2009 Towfiq et al.
2009/0052688 A1 2/2009 Ishibashi et al.
2009/0076821 A1 3/2009 Brenner et al.
2009/0153289 A1 6/2009 Hope et al.
2009/0191854 A1 7/2009 Beason
2009/0197524 A1 8/2009 Haff et al.
2009/0220107 A1 9/2009 Every et al.
2009/0228919 A1 9/2009 Zott et al.
2009/0238377 A1 9/2009 Ramakrishnan et al.
2009/0238386 A1 9/2009 Usher et al.
2009/0248397 A1 10/2009 Garcia et al.
2009/0249222 A1 10/2009 Schmidt et al.
2009/0264072 A1 10/2009 Dai
2009/0323907 A1 12/2009 Gupta et al.
2009/0326949 A1 12/2009 Douthitt et al.
2010/0014690 A1 1/2010 Wolff et al.
2010/0023638 A1 1/2010 Bowman
2010/0035593 A1 2/2010 Franco et al.
2010/0070922 A1 3/2010 DeMaio et al.
2010/0075723 A1 3/2010 Min et al.
2010/0088100 A1 4/2010 Lindahl
2010/0092004 A1 4/2010 Kuze
2010/0161335 A1 6/2010 Whynot
2010/0172516 A1 7/2010 Lastrucci
2010/0178873 A1 7/2010 Lee et al.
2010/0179874 A1 7/2010 Higgins et al.
2010/0185448 A1 7/2010 Meisel
2010/0211199 A1 8/2010 Naik et al.
2011/0033059 A1 2/2011 Bhaskar et al.
2011/0035580 A1 2/2011 Wang et al.
2011/0044461 A1 2/2011 Kuech et al.
2011/0044489 A1 2/2011 Saiki et al.
2011/0066634 A1 3/2011 Phillips et al.
2011/0091055 A1 4/2011 Leblanc
2011/0103615 A1 5/2011 Sun
2011/0145581 A1 6/2011 Malhotra et al.
2011/0170707 A1 7/2011 Yamada et al.
2011/0182436 A1 7/2011 Murgia et al.
2011/0202924 A1 8/2011 Banguero et al.
2011/0218656 A1 9/2011 Bishop et al.
2011/0267985 A1 11/2011 Wilkinson et al.
2011/0276333 A1 11/2011 Wang et al.
2011/0280422 A1 11/2011 Neumeyer et al.
2011/0285808 A1 11/2011 Feng et al.
2011/0289506 A1 11/2011 Trivi et al.
2011/0299706 A1 12/2011 Sakai
2012/0020486 A1 1/2012 Fried et al.
2012/0022863 A1 1/2012 Cho et al.
2012/0022864 A1 1/2012 Leman et al.
2012/0078635 A1 3/2012 Rothkopf et al.
2012/0086568 A1 4/2012 Scott et al.
2012/0123268 A1 5/2012 Tanaka et al.
2012/0128160 A1 5/2012 Kim et al.
2012/0131125 A1 5/2012 Seidel et al.
2012/0148075 A1 6/2012 Goh et al.
2012/0162540 A1 6/2012 Ouchi et al.
2012/0163603 A1 6/2012 Abe et al.
2012/0177215 A1 7/2012 Bose et al.
2012/0183149 A1 7/2012 Hiroe
2012/0224715 A1 9/2012 Kikkeri
2012/0297284 A1 11/2012 Matthews, III et al.
2012/0308044 A1 12/2012 Vander Mey et al.
2012/0308046 A1 12/2012 Muza
2013/0006453 A1 1/2013 Wang et al.
2013/0024018 A1 1/2013 Chang et al.
2013/0034241 A1 2/2013 Pandey et al.
2013/0039527 A1 2/2013 Jensen et al.
2013/0058492 A1 3/2013 Silzle et al.
2013/0066453 A1 3/2013 Seefeldt
2013/0080146 A1 3/2013 Kato et al.
2013/0124211 A1 5/2013 McDonough
2013/0148821 A1 6/2013 Sorensen
2013/0170647 A1 7/2013 Reilly et al.
2013/0179173 A1 7/2013 Lee et al.
2013/0183944 A1 7/2013 Mozer et al.
2013/0191119 A1 7/2013 Sugiyama
2013/0191122 A1 7/2013 Mason
2013/0198298 A1 8/2013 Li et al.
2013/0211826 A1 8/2013 Mannby
2013/0216056 A1 8/2013 Thyssen
2013/0262101 A1 10/2013 Srinivasan
2013/0315420 A1 11/2013 You
2013/0317635 A1 11/2013 Bates et al.
2013/0322462 A1 12/2013 Poulsen
2013/0322665 A1 12/2013 Bennett et al.
2013/0324031 A1 12/2013 Loureiro
2013/0329896 A1 12/2013 Krishnaswamy et al.
2013/0331970 A1 12/2013 Beckhardt et al.
2013/0332165 A1 12/2013 Beckley et al.
2013/0339028 A1 12/2013 Rosner et al.
2014/0003611 A1 1/2014 Mohammad et al.

(56) References Cited

U.S. PATENT DOCUMENTS

2014/0003625 A1 1/2014 Sheen et al.
2014/0003635 A1 1/2014 Mohammad et al.
2014/0005813 A1 1/2014 Reimann
2014/0006026 A1 1/2014 Lamb et al.
2014/0006825 A1 1/2014 Shenhav
2014/0019743 A1 1/2014 DeLuca
2014/0034929 A1 2/2014 Hamada et al.
2014/0046464 A1 2/2014 Reimann
2014/0064501 A1 3/2014 Olsen et al.
2014/0073298 A1 3/2014 Rossmann
2014/0075306 A1 3/2014 Rega
2014/0075311 A1 3/2014 Boettcher et al.
2014/0094151 A1 4/2014 Klappert et al.
2014/0100854 A1 4/2014 Chen et al.
2014/0109138 A1 4/2014 Cannistraro et al.
2014/0122075 A1 5/2014 Bak et al.
2014/0136195 A1 5/2014 Abdossalami et al.
2014/0145168 A1 5/2014 Ohsawa et al.
2014/0146983 A1 5/2014 Kim et al.
2014/0163978 A1 6/2014 Basye et al.
2014/0164400 A1 6/2014 Kruglick
2014/0167931 A1 6/2014 Lee et al.
2014/0168344 A1 6/2014 Shoemake et al.
2014/0172953 A1 6/2014 Blanksteen
2014/0181271 A1 6/2014 Millington
2014/0192986 A1 7/2014 Lee et al.
2014/0195252 A1 7/2014 Gruber et al.
2014/0207457 A1 7/2014 Biatov et al.
2014/0214429 A1 7/2014 Pantel
2014/0215332 A1 7/2014 Lee et al.
2014/0219472 A1 8/2014 Huang et al.
2014/0222436 A1 8/2014 Binder et al.
2014/0229184 A1 8/2014 Shires
2014/0244013 A1 8/2014 Reilly
2014/0244712 A1 8/2014 Walters et al.
2014/0249817 A1 9/2014 Hart et al.
2014/0252386 A1 9/2014 Ito et al.
2014/0254805 A1 9/2014 Su et al.
2014/0258292 A1 9/2014 Thramann et al.
2014/0259075 A1 9/2014 Chang et al.
2014/0269757 A1 9/2014 Park et al.
2014/0270282 A1 9/2014 Tammi et al.
2014/0274185 A1 9/2014 Luna et al.
2014/0274203 A1 9/2014 Ganong, III et al.
2014/0274218 A1 9/2014 Kadiwala et al.
2014/0277650 A1 9/2014 Zurek et al.
2014/0291642 A1 10/2014 Watabe et al.
2014/0310002 A1 10/2014 Nitz et al.
2014/0310614 A1 10/2014 Jones
2014/0340888 A1 11/2014 Ishisone et al.
2014/0357248 A1 12/2014 Tonshal et al.
2014/0363022 A1 12/2014 Dizon et al.
2014/0363024 A1 12/2014 Apodaca
2014/0365227 A1 12/2014 Cash et al.
2014/0369491 A1 12/2014 Kloberdans et al.
2014/0372109 A1 12/2014 Iyer et al.
2015/0006176 A1 1/2015 Pogue et al.
2015/0006184 A1 1/2015 Marti et al.
2015/0010169 A1 1/2015 Popova et al.
2015/0014680 A1 1/2015 Yamazaki et al.
2015/0016642 A1 1/2015 Walsh et al.
2015/0018992 A1 1/2015 Griffiths et al.
2015/0019201 A1 1/2015 Schoenbach
2015/0019219 A1 1/2015 Tzirkel-Hancock et al.
2015/0036831 A1 2/2015 Klippel
2015/0039303 A1 2/2015 Lesso et al.
2015/0063580 A1 3/2015 Huang et al.
2015/0086034 A1 3/2015 Lombardi et al.
2015/0091709 A1 4/2015 Reichert et al.
2015/0092947 A1 4/2015 Gossain et al.
2015/0104037 A1 4/2015 Lee et al.
2015/0106085 A1 4/2015 Lindahl
2015/0110294 A1 4/2015 Chen et al.
2015/0112672 A1 4/2015 Giacobello et al.
2015/0124975 A1 5/2015 Pontoppidan
2015/0128065 A1 5/2015 Torii et al.
2015/0134456 A1 5/2015 Baldwin
2015/0154976 A1 6/2015 Mutagi
2015/0161990 A1 6/2015 Sharifi
2015/0169279 A1 6/2015 Duga
2015/0170645 A1 6/2015 Di et al.
2015/0172843 A1 6/2015 Quan
2015/0179181 A1 6/2015 Morris et al.
2015/0180432 A1 6/2015 Gao et al.
2015/0181318 A1 6/2015 Gautama et al.
2015/0189438 A1 7/2015 Hampiholi et al.
2015/0200454 A1 7/2015 Heusdens et al.
2015/0201271 A1 7/2015 Diethorn et al.
2015/0221678 A1 8/2015 Yamazaki et al.
2015/0222563 A1 8/2015 Burns et al.
2015/0222987 A1 8/2015 Angel, Jr. et al.
2015/0228274 A1 8/2015 Leppanen et al.
2015/0228803 A1 8/2015 Koezuka et al.
2015/0237406 A1 8/2015 Ochoa et al.
2015/0243287 A1 8/2015 Nakano et al.
2015/0245152 A1 8/2015 Ding et al.
2015/0245154 A1 8/2015 Dadu et al.
2015/0249889 A1 9/2015 Iyer et al.
2015/0253292 A1 9/2015 Larkin et al.
2015/0253960 A1 9/2015 Lin et al.
2015/0254057 A1 9/2015 Klein et al.
2015/0263174 A1 9/2015 Yamazaki et al.
2015/0271593 A1 9/2015 Sun et al.
2015/0277846 A1 10/2015 Yen et al.
2015/0280676 A1 10/2015 Holman et al.
2015/0296299 A1 10/2015 Klippel et al.
2015/0302856 A1 10/2015 Kim et al.
2015/0319529 A1 11/2015 Klippel
2015/0325267 A1 11/2015 Lee et al.
2015/0331663 A1 11/2015 Beckhardt et al.
2015/0334471 A1 11/2015 Innes et al.
2015/0338917 A1 11/2015 Steiner et al.
2015/0341406 A1 11/2015 Rockefeller et al.
2015/0346845 A1 12/2015 Di Censo et al.
2015/0348548 A1 12/2015 Piernot et al.
2015/0348551 A1 12/2015 Gruber et al.
2015/0355878 A1 12/2015 Corbin
2015/0363061 A1 12/2015 De Nigris, III et al.
2015/0363401 A1 12/2015 Chen et al.
2015/0370531 A1 12/2015 Faaborg
2015/0371657 A1 12/2015 Gao
2015/0371659 A1 12/2015 Gao
2015/0371664 A1 12/2015 Bar-Or et al.
2015/0380010 A1 12/2015 Srinivasan
2015/0382047 A1 12/2015 Van Os et al.
2016/0007116 A1 1/2016 Holman
2016/0021458 A1 1/2016 Johnson et al.
2016/0026428 A1 1/2016 Morganstern et al.
2016/0029142 A1 1/2016 Isaac et al.
2016/0035321 A1 2/2016 Cho et al.
2016/0036962 A1 2/2016 Rand et al.
2016/0042748 A1 2/2016 Jain et al.
2016/0044151 A1 2/2016 Shoemaker et al.
2016/0050488 A1 2/2016 Matheja et al.
2016/0057522 A1 2/2016 Choisel et al.
2016/0072804 A1 3/2016 Chien et al.
2016/0077710 A1 3/2016 Lewis et al.
2016/0086609 A1 3/2016 Yue et al.
2016/0088392 A1 3/2016 Huttunen et al.
2016/0093304 A1 3/2016 Kim et al.
2016/0094718 A1 3/2016 Mani et al.
2016/0094917 A1 3/2016 Wilk et al.
2016/0098393 A1 4/2016 Hebert
2016/0098992 A1 4/2016 Renard et al.
2016/0103653 A1 4/2016 Jang
2016/0104480 A1 4/2016 Sharifi
2016/0111110 A1 4/2016 Gautama et al.
2016/0125876 A1 5/2016 Schroeter et al.
2016/0127780 A1 5/2016 Roberts et al.
2016/0133259 A1 5/2016 Rubin et al.
2016/0134966 A1 5/2016 Fitzgerald et al.
2016/0134982 A1 5/2016 Iyer
2016/0154089 A1 6/2016 Altman
2016/0155442 A1 6/2016 Kannan et al.

(56) References Cited

U.S. PATENT DOCUMENTS

2016/0155443 A1 6/2016 Khan et al.
2016/0157035 A1 6/2016 Russell et al.
2016/0162469 A1 6/2016 Santos
2016/0171976 A1 6/2016 Sun et al.
2016/0173578 A1 6/2016 Sharma et al.
2016/0173983 A1 6/2016 Berthelsen et al.
2016/0180853 A1 6/2016 Vanlund et al.
2016/0189716 A1 6/2016 Lindahl et al.
2016/0196499 A1 7/2016 Khan et al.
2016/0203331 A1 7/2016 Khan et al.
2016/0210110 A1 7/2016 Feldman
2016/0212538 A1 7/2016 Fullam et al.
2016/0216938 A1 7/2016 Millington
2016/0225385 A1 8/2016 Hammarqvist
2016/0232451 A1 8/2016 Scherzer
2016/0234204 A1 8/2016 Rishi et al.
2016/0234615 A1 8/2016 Lambourne
2016/0239255 A1 8/2016 Chavez et al.
2016/0240192 A1 8/2016 Raghuvir
2016/0241976 A1 8/2016 Pearson
2016/0253050 A1 9/2016 Mishra et al.
2016/0260431 A1 9/2016 Newendorp et al.
2016/0283841 A1 9/2016 Sainath et al.
2016/0302018 A1 10/2016 Russell et al.
2016/0314782 A1 10/2016 Klimanis
2016/0316293 A1 10/2016 Klimanis
2016/0322045 A1 11/2016 Hatfield et al.
2016/0336519 A1 11/2016 Seo et al.
2016/0343866 A1 11/2016 Koezuka et al.
2016/0343949 A1 11/2016 Seo et al.
2016/0343954 A1 11/2016 Seo et al.
2016/0345114 A1 11/2016 Hanna et al.
2016/0352915 A1 12/2016 Gautama
2016/0353217 A1 12/2016 Starobin et al.
2016/0353218 A1 12/2016 Starobin et al.
2016/0357503 A1 12/2016 Triplett et al.
2016/0364206 A1 12/2016 Keyser-Allen et al.
2016/0366515 A1 12/2016 Mendes et al.
2016/0372688 A1 12/2016 Seo et al.
2016/0373269 A1 12/2016 Okubo et al.
2016/0373909 A1 12/2016 Rasmussen et al.
2016/0379634 A1 12/2016 Yamamoto et al.
2017/0003931 A1 1/2017 Dvortsov et al.
2017/0012207 A1 1/2017 Seo et al.
2017/0012232 A1 1/2017 Kataishi et al.
2017/0019732 A1 1/2017 Mendes et al.
2017/0025615 A1 1/2017 Seo et al.
2017/0025630 A1 1/2017 Seo et al.
2017/0026769 A1 1/2017 Patel
2017/0034263 A1 2/2017 Archambault et al.
2017/0039025 A1 2/2017 Kielak
2017/0040018 A1 2/2017 Tormey
2017/0041724 A1 2/2017 Master et al.
2017/0060526 A1 3/2017 Barton et al.
2017/0062734 A1 3/2017 Suzuki et al.
2017/0070478 A1 3/2017 Park et al.
2017/0076212 A1 3/2017 Shams et al.
2017/0076720 A1 3/2017 Gopalan et al.
2017/0078824 A1 3/2017 Heo
2017/0083285 A1 3/2017 Meyers et al.
2017/0084277 A1 3/2017 Sharifi
2017/0084292 A1 3/2017 Yoo
2017/0084295 A1 3/2017 Tsiartas et al.
2017/0090864 A1 3/2017 Jorgovanovic
2017/0092278 A1 3/2017 Evermann et al.
2017/0092297 A1 3/2017 Sainath et al.
2017/0092299 A1 3/2017 Matsuo
2017/0092889 A1 3/2017 Seo et al.
2017/0092890 A1 3/2017 Seo et al.
2017/0094215 A1 3/2017 Western
2017/0103754 A1 4/2017 Higbie et al.
2017/0103755 A1 4/2017 Jeon et al.
2017/0110124 A1 4/2017 Boesen et al.
2017/0110144 A1 4/2017 Sharifi et al.
2017/0117497 A1 4/2017 Seo et al.
2017/0123251 A1 5/2017 Nakada et al.
2017/0125037 A1 5/2017 Shin
2017/0125456 A1 5/2017 Kasahara
2017/0133007 A1 5/2017 Drewes
2017/0133011 A1 5/2017 Chen et al.
2017/0134872 A1 5/2017 Silva et al.
2017/0139720 A1 5/2017 Stein
2017/0140449 A1 5/2017 Kannan
2017/0140748 A1 5/2017 Roberts et al.
2017/0140759 A1 5/2017 Kumar et al.
2017/0177585 A1 6/2017 Rodger et al.
2017/0178662 A1 6/2017 Ayrapetian et al.
2017/0180561 A1 6/2017 Kadiwala et al.
2017/0188150 A1 6/2017 Brunet et al.
2017/0188437 A1 6/2017 Banta
2017/0193999 A1 7/2017 Aleksic et al.
2017/0206896 A1 7/2017 Ko et al.
2017/0206900 A1 7/2017 Lee et al.
2017/0214996 A1 7/2017 Yeo
2017/0236512 A1 8/2017 Williams et al.
2017/0236515 A1 8/2017 Pinsky et al.
2017/0242649 A1 8/2017 Jarvis et al.
2017/0242651 A1 8/2017 Lang et al.
2017/0242653 A1 8/2017 Lang et al.
2017/0242657 A1 8/2017 Jarvis et al.
2017/0243576 A1 8/2017 Millington et al.
2017/0243587 A1 8/2017 Plagge et al.
2017/0245076 A1 8/2017 Kusano et al.
2017/0255612 A1 9/2017 Sarikaya et al.
2017/0257686 A1 9/2017 Gautama et al.
2017/0270919 A1 9/2017 Parthasarathi et al.
2017/0278512 A1 9/2017 Pandya et al.
2017/0287485 A1 10/2017 Civelli et al.
2017/0330565 A1 11/2017 Daley et al.
2017/0332168 A1 11/2017 Moghimi et al.
2017/0346872 A1 11/2017 Naik et al.
2017/0352357 A1 12/2017 Fink
2017/0353789 A1 12/2017 Kim et al.
2017/0357475 A1 12/2017 Lee et al.
2017/0357478 A1 12/2017 Piersol et al.
2017/0366393 A1 12/2017 Shaker et al.
2017/0374454 A1 12/2017 Bernardini et al.
2018/0018964 A1 1/2018 Reilly et al.
2018/0018967 A1 1/2018 Lang et al.
2018/0020306 A1 1/2018 Sheen
2018/0025733 A1 1/2018 Qian et al.
2018/0033428 A1 2/2018 Kim et al.
2018/0040324 A1 2/2018 Wilberding
2018/0047394 A1 2/2018 Tian et al.
2018/0053504 A1 2/2018 Wang et al.
2018/0054506 A1 2/2018 Hart et al.
2018/0061396 A1 3/2018 Srinivasan et al.
2018/0061402 A1 3/2018 Devaraj et al.
2018/0061404 A1 3/2018 Devaraj et al.
2018/0061419 A1 3/2018 Melendo Casado et al.
2018/0061420 A1 3/2018 Patil et al.
2018/0062871 A1 3/2018 Jones et al.
2018/0084367 A1 3/2018 Greff et al.
2018/0088900 A1 3/2018 Glaser et al.
2018/0091898 A1 3/2018 Yoon et al.
2018/0091913 A1 3/2018 Hartung et al.
2018/0096683 A1 4/2018 James et al.
2018/0096696 A1 4/2018 Mixter
2018/0107446 A1 4/2018 Wilberding et al.
2018/0108351 A1 4/2018 Beckhardt et al.
2018/0122372 A1 5/2018 Wanderlust
2018/0122378 A1 5/2018 Mixter et al.
2018/0130469 A1 5/2018 Gruenstein et al.
2018/0132217 A1 5/2018 Stirling-Gallacher
2018/0132298 A1 5/2018 Birnam et al.
2018/0137861 A1 5/2018 Ogawa
2018/0152557 A1 5/2018 White et al.
2018/0165055 A1 6/2018 Yu et al.
2018/0167981 A1 6/2018 Jonna et al.
2018/0174597 A1 6/2018 Lee et al.
2018/0182390 A1 6/2018 Hughes et al.
2018/0190285 A1 7/2018 Heckman et al.
2018/0197533 A1 7/2018 Lyon et al.
2018/0199146 A1 7/2018 Sheen

(56) References Cited

U.S. PATENT DOCUMENTS

2018/0204569 A1 7/2018 Nadkar et al.
2018/0205963 A1 7/2018 Matei et al.
2018/0210698 A1 7/2018 Park et al.
2018/0218747 A1 8/2018 Moghimi et al.
2018/0219976 A1 8/2018 Decenzo et al.
2018/0225933 A1 8/2018 Park et al.
2018/0228006 A1 8/2018 Baker et al.
2018/0233136 A1 8/2018 Torok et al.
2018/0233137 A1 8/2018 Torok et al.
2018/0233139 A1 8/2018 Finkelstein et al.
2018/0234765 A1 8/2018 Torok et al.
2018/0262793 A1 9/2018 Lau et al.
2018/0262831 A1 9/2018 Matheja et al.
2018/0270565 A1 9/2018 Ganeshkumar
2018/0277107 A1 9/2018 Kim
2018/0277113 A1 9/2018 Hartung et al.
2018/0277119 A1 9/2018 Baba et al.
2018/0277133 A1 9/2018 Deetz et al.
2018/0293484 A1 10/2018 Wang et al.
2018/0308470 A1 10/2018 Park et al.
2018/0314552 A1 11/2018 Kim et al.
2018/0324756 A1 11/2018 Ryu et al.
2018/0335903 A1 11/2018 Coffman et al.
2018/0336274 A1 11/2018 Choudhury et al.
2018/0358009 A1 12/2018 Daley et al.
2018/0365567 A1 12/2018 Kolavennu et al.
2018/0367944 A1 12/2018 Heo et al.
2019/0012141 A1 1/2019 Piersol et al.
2019/0013019 A1 1/2019 Lawrence
2019/0014592 A1 1/2019 Hampel et al.
2019/0033446 A1 1/2019 Bultan et al.
2019/0042187 A1 2/2019 Truong et al.
2019/0043492 A1 2/2019 Lang
2019/0066672 A1 2/2019 Wood et al.
2019/0074025 A1 3/2019 Lashkari et al.
2019/0079724 A1 3/2019 Feuz et al.
2019/0081507 A1 3/2019 Ide
2019/0082255 A1 3/2019 Tajiri et al.
2019/0088261 A1 3/2019 Lang et al.
2019/0090056 A1 3/2019 Rexach et al.
2019/0098400 A1 3/2019 Buoni et al.
2019/0104119 A1 4/2019 Giorgi et al.
2019/0104373 A1 4/2019 Wodrich et al.
2019/0108839 A1 4/2019 Reilly et al.
2019/0115011 A1 4/2019 Khellah et al.
2019/0130906 A1 5/2019 Kobayashi et al.
2019/0163153 A1 5/2019 Price et al.
2019/0172452 A1 6/2019 Smith et al.
2019/0173687 A1 6/2019 MacKay et al.
2019/0179607 A1 6/2019 Thangarathnam et al.
2019/0179611 A1 6/2019 Wojogbe et al.
2019/0182072 A1 6/2019 Roe et al.
2019/0206412 A1 7/2019 Li et al.
2019/0220246 A1 7/2019 Orr et al.
2019/0237067 A1 8/2019 Friedman et al.
2019/0239008 A1 8/2019 Lambourne
2019/0239009 A1 8/2019 Lambourne
2019/0243603 A1 8/2019 Keyser-Allen et al.
2019/0243606 A1 8/2019 Jayakumar et al.
2019/0281397 A1 9/2019 Lambourne
2019/0287546 A1 9/2019 Ganeshkumar
2019/0295563 A1 9/2019 Kamdar et al.
2019/0297388 A1 9/2019 Panchaksharaiah et al.
2019/0304443 A1 10/2019 Bhagwan
2019/0311710 A1 10/2019 Eraslan et al.
2019/0311712 A1 10/2019 Firik et al.
2019/0311720 A1 10/2019 Pasko
2019/0317606 A1 10/2019 Jain et al.
2019/0342962 A1 11/2019 Chang et al.
2019/0364375 A1 11/2019 Soto et al.
2020/0007987 A1 1/2020 Woo et al.
2020/0034492 A1 1/2020 Verbeke et al.
2020/0051554 A1 2/2020 Kim et al.
2020/0092687 A1 3/2020 Devaraj et al.
2020/0105256 A1 4/2020 Fainberg et al.
2020/0175989 A1 6/2020 Lockhart et al.
2020/0184980 A1 6/2020 Wilberding
2020/0193973 A1 6/2020 Tolomei et al.
2020/0211556 A1 7/2020 Mixter et al.
2020/0213729 A1 7/2020 Soto
2020/0216089 A1 7/2020 Garcia et al.
2020/0336846 A1 10/2020 Rohde et al.
2020/0395006 A1 12/2020 Smith et al.
2020/0395010 A1 12/2020 Smith et al.
2020/0395013 A1 12/2020 Smith et al.
2020/0409652 A1 12/2020 Wilberding et al.
2021/0035561 A1 2/2021 D'Amato et al.
2021/0035572 A1 2/2021 D'Amato et al.
2021/0118429 A1 4/2021 Shan

FOREIGN PATENT DOCUMENTS

CN 101310558 A 11/2008
CN 101480039 A 7/2009
CN 101661753 A 3/2010
CN 101686282 A 3/2010
CN 101907983 A 12/2010
CN 102123188 A 7/2011
CN 102256098 A 11/2011
CN 102567468 A 7/2012
CN 103052001 A 4/2013
CN 103181192 A 6/2013
CN 103210663 A 7/2013
CN 103546616 A 1/2014
CN 103811007 A 5/2014
CN 104010251 A 8/2014
CN 104035743 A 9/2014
CN 104053088 A 9/2014
CN 104092936 A 10/2014
CN 104104769 A 10/2014
CN 104538030 A 4/2015
CN 104575504 A 4/2015
CN 104635539 A 5/2015
CN 104865550 A 8/2015
CN 105187907 A 12/2015
CN 105204357 A 12/2015
CN 105206281 A 12/2015
CN 105284076 A 1/2016
CN 105493442 A 4/2016
CN 106028223 A 10/2016
CN 106375902 A 2/2017
CN 106531165 A 3/2017
CN 106708403 A 5/2017
CN 107004410 A 8/2017
CN 107919123 A 4/2018
EP 1349146 A1 10/2003
EP 1389853 A1 2/2004
EP 2166737 A1 3/2010
EP 2683147 A1 1/2014
EP 3128767 A2 2/2017
EP 2351021 B1 9/2017
EP 3270377 A1 1/2018
EP 3285502 A1 2/2018
JP 2001236093 A 8/2001
JP 2003223188 A 8/2003
JP 2004347943 A 12/2004
JP 2004354721 A 12/2004
JP 2005242134 A 9/2005
JP 2005250867 A 9/2005
JP 2005284492 A 10/2005
JP 2006092482 A 4/2006
JP 2007013400 A 1/2007
JP 2007142595 A 6/2007
JP 2008079256 A 4/2008
JP 2008158868 A 7/2008
JP 2010141748 A 6/2010
JP 2013037148 A 2/2013
JP 2014071138 A 4/2014
JP 2014137590 A 7/2014
JP 2015161551 A 9/2015
JP 2015527768 A 9/2015
JP 2016095383 A 5/2016
JP 2017072857 A 4/2017
KR 20100036351 A 4/2010

(56) References Cited

FOREIGN PATENT DOCUMENTS

| | | | |
|---|---|---|---|
| KR | 100966415 | B1 | 6/2010 |
| KR | 20100111071 | A | 10/2010 |
| KR | 20130050987 | A | 5/2013 |
| KR | 20140035310 | A | 3/2014 |
| KR | 20140112900 | A | 9/2014 |
| WO | 200153994 | | 7/2001 |
| WO | 2003093950 | A2 | 11/2003 |
| WO | 2008048599 | A1 | 4/2008 |
| WO | 2012166386 | A2 | 12/2012 |
| WO | 2013184792 | A1 | 12/2013 |
| WO | 2014064531 | A1 | 5/2014 |
| WO | 2014159581 | A1 | 10/2014 |
| WO | 2015017303 | A1 | 2/2015 |
| WO | 2015037396 | A1 | 3/2015 |
| WO | 2015131024 | A1 | 9/2015 |
| WO | 2015178950 | A1 | 11/2015 |
| WO | 2016014142 | A1 | 1/2016 |
| WO | 2016022926 | A1 | 2/2016 |
| WO | 2016033364 | A1 | 3/2016 |
| WO | 2016057268 | A1 | 4/2016 |
| WO | 2016085775 | A2 | 6/2016 |
| WO | 2016165067 | A1 | 10/2016 |
| WO | 2016171956 | A1 | 10/2016 |
| WO | 2016200593 | A1 | 12/2016 |
| WO | 2017039632 | A1 | 3/2017 |
| WO | 2017058654 | A1 | 4/2017 |
| WO | 2017138934 | A1 | 8/2017 |
| WO | 2017147075 | A1 | 8/2017 |
| WO | 2017147936 | A1 | 9/2017 |
| WO | 2018027142 | A1 | 2/2018 |
| WO | 2018067404 | A1 | 4/2018 |

OTHER PUBLICATIONS

Notice of Allowance dated Apr. 7, 2020, issued in connection with U.S. Appl. No. 16/147,710, filed Sep. 29, 2018, 15 pages.
Notice of Allowance dated Jun. 7, 2019, issued in connection with U.S. Appl. No. 16/102,153, filed Aug. 13, 2018, 9 pages.
Notice of Allowance dated Jun. 7, 2021, issued in connection with U.S. Appl. No. 16/528,224, filed Jul. 31, 2019, 9 pages.
Notice of Allowance dated Aug. 9, 2018, issued in connection with U.S. Appl. No. 15/229,868, filed Aug. 5, 2016, 11 pages.
Notice of Allowance dated Mar. 9, 2018, issued in connection with U.S. Appl. No. 15/584,782, filed May 2, 2017, 8 pages.
Optimizing Siri on HomePod in Far-Field Settings. Audio Software Engineering and Siri Speech Team, Machine Learning Journal vol. 1, Issue 12. https://machinelearning.apple.com/2018/12/03/optimizing-siri-on-homepod-in-far-field-settings.html. Dec. 2018, 18 pages.
Palm, Inc., "Handbook for the Palm VII Handheld," May 2000, 311 pages.
Pre-Appeal Brief Decision mailed on Jun. 2, 2021, issued in connection with U.S. Appl. No. 16/213,570, filed Dec. 7, 2018, 2 pages.
Preinterview First Office Action dated Aug. 5, 2019, issued in connection with U.S. Appl. No. 16/434,426, filed Jun. 7, 2019, 4 pages.
Preinterview First Office Action dated Mar. 25, 2020, issued in connection with U.S. Appl. No. 16/109,375, filed Aug. 22, 2018, 6 pages.
Preinterview First Office Action dated Sep. 30, 2019, issued in connection with U.S. Appl. No. 15/989,715, filed May 25, 2018, 4 pages.
Preinterview First Office Action dated May 7, 2020, issued in connection with U.S. Appl. No. 16/213,570, filed Dec. 7, 2018, 5 pages.
Preinterview First Office Action dated Jan. 8, 2021, issued in connection with U.S. Appl. No. 16/798,967, filed Feb. 24, 2020, 4 pages.
Presentations at WinHEC 2000, May 2000, 138 pages.
Restriction Requirement dated Aug. 14, 2019, issued in connection with U.S. Appl. No. 16/214,711, filed Dec. 10, 2018, 5 pages.
Restriction Requirement dated Aug. 9, 2018, issued in connection with U.S. Appl. No. 15/717,621, filed Sep. 27, 2017, 8 pages.
Rottondi et al., "An Overview on Networked Music Performance Technologies," IEEE Access, vol. 4, pp. 8823-8843, 2016, DOI: 10.1109/ACCESS.2016.2628440, 21 pages.
Souden et al. "An Integrated Solution for Online Multichannel Noise Tracking and Reduction." IEEE Transactions on Audio, Speech, and Language Processing, vol. 19. No. 7, Sep. 7, 2011, 11 pages.
Souden et al. "Gaussian Model-Based Multichannel Speech Presence Probability" IEEE Transactions on Audio, Speech, and Language Processing, vol. 18, No. 5, Jul. 5, 2010, 6pages.
Souden et al. "On Optimal Frequency-Domain Multichannel Linear Filtering for Noise Reduction." IEEE Transactions on Audio, Speech, and Language Processing, vol. 18, No. 2, Feb. 2010, 17pages.
Steven J. Nowlan and Geoffrey E. Hinton "Simplifying Neural Networks by Soft Weight-Sharing" Neural Computation 4, 1992, 21 pages.
Tsiami et al. "Experiments in acoustic source localization using sparse arrays in adverse indoors environments", 2014 22nd European Signal Processing Conference, Sep. 1, 2014, 5 pages.
Tsung-Hsien Wen et al: "A Network-based End-to-End Trainable Task-oriented Dialogue System", CORR ARXIV, vol. 1604. 04562v1, Apr. 15, 2016, pp. 1-11, XP055396370, Stroudsburg, PA, USA.
Tweet: "How to start using Google app voice commands to make your life easier Share This Story shop @Bullet", Jan. 21, 2016, https://bgr.com/2016/01/21/best-ok-google-voice-commands/, 3 page.
Ullrich et al. "Soft Weight-Sharing for Neural Network Compression." ICLR 2017, 16 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Vacher et al. "Speech Recognition in a Smart Home: Some Experiments for Telemonitoring," 2009 Proceedings of the 5th Conference on Speech Technology and Human-Computer Dialogoue, Constant, 2009, 10 pages.
"S Voice or Google Now?"; https://web.archive.org/web/20160807040123/lowdown.carphonewarehouse.com/news/s-voice-or-google-now/ . . . , Apr. 28, 2015; 4 pages.
Wung et al. "Robust Acoustic Echo Cancellation in the Short-Time Fourier Transform Domain Using Adaptive Crossband Filters" IEEE International Conference on Acoustic, Speech and Signal Processing ICASSP, 2014, p. 1300-1304.
Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.
Yamaha DME 64 Owner's Manual; copyright 2004, 80 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.
International Searching Authority, International Search Report and Written Opinion dated Nov. 22, 2017, issued in connection with International Application No. PCT/US2017/054063, filed on Sep. 28, 2017, 11 pages.
International Searching Authority, International Search Report and Written Opinion dated Jan. 23, 2018, issued in connection with International Application No. PCT/US2017/57220, filed on Oct. 18, 2017, 8 pages.

(56) References Cited

OTHER PUBLICATIONS

International Searching Authority, International Search Report and Written Opinion dated May 23, 2017, issued in connection with International Application No. PCT/US2017/018739, Filed on Feb. 21, 2017, 10 pages.
International Searching Authority, International Search Report and Written Opinion dated Oct. 23, 2017, issued in connection with International Application No. PCT/US2017/042170, filed on Jul. 14, 2017, 15 pages.
International Searching Authority, International Search Report and Written Opinion dated Oct. 24, 2017, issued in connection with International Application No. PCT/US2017/042227, filed on Jul. 14, 2017, 16 pages.
International Searching Authority, International Search Report and Written Opinion dated May 30, 2017, issued in connection with International Application No. PCT/US2017/018728, Filed on Feb. 21, 2017, 11 pages.
Japanese Patent Office, Decision of Refusal and Translation dated Jun. 8, 2021, issued in connection with Japanese Patent Application No. 2019-073348, 5 pages.
Japanese Patent Office, English Translation of Office Action dated Nov. 17, 2020, issued in connection with Japanese Application No. 2019-145039, 5 pages.
Japanese Patent Office, English Translation of Office Action dated Aug. 27, 2020, issued in connection with Japanese Application No. 2019-073349, 6 pages.
Japanese Patent Office, English Translation of Office Action dated Jul. 30, 2020, issued in connection with Japanese Application No. 2019-517281, 26 pages.
Japanese Patent Office, Non-Final Office Action and Translation dated Nov. 5, 2019, issued in connection with Japanese Patent Application No. 2019-517281, 6 pages.
Japanese Patent Office, Notice of Reasons for Refusal and Translation dated Jun. 22, 2021, issued in connection with Japanese Patent Application No. 2020-517935, 4 pages.
Japanese Patent Office, Office Action and Translation dated Mar. 16, 2021, issued in connection with Japanese Patent Application No. 2020-506725, 7 pages.
Japanese Patent Office, Office Action and Translation dated Nov. 17, 2020, issued in connection with Japanese Patent Application No. 2019-145039, 7 pages.
Japanese Patent Office, Office Action and Translation dated Apr. 20, 2021, issued in connection with Japanese Patent Application No. 2020-513852, 9 pages.
Japanese Patent Office, Office Action and Translation dated Feb. 24, 2021, issued in connection with Japanese Patent Application No. 2019-517281, 4 pages.
Japanese Patent Office, Office Action and Translation dated Apr. 27, 2021, issued in connection with Japanese Patent Application No. 2020-518400, 10 pages.
Japanese Patent Office, Office Action and Translation dated Aug. 27, 2020, issued in connection with Japanese Patent Application No. 2019-073349, 6 pages.
Japanese Patent Office, Office Action and Translation dated Jul. 30, 2020, issued in connection with Japanese Patent Application No. 2019-517281, 6 pages.
Japanese Patent Office, Office Action and Translation dated Jul. 6, 2020, issued in connection with Japanese Patent Application No. 2019-073348, 10 pages.
Japanese Patent Office, Office Action and Translation dated Jul. 6, 2021, issued in connection with Japanese Patent Application No. 2019-073349, 6 pages.
Japanese Patent Office, Office Action and Translation dated Oct. 8, 2019, issued in connection with Japanese Patent Application No. 2019-521032, 5 pages.
Japanese Patent Office, Office Action Translation dated Nov. 5, 2019, issued in connection with Japanese Patent Application No. 2019-517281, 2 pages.
Japanese Patent Office, Office Action Translation dated Oct. 8, 2019, issued in connection with Japanese Patent Application No. 2019-521032, 8 pages.
Jo et al., "Synchronized One-to-many Media Streaming with Adaptive Playout Control," Proceedings of SPIE, 2002, pp. 71-82, vol. 4861.
Johnson, "Implementing Neural Networks into Modern Technology," IJCNN'99. International Joint Conference on Neural Networks . Proceedings [Cat. No. 99CH36339], Washington, DC, USA, 1999, pp. 1028-1032, vol. 2, doi: 10.1109/IJCNN.1999.831096. [retrieved on Jun. 22, 2020].
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Jose Alvarez and Mathieu Salzmann "Compression-aware Training of Deep Networks" 31st Conference on Neural Information Processing Systems, Nov. 13, 2017, 12pages.
Joseph Szurley et al, "Efficient computation of microphone utility in a wireless acoustic sensor network with multi-channel Wiener filter based noise reduction", 2012 IEEE International Conference on Acoustics, Speech and Signal Processing, Kyoto, Japan, Mar. 25-30, 2012, pp. 2657-2660, XP032227701, DOI: 10.1109/ICASSP .2012. 6288463 ISBN: 978-1-4673-0045-2.
Korean Patent Office, Korean Examination Report and Translation dated Apr. 26, 2021, issued in connection with Korean Application No. 10-2021-7008937, 15 pages.
Korean Patent Office, Korean Office Action and Translation dated Aug. 16, 2019, issued in connection with Korean Application No. 10-2018-7027452, 14 pages.
Korean Patent Office, Korean Office Action and Translation dated Apr. 2, 2020, issued in connection with Korean Application No. 10-2020-7008486, 12 pages.
Korean Patent Office, Korean Office Action and Translation dated Mar. 25, 2020, issued in connection with Korean Application No. 10-2019-7012192, 14 pages.
Korean Patent Office, Korean Office Action and Translation dated Aug. 26, 2020, issued in connection with Korean Application No. 10-2019-7027640, 16 pages.
Korean Patent Office, Korean Office Action and Translation dated Mar. 30, 2020, issued in connection with Korean Application No. 10-2020-7004425, 5 pages.
Korean Patent Office, Korean Office Action and Translation dated Jan. 4, 2021, issued in connection with Korean Application No. 10-2020-7034425, 14 pages.
Korean Patent Office, Korean Office Action and Translation dated Sep. 9, 2019, issued in connection with Korean Application No. 10-2018-7027451, 21 pages.
Korean Patent Office, Korean Office Action dated May 8, 2019, issued in connection with Korean Application No. 10-2018-7027451, 7 pages.
Korean Patent Office, Korean Office Action dated May 8, 2019, issued in connection with Korean Application No. 10-2018-7027452, 5 pages.
Louderback, Jim, "Affordable Audio Receiver Furnishes Homes With MP3," TechTV Vault. Jun. 28, 2000 retrieved Jul. 10, 2014, 2 pages.
Maja Taseska and Emanual A.P. Habets, "MMSE-Based Blind Source Extraction in Diffuse Noise Fields Using a Complex Coherence-Based a Priori Sap Estimator." International Workshop on Acoustic Signal Enhancement 2012, Sep. 4-6, 2012, 4pages.
Mesaros et al. Detection and Classification of Acoustic Scenes and Events: Outcome of the DCASE 2016 Challenge. IEEE/ACM Transactions on Audio, Speech, and Language Processing. Feb. 2018, 16 pages.
Morales-Cordovilla et al. "Room Localization for Distant Speech Recognition," Proceedings of Interspeech 2014, Sep. 14, 2014, 4 pages.
Newman, Jared. "Chromecast Audio's multi-room support has arrived," Dec. 11, 2015, https://www.pcworld.com/article/3014204/customer-electronic/chromcase-audio-s-multi-room-support-has . . . , 1 page.

(56) References Cited

OTHER PUBLICATIONS

Ngo et al. "Incorporating the Conditional Speech Presence Probability in Multi-Channel Wiener Filter Based Noise Reduction in Hearing Aids." EURASIP Journal on Advances in Signal Processing vol. 2009, Jun. 2, 2009, 11 pages.
Non-Final Office Action dated Jul. 12, 2021, issued in connection with U.S. Appl. No. 17/008,104, filed Aug. 31, 2020, 6 pages.
Non-Final Office Action dated Jun. 18, 2021, issued in connection with U.S. Appl. No. 17/236,559, filed Apr. 21, 2021, 9 pages.
Non-Final Office Action dated Dec. 21, 2020, issued in connection with U.S. Appl. No. 16/153,530, filed Oct. 5, 2018, 22 pages.
European Patent Office, European Extended Search Report dated Aug. 6, 2020, issued in connection with European Application No. 20166332.5, 10 pages.
European Patent Office, European Office Action dated Jul. 1, 2020, issued in connection with European Application No. 17757075.1, 7 pages.
European Patent Office, European Office Action dated Jan. 14, 2020, issued in connection with European Application No. 17757070.2, 7 pages.
European Patent Office, European Office Action dated Jan. 21, 2021, issued in connection with European Application No. 17792272.1, 7 pages.
European Patent Office, European Office Action dated Jan. 22, 2019, issued in connection with European Application No. 17174435.2, 9 pages.
European Patent Office, European Office Action dated Sep. 23, 2020, issued in connection with European Application No. 18788976.1, 7 pages.
European Patent Office, European Office Action dated Oct. 26, 2020, issued in connection with European Application No. 18760101.8, 4 pages.
European Patent Office, European Office Action dated Aug. 30, 2019, issued in connection with European Application No. 17781608.9, 6 pages.
European Patent Office, European Office Action dated Sep. 9, 2020, issued in connection with European Application No. 18792656.3, 10 pages.
European Patent Office, Summons to Attend Oral Proceedings mailed on Dec. 20, 2019, issued in connection with European Application No. 17174435.2, 13 pages.
Fadilpasic,"Cortana can now be the default PDA on your Android", IT Pro Portal: Accessed via WayBack Machine; http://web.archive.org/web/20171129124915/https://www.itproportal.com/2015/08/11/cortana-can-now-be- . . . , Aug. 11, 2015, 6 pages.
Final Office Action dated Oct. 6, 2017, issued in connection with U.S. Appl. No. 15/098,760, filed Apr. 14, 2016, 25 pages.
Final Office Action dated Feb. 10, 2021, issued in connection with U.S. Appl. No. 16/219,702, filed Dec. 13, 2018, 9 pages.
Final Office Action dated Feb. 10, 2021, issued in connection with U.S. Appl. No. 16/402,617, filed May 3, 2019, 13 pages.
Final Office Action dated Nov. 10, 2020, issued in connection with U.S. Appl. No. 16/600,644, filed Oct. 14, 2019, 19 pages.
Final Office Action dated Apr. 11, 2019, issued in connection with U.S. Appl. No. 15/131,254, filed Apr. 18, 2016, 17 pages.
Final Office Action dated Aug. 11, 2017, issued in connection with U.S. Appl. No. 15/131,776, filed Apr. 18, 2016, 7 pages.
Final Office Action dated Dec. 11, 2019, issued in connection with U.S. Appl. No. 16/227,308, filed Dec. 20, 2018, 10 pages.
Final Office Action dated Sep. 11, 2019, issued in connection with U.S. Appl. No. 16/178,122, filed Nov. 1, 2018, 13 pages.
Final Office Action dated Apr. 13, 2018, issued in connection with U.S. Appl. No. 15/131,254, filed Apr. 18, 2016, 18 pages.
Final Office Action dated Apr. 13, 2018, issued in connection with U.S. Appl. No. 15/438,744, filed Feb. 21, 2017, 20 pages.
Final Office Action dated May 13, 2020, issued in connection with U.S. Appl. No. 16/153,530, filed Oct. 5, 2018, 20 pages.
Final Office Action dated Jul. 15, 2021, issued in connection with U.S. Appl. No. 16/153,530, filed Oct. 5, 2018, 22 pages.
Final Office Action dated Jun. 15, 2017, issued in connection with U.S. Appl. No. 15/098,718, filed Apr. 14, 2016, 15 pages.
Final Office Action dated Jun. 15, 2021, issued in connection with U.S. Appl. No. 16/819,755, filed Mar. 16, 2020, 12 pages.
Final Office Action dated Oct. 15, 2018, issued in connection with U.S. Appl. No. 15/804,776, filed Nov. 6, 2017, 18 pages.
Final Office Action dated Oct. 15, 2020, issued in connection with U.S. Appl. No. 16/109,375, filed Aug. 22, 2018, 9 pages.
Final Office Action dated Oct. 16, 2018, issued in connection with U.S. Appl. No. 15/438,725, filed Feb. 21, 2017, 10 pages.
Final Office Action dated May 18, 2020, issued in connection with U.S. Appl. No. 16/177,185, filed Oct. 31, 2018, 16 pages.
Final Office Action dated Feb. 21, 2018, issued in connection with U.S. Appl. No. 15/297,627, filed Oct. 19, 2016, 12 pages.
Final Office Action dated May 21, 2020, issued in connection with U.S. Appl. No. 15/989,715, filed May 25, 2018, 21 pages.
Final Office Action dated Feb. 22, 2021, issued in connection with U.S. Appl. No. 15/936,177, filed Mar. 26, 2018, 20 pages.
Final Office Action dated Feb. 22, 2021, issued in connection with U.S. Appl. No. 16/213,570, filed Dec. 7, 2018, 12 pages.
Final Office Action dated Jun. 22, 2020, issued in connection with U.S. Appl. No. 16/179,779, filed Nov. 2, 2018, 16 pages.
Final Office Action dated Mar. 23, 2020, issued in connection with U.S. Appl. No. 16/145,275, filed Sep. 28, 2018, 11 pages.
Final Office Action dated Feb. 24, 2020, issued in connection with U.S. Appl. No. 15/936,177, filed Mar. 26, 2018, 20 pages.
Final Office Action dated Apr. 26, 2019, issued in connection with U.S. Appl. No. 15/721,141, filed Sep. 29, 2017, 20 pages.
Final Office Action dated Apr. 30, 2019, issued in connection with U.S. Appl. No. 15/098,760, filed Apr. 14, 2016, 6 pages.
Final Office Action dated Jun. 4, 2021, issued in connection with U.S. Appl. No. 16/168,389, filed Oct. 23, 2018, 38 pages.
Final Office Action dated Feb. 5, 2019, issued in connection with U.S. Appl. No. 15/438,749, filed Feb. 21, 2017, 17 pages.
Final Office Action dated Feb. 7, 2020, issued in connection with U.S. Appl. No. 15/948,541, filed Apr. 9, 2018, 8 pages.
Final Office Action dated Jun. 8, 2021, issued in connection with U.S. Appl. No. 16/271,550, filed Feb. 8, 2019, 41 pages.
Final Office Action dated Sep. 8, 2020, issued in connection with U.S. Appl. No. 16/213,570, filed Dec. 7, 2018, 12 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.
First Action Interview Office Action dated Mar. 8, 2021, issued in connection with U.S. Appl. No. 16/798,967, filed Feb. 24, 2020, 4 pages.
First Action Interview Office Action dated Aug. 14, 2019, issued in connection with U.S. Appl. No. 16/227,308, filed Dec. 20, 2018, 4 pages.
First Action Interview Office Action dated Jun. 15, 2020, issued in connection with U.S. Appl. No. 16/213,570, filed Dec. 7, 2018, 4 pages.
First Action Interview Office Action dated Jun. 2, 2020, issued in connection with U.S. Appl. No. 16/109,375, filed Aug. 22, 2018, 10 pages.
First Action Interview Office Action dated Jan. 22, 2020, issued in connection with U.S. Appl. No. 15/989,715, filed May 25, 2018, 3 pages.
First Action Interview Office Action dated Jul. 5, 2019, issued in connection with U.S. Appl. No. 16/227,308, filed Dec. 20, 2018, 4 pages.
Non-Final Office Action dated Apr. 9, 2021, issued in connection with U.S. Appl. No. 16/780,483, filed Feb. 3, 2020, 45 pages.
Non-Final Office Action dated Feb. 9, 2021, issued in connection with U.S. Appl. No. 16/806,747, filed Mar. 2, 2020, 16 pages.
Non-Final Office Action dated May 9, 2018, issued in connection with U.S. Appl. No. 15/818,051, filed Nov. 20, 2017, 22 pages.
Non-Final Office Action dated Sep. 9, 2020, issued in connection with U.S. Appl. No. 16/168,389, filed Oct. 23, 2018, 29 pages.
Notice of Allowance dated Mar. 31, 2021, issued in connection with U.S. Appl. No. 16/813,643, filed Mar. 9, 2020, 11 pages.
Notice of Allowance dated Dec. 2, 2019, issued in connection with U.S. Appl. No. 15/718,521, filed Sep. 28, 2017, 15 pages.

(56) References Cited

OTHER PUBLICATIONS

Notice of Allowance dated Dec. 4, 2017, issued in connection with U.S. Appl. No. 15/277,810, filed Sep. 27, 2016, 5 pages.
Notice of Allowance dated Jul. 5, 2018, issued in connection with U.S. Appl. No. 15/237,133, filed Aug. 15, 2016, 5 pages.
Notice of Allowance dated Jul. 9, 2018, issued in connection with U.S. Appl. No. 15/438,741, filed Feb. 21, 2017, 5 pages.
Notice of Allowance dated Apr. 1, 2019, issued in connection with U.S. Appl. No. 15/935,966, filed Mar. 26, 2018, 5 pages.
Notice of Allowance dated Aug. 1, 2018, issued in connection with U.S. Appl. No. 15/297,627, filed Oct. 19, 2016, 9 pages.
Notice of Allowance dated Jun. 1, 2021, issued in connection with U.S. Appl. No. 16/219,702, filed Dec. 13, 2018, 8 pages.
Notice of Allowance dated Jun. 1, 2021, issued in connection with U.S. Appl. No. 16/685,135, filed Nov. 15, 2019, 10 pages.
Notice of Allowance dated Aug. 10, 2020, issued in connection with U.S. Appl. No. 16/424,825, filed May 29, 2019, 9 pages.
Notice of Allowance dated Feb. 10, 2021, issued in connection with U.S. Appl. No. 16/138,111, filed Sep. 21, 2018, 8 pages.
Notice of Allowance dated Apr. 11, 2018, issued in connection with U.S. Appl. No. 15/719,454, filed Sep. 28, 2017, 15 pages.
Notice of Allowance dated Oct. 11, 2019, issued in connection with U.S. Appl. No. 16/437,476, filed Jun. 11, 2019, 9 pages.
Notice of Allowance dated Sep. 11, 2019, issued in connection with U.S. Appl. No. 16/154,071, filed Oct. 8, 2018, 5 pages.
Notice of Allowance dated Dec. 12, 2018, issued in connection with U.S. Appl. No. 15/811,468, filed Nov. 13, 2017, 9 pages.
Notice of Allowance dated Jul. 12, 2017, issued in connection with U.S. Appl. No. 15/098,805, filed Apr. 14, 2016, 8 pages.
Notice of Allowance dated Jun. 12, 2019, issued in connection with U.S. Appl. No. 15/670,361, filed Aug. 7, 2017, 7 pages.
Notice of Allowance dated May 12, 2021, issued in connection with U.S. Appl. No. 16/402,617, filed May 3, 2019, 8 pages.
Notice of Allowance dated Sep. 12, 2018, issued in connection with U.S. Appl. No. 15/438,744, filed Feb. 21, 2017, 15 pages.
Notice of Allowance dated Dec. 13, 2017, issued in connection with U.S. Appl. No. 15/784,952, filed Oct. 16, 2017, 9 pages.
Notice of Allowance dated Feb. 13, 2019, issued in connection with U.S. Appl. No. 15/959,907, filed Apr. 23, 2018, 10 pages.
Notice of Allowance dated Jan. 13, 2020, issued in connection with U.S. Appl. No. 16/192,126, filed Nov. 15, 2018, 6 pages.
Notice of Allowance dated Jan. 13, 2021, issued in connection with U.S. Appl. No. 16/539,843, filed Aug. 13, 2019, 5 pages.
Notice of Allowance dated Nov. 13, 2020, issued in connection with U.S. Appl. No. 16/131,409, filed Sep. 14, 2018, 11 pages.
Notice of Allowance dated Aug. 14, 2017, issued in connection with U.S. Appl. No. 15/098,867, filed Apr. 14, 2016, 10 pages.
Notice of Allowance dated Aug. 14, 2020, issued in connection with U.S. Appl. No. 16/598,125, filed Oct. 10, 2019, 5 pages.
Notice of Allowance dated Feb. 14, 2017, issued in connection with U.S. Appl. No. 15/229,855, filed Aug. 5, 2016, 11 pages.
Notice of Allowance dated Jan. 14, 2021, issued in connection with U.S. Appl. No. 17/087,423, filed Nov. 2, 2020, 8 pages.
Notice of Allowance dated Jun. 14, 2017, issued in connection with U.S. Appl. No. 15/282,554, filed Sep. 30, 2016, 11 pages.
Notice of Allowance dated Nov. 14, 2018, issued in connection with U.S. Appl. No. 15/297,627, filed Oct. 19, 2016, 5 pages.
Notice of Allowance dated Dec. 15, 2017, issued in connection with U.S. Appl. No. 15/223,218, filed Jul. 29, 2016, 7 pages.
Notice of Allowance dated Jan. 15, 2020, issued in connection with U.S. Appl. No. 16/439,009, filed Jun. 12, 2019, 9 pages.
Notice of Allowance dated Mar. 15, 2019, issued in connection with U.S. Appl. No. 15/804,776, filed Nov. 6, 2017, 9 pages.
Notice of Allowance dated Oct. 15, 2019, issued in connection with U.S. Appl. No. 16/437,437, filed Jun. 11, 2019, 9 pages.
Notice of Allowance dated Oct. 15, 2020, issued in connection with U.S. Appl. No. 16/715,713, filed Dec. 16, 2019, 9 pages.
Notice of Allowance dated Apr. 16, 2021, issued in connection with U.S. Appl. No. 16/798,967, filed Feb. 24, 2020, 16 pages.
Notice of Allowance dated Aug. 16, 2017, issued in connection with U.S. Appl. No. 15/098,892, filed Apr. 14, 2016, 9 pages.
Notice of Allowance dated Aug. 17, 2017, issued in connection with U.S. Appl. No. 15/131,244, filed Apr. 18, 2016, 9 pages.
Notice of Allowance dated Feb. 17, 2021, issued in connection with U.S. Appl. No. 16/715,984, filed Dec. 16, 2019, 8 pages.
Notice of Allowance dated Jul. 17, 2019, issued in connection with U.S. Appl. No. 15/718,911, filed Sep. 28, 2017, 5 pages.
Notice of Allowance dated Jun. 17, 2020, issued in connection with U.S. Appl. No. 16/141,875, filed Sep. 25, 2018, 6 pages.
Notice of Allowance dated Sep. 17, 2018, issued in connection with U.S. Appl. No. 15/211,689, filed Jul. 15, 2016, 6 pages.
Notice of Allowance dated Apr. 18, 2019, issued in connection with U.S. Appl. No. 16/173,797, filed Oct. 29, 2018, 9 pages.
Notice of Allowance dated Dec. 18, 2019, issued in connection with U.S. Appl. No. 16/434,426, filed Jun. 7, 2019, 13 pages.
Notice of Allowance dated Feb. 18, 2020, issued in connection with U.S. Appl. No. 16/022,662, filed Jun. 28, 2018, 8 pages.
Notice of Allowance dated Jul. 18, 2019, issued in connection with U.S. Appl. No. 15/438,749, filed Feb. 21, 2017, 9 pages.
Non-Final Office Action dated Jun. 20, 2019, issued in connection with U.S. Appl. No. 15/946,585, filed Apr. 5, 2018, 10 pages.
Non-Final Office Action dated Apr. 21, 2021, issued in connection with U.S. Appl. No. 16/109,375, filed Aug. 22, 2018, 9 pages.
Non-Final Office Action dated Aug. 21, 2019, issued in connection with U.S. Appl. No. 16/192,126, filed Nov. 15, 2018, 8 pages.
Non-Final Office Action dated Feb. 21, 2019, issued in connection with U.S. Appl. No. 16/214,666, filed Dec. 10, 2018, 12 pages.
Non-Final Office Action dated Jan. 21, 2020, issued in connection with U.S. Appl. No. 16/214,711, filed Dec. 10, 2018, 9 pages.
Non-Final Office Action dated Jan. 21, 2020, issued in connection with U.S. Appl. No. 16/598,125, filed Oct. 10, 2019, 25 pages.
Non-Final Office Action dated Oct. 21, 2019, issued in connection with U.S. Appl. No. 15/973,413, filed May 7, 2018, 10 pages.
Non-Final Office Action dated Jul. 22, 2020, issued in connection with U.S. Appl. No. 16/145,275, filed Sep. 28, 2018, 11 pages.
Non-Final Office Action dated May 22, 2018, issued in connection with U.S. Appl. No. 15/946,599, filed Apr. 5, 2018, 19 pages.
Non-Final Office Action dated Sep. 22, 2020, issued in connection with U.S. Appl. No. 16/539,843, filed Aug. 13, 2019, 7 pages.
Non-Final Office Action dated Jun. 23, 2021, issued in connection with U.S. Appl. No. 16/439,032, filed Jun. 12, 2019, 13 pages.
Non-Final Office Action dated May 23, 2019, issued in connection with U.S. Appl. No. 16/154,071, filed Oct. 8, 2018, 36 pages.
Non-Final Office Action dated Nov. 23, 2020, issued in connection with U.S. Appl. No. 16/524,306, filed Jul. 29, 2019, 14 pages.
Non-Final Office Action dated Sep. 23, 2020, issued in connection with U.S. Appl. No. 16/177,185, filed Oct. 31, 2018, 17 pages.
Non-Final Office Action dated Aug. 24, 2017, issued in connection with U.S. Appl. No. 15/297,627, filed Oct. 19, 2016, 13 pages.
Non-Final Office Action dated Jul. 24, 2019, issued in connection with U.S. Appl. No. 16/439,009, filed Jun. 12, 2019, 26 pages.
Non-Final Office Action dated Jul. 25, 2017, issued in connection with U.S. Appl. No. 15/273,679, filed Jul. 22, 2016, 11 pages.
Non-Final Office Action dated Dec. 26, 2018, issued in connection with U.S. Appl. No. 16/154,469, filed Oct. 8, 2018, 7 pages.
Non-Final Office Action dated Jan. 26, 2017, issued in connection with U.S. Appl. No. 15/098,867, filed Apr. 14, 2016, 16 pages.
Non-Final Office Action dated Oct. 26, 2017, issued in connection with U.S. Appl. No. 15/438,744, filed Feb. 21, 2017, 12 pages.
Non-Final Office Action dated Jun. 27, 2018, issued in connection with U.S. Appl. No. 15/438,749, filed Feb. 21, 2017, 16 pages.
Non-Final Office Action dated Jun. 27, 2019, issued in connection with U.S. Appl. No. 16/437,437, filed Jun. 11, 2019, 8 pages.
Non-Final Office Action dated Jun. 27, 2019, issued in connection with U.S. Appl. No. 16/437,476, filed Jun. 11, 2019, 8 pages.
Non-Final Office Action dated Mar. 27, 2020, issued in connection with U.S. Appl. No. 16/790,621, filed Feb. 13, 2020, 8 pages.
Non-Final Office Action dated May 27, 2020, issued in connection with U.S. Appl. No. 16/715,713, filed Dec. 16, 2019, 14 pages.
Non-Final Office Action dated Oct. 27, 2020, issued in connection with U.S. Appl. No. 16/213,570, filed Dec. 7, 2018, 13 pages.

(56) References Cited

OTHER PUBLICATIONS

Non-Final Office Action dated Oct. 27, 2020, issued in connection with U.S. Appl. No. 16/715,984, filed Dec. 16, 2019, 14 pages.
Non-Final Office Action dated Oct. 27, 2020, issued in connection with U.S. Appl. No. 16/819,755, filed Mar. 16, 2020, 8 pages.
Non-Final Office Action dated Oct. 28, 2019, issued in connection with U.S. Appl. No. 16/145,275, filed Sep. 28, 2018, 11 pages.
Non-Final Office Action dated Mar. 29, 2019, issued in connection with U.S. Appl. No. 16/102,650, filed Aug. 13, 2018, 11 pages.
Non-Final Office Action dated Mar. 29, 2021, issued in connection with U.S. Appl. No. 16/528,265, filed Jul. 31, 2019, 18 pages.
Non-Final Office Action dated Sep. 29, 2020, issued in connection with U.S. Appl. No. 16/402,617, filed May 3, 2019, 12 pages.
Non-Final Office Action dated Dec. 3, 2020, issued in connection with U.S. Appl. No. 16/145,275, filed Sep. 28, 2018, 11 pages.
Non-Final Office Action dated Jul. 3, 2019, issued in connection with U.S. Appl. No. 15/948,541, filed Apr. 9, 2018, 7 pages.
Non-Final Office Action dated May 3, 2019, issued in connection with U.S. Appl. No. 16/178,122, filed Nov. 1, 2018, 14 pages.
Non-Final Office Action dated Oct. 3, 2018, issued in connection with U.S. Appl. No. 16/102,153, filed Aug. 13, 2018, 20 pages.
Non-Final Office Action dated Apr. 30, 2019, issued in connection with U.S. Appl. No. 15/718,521, filed Sep. 28, 2017, 39 pages.
Non-Final Office Action dated Jun. 30, 2017, issued in connection with U.S. Appl. No. 15/277,810, filed Sep. 27, 2016, 13 pages.
Non-Final Office Action dated Apr. 4, 2019, issued in connection with U.S. Appl. No. 15/718,911, filed Sep. 28, 2017, 21 pages.
Non-Final Office Action dated Aug. 4, 2020, issued in connection with U.S. Appl. No. 16/600,644, filed Oct. 14, 2019, 30 pages.
Non-Final Office Action dated Jan. 4, 2019, issued in connection with U.S. Appl. No. 15/948,541, filed Apr. 9, 2018, 6 pages.
Non-Final Office Action dated Apr. 6, 2020, issued in connection with U.S. Appl. No. 16/424,825, filed May 29, 2019, 22 pages.
Non-Final Office Action dated Feb. 6, 2018, issued in connection with U.S. Appl. No. 15/211,689, filed Jul. 15, 2016, 32 pages.
Non-Final Office Action dated Feb. 6, 2018, issued in connection with U.S. Appl. No. 15/237,133, filed Aug. 15, 2016, 6 pages.
Non-Final Office Action dated Jan. 6, 2021, issued in connection with U.S. Appl. No. 16/439,046, filed Jun. 12, 2019, 13 pages.
Non-Final Office Action dated Mar. 6, 2020, issued in connection with U.S. Appl. No. 16/141,875, filed Sep. 25, 2018, 8 pages.
Non-Final Office Action dated Sep. 6, 2017, issued in connection with U.S. Appl. No. 15/131,254, filed Apr. 18, 2016, 13 pages.
Non-Final Office Action dated Sep. 6, 2018, issued in connection with U.S. Appl. No. 15/098,760, filed Apr. 14, 2016, 29 pages.
Non-Final Office Action dated Sep. 8, 2020, issued in connection with U.S. Appl. No. 15/936,177, filed Mar. 26, 2018, 19 pages.
Non-Final Office Action dated Apr. 9, 2018, issued in connection with U.S. Appl. No. 15/804,776, filed Nov. 6, 2017, 18 pages.
Advisory Action dated Jun. 10, 2020, issued in connection with U.S. Appl. No. 15/936,177, filed Mar. 26, 2018, 4 pages.
Advisory Action dated Apr. 23, 2021, issued in connection with U.S. Appl. No. 16/219,702, filed Dec. 13, 2018, 3 pages.
Advisory Action dated Apr. 24, 2020, issued in connection with U.S. Appl. No. 15/948,541, filed Apr. 9, 2018, 4 pages.
Advisory Action dated Jun. 28, 2018, issued in connection with U.S. Appl. No. 15/438,744, filed Feb. 21, 2017, 3 pages.
Advisory Action dated Dec. 31, 2018, issued in connection with U.S. Appl. No. 15/804,776, filed Nov. 6, 2017, 4 pages.
Advisory Action dated Jun. 9, 2020, issued in connection with U.S. Appl. No. 16/145,275, filed Sep. 28, 2018, 3 pages.
Anonymous,. S Voice or Google Now—The Lowdown. Apr. 28, 2015, 9 pages. [online], [retrieved on Nov. 29, 2017]. Retrieved from the Internet (URL:http://web.archive.org/web/20160807040123/http://lowdown.carphonewarehouse.com/news/s-voice-or-google-now/29958/).
Anonymous: "What are the function of 4 Microphones on iPhone 6S/6S+?", ETrade Supply, Dec. 24, 2015, XP055646381, Retrieved from the Internet: URL:https://www.etradesupply.com/blog/4-microphones-iphone-6s6s-for/ [retrieved on Nov. 26, 2019].
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Australian Patent Office, Australian Examination Report Action dated Apr. 14, 2020, issued in connection with Australian Application No. 2019202257, 3 pages.
Australian Patent Office, Australian Examination Report Action dated Oct. 3, 2019, issued in connection with Australian Application No. 2018230932, 3 pages.
Australian Patent Office, Australian Examination Report Action dated Apr. 7, 2021, issued in connection with Australian Application No. 2019333058, 2 pages.
Australian Patent Office, Australian Examination Report Action dated Aug. 7, 2020, issued in connection with Australian Application No. 2019236722, 4 pages.
Australian Patent Office, Examination Report dated Jun. 28, 2021, issued in connection with Australian Patent Application No. 2019395022, 2 pages.
Australian Patent Office, Examination Report dated Oct. 30, 2018, issued in connection with Australian Application No. 2017222436, 3 pages.
"Automatic Parameter Tying in Neural Networks" ICLR 2018, 14 pages.
Bertrand et al. "Adaptive Distributed Noise Reduction for Speech Enhancement in Wireless Acoustic Sensor Networks" Jan. 2010, 4 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Canadian Patent Office, Canadian Examination Report dated Mar. 9, 2021, issued in connection with Canadian Application No. 3067776, 5 pages.
Canadian Patent Office, Canadian Office Action dated Nov. 14, 2018, issued in connection with Canadian Application No. 3015491, 3 pages.
Chinese Patent Office, Chinese Office Action and Translation dated Jul. 2, 2021, issued in connection with Chinese Application No. 201880077216.4, 22 pages.
Chinese Patent Office, Chinese Office Action and Translation dated Mar. 30, 2021, issued in connection with Chinese Application No. 202010302650.7, 15 pages.
Chinese Patent Office, First Office Action and Translation dated Mar. 20, 2019, issued in connection with Chinese Application No. 201780025028.2, 18 pages.
Chinese Patent Office, First Office Action and Translation dated Mar. 27, 2019, issued in connection with Chinese Application No. 201780025029.7, 9 pages.
Chinese Patent Office, First Office Action and Translation dated May 27, 2021, issued in connection with Chinese Application No. 201880026360.5, 15 pages.
Chinese Patent Office, First Office Action and Translation dated Dec. 28, 2020, issued in connection with Chinese Application No. 201880072203.8, 11 pages.
Chinese Patent Office, First Office Action and Translation dated Nov. 5, 2019, issued in connection with Chinese Application No. 201780072651.3, 19 pages.
Chinese Patent Office, First Office Action dated Feb. 28, 2020, issued in connection with Chinese Application No. 201780061543.6, 29 pages.
Chinese Patent Office, Second Office Action and Translation dated May 11, 2020, issued in connection with Chinese Application No. 201780061543.6, 17 pages.
Chinese Patent Office, Second Office Action and Translation dated Jul. 18, 2019, issued in connection with Chinese Application No. 201780025029.7, 14 pages.
Chinese Patent Office, Second Office Action and Translation dated Sep. 23, 2019, issued in connection with Chinese Application No. 201780025028.2, 15 pages.
Chinese Patent Office, Second Office Action and Translation dated Mar. 31, 2020, issued in connection with Chinese Application No. 201780072651.3, 17 pages.

(56) References Cited

OTHER PUBLICATIONS

Chinese Patent Office, Third Office Action and Translation dated Sep. 16, 2019, issued in connection with Chinese Application No. 201780025029.7, 14 pages.
Chinese Patent Office, Third Office Action and Translation dated Aug. 5, 2020, issued in connection with Chinese Application No. 201780072651.3, 10 pages.
Chinese Patent Office, Translation of Office Action dated Jul. 18, 2019, issued in connection with Chinese Application No. 201780025029.7, 8 pages.
Cipriani,. The complete list of OK, Google commands—CNET. Jul. 1, 2016, 5 pages. [online], [retrieved on Jan. 15, 2020]. Retrieved from the Internet: (URL:https://web.archive.org/web/20160803230926/https://www.cnet.com/how-to/complete-list-of-ok-google--commands/).
Corrected Notice of Allowability dated Mar. 8, 2017, issued in connection with U.S. Appl. No. 15/229,855, filed Aug. 5, 2016, 6 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European EPC Article 94.3 dated Feb. 23, 2021, issued in connection with European Application No. 17200837.7, 8 pages.
European Patent Office, European EPC Article 94.3 dated Feb. 26, 2021, issued in connection with European Application No. 18789515.6, 8 pages.
European Patent Office, European Extended Search Report dated Nov. 25, 2020, issued in connection with European Application No. 20185599.6, 9 pages.
European Patent Office, European Extended Search Report dated Feb. 3, 2020, issued in connection with European Application No. 19197116.7, 9 pages.
European Patent Office, European Extended Search Report dated Jan. 3, 2019, issued in connection with European Application No. 177570702, 8 pages.
European Patent Office, European Extended Search Report dated Jan. 3, 2019, issued in connection with European Application No. 17757075.1, 9 pages.
European Patent Office, European Extended Search Report dated Oct. 30, 2017, issued in connection with EP Application No. 17174435.2, 11 pages.
Notice of Allowance dated Jul. 18, 2019, issued in connection with U.S. Appl. No. 15/721,141, filed Sep. 29, 2017, 8 pages.
Notice of Allowance dated Mar. 18, 2021, issued in connection with U.S. Appl. No. 16/177,185, filed Oct. 31, 2018, 8 pages.
Notice of Allowance dated Aug. 19, 2020, issued in connection with U.S. Appl. No. 16/271,560, filed Feb. 8, 2019, 9 pages.
Notice of Allowance dated Dec. 19, 2018, issued in connection with U.S. Appl. No. 15/818,051, filed Nov. 20, 2017, 9 pages.
Notice of Allowance dated Jul. 19, 2018, issued in connection with U.S. Appl. No. 15/681,937, filed Aug. 21, 2017, 7 pages.
Notice of Allowance dated Mar. 19, 2021, issued in connection with U.S. Appl. No. 17/157,686, filed Jan. 25, 2021, 11 pages.
Notice of Allowance dated Aug. 2, 2019, issued in connection with U.S. Appl. No. 16/102,650, filed Aug. 13, 2018, 5 pages.
Notice of Allowance dated Dec. 2, 2020, issued in connection with U.S. Appl. No. 15/989,715, filed May 25, 2018, 11 pages.
Notice of Allowance dated Sep. 2, 2020, issued in connection with U.S. Appl. No. 16/214,711, filed Dec. 10, 2018, 9 pages.
Notice of Allowance dated Jul. 20, 2020, issued in connection with U.S. Appl. No. 15/984,073, filed May 18, 2018, 12 pages.
Notice of Allowance dated Mar. 20, 2018, issued in connection with U.S. Appl. No. 15/784,952, filed Oct. 16, 2017, 7 pages.
Notice of Allowance dated Sep. 20, 2018, issued in connection with U.S. Appl. No. 15/946,599, filed Apr. 5, 2018, 7 pages.
Notice of Allowance dated Apr. 21, 2021, issued in connection with U.S. Appl. No. 16/145,275, filed Sep. 28, 2018, 8 pages.
Notice of Allowance dated Feb. 21, 2020, issued in connection with U.S. Appl. No. 16/416,752, filed May 20, 2019, 6 pages.
Notice of Allowance dated Jan. 21, 2020, issued in connection with U.S. Appl. No. 16/672,764, filed Nov. 4, 2019, 10 pages.
Notice of Allowance dated Jan. 21, 2021, issued in connection with U.S. Appl. No. 16/600,644, filed Oct. 14, 2019, 7 pages.
Notice of Allowance dated Oct. 21, 2019, issued in connection with U.S. Appl. No. 15/946,585, filed Apr. 5, 2018, 5 pages.
Notice of Allowance dated Aug. 22, 2017, issued in connection with U.S. Appl. No. 15/273,679, filed Sep. 22, 2016, 5 pages.
Notice of Allowance dated Jan. 22, 2018, issued in connection with U.S. Appl. No. 15/178,180, filed Jun. 9, 2016, 9 pages.
Notice of Allowance dated Jul. 22, 2020, issued in connection with U.S. Appl. No. 16/131,409, filed Sep. 14, 2018, 13 pages.
Notice of Allowance dated Jul. 22, 2020, issued in connection with U.S. Appl. No. 16/790,621, filed Feb. 13, 2020, 10 pages.
Notice of Allowance dated Jun. 23, 2021, issued in connection with U.S. Appl. No. 16/814,844, filed Mar. 10, 2020, 8 pages.
Notice of Allowance dated Apr. 24, 2019, issued in connection with U.S. Appl. No. 16/154,469, filed Oct. 8, 2018, 5 pages.
Notice of Allowance dated Aug. 26, 2020, issued in connection with U.S. Appl. No. 15/948,541, filed Apr. 9, 2018, 9 pages.
Notice of Allowance dated May 26, 2021, issued in connection with U.S. Appl. No. 16/927,670, filed Jul. 13, 2020, 10 pages.
Notice of Allowance dated Apr. 27, 2020, issued in connection with U.S. Appl. No. 16/700,607, filed Dec. 2, 2019, 10 pages.
Notice of Allowance dated Mar. 27, 2019, issued in connection with U.S. Appl. No. 16/214,666, filed Dec. 10, 2018, 6 pages.
Notice of Allowance dated Mar. 28, 2018, issued in connection with U.S. Appl. No. 15/699,982, filed Sep. 8, 2017, 17 pages.
Notice of Allowance dated May 28, 2021, issued in connection with U.S. Appl. No. 16/524,306, filed Jul. 29, 2019, 9 pages.
Notice of Allowance dated Dec. 29, 2017, issued in connection with U.S. Appl. No. 15/131,776, filed Apr. 18, 2016, 13 pages.
Notice of Allowance dated Jan. 29, 2021, issued in connection with U.S. Appl. No. 16/290,599, filed Mar. 1, 2019, 9 pages.
Notice of Allowance dated Jun. 29, 2020, issued in connection with U.S. Appl. No. 16/216,357, filed Dec. 11, 2018, 8 pages.
Notice of Allowance dated Mar. 29, 2021, issued in connection with U.S. Appl. No. 16/600,949, filed Oct. 14, 2019, 9 pages.
Notice of Allowance dated May 29, 2020, issued in connection with U.S. Appl. No. 16/148,879, filed Oct. 1, 2018, 6 pages.
Notice of Allowance dated Apr. 3, 2019, issued in connection with U.S. Appl. No. 16/160,107, filed Oct. 15, 2018, 7 pages.
Notice of Allowance dated Jun. 3, 2021, issued in connection with U.S. Appl. No. 16/876,493, filed May 18, 2020, 7 pages.
Notice of Allowance dated Jul. 30, 2018, issued in connection with U.S. Appl. No. 15/098,718, filed Apr. 14, 2016, 5 pages.
Notice of Allowance dated Jul. 30, 2019, issued in connection with U.S. Appl. No. 15/131,254, filed Apr. 18, 2016, 9 pages.
Notice of Allowance dated Mar. 30, 2020, issued in connection with U.S. Appl. No. 15/973,413, filed May 7, 2018, 5 pages.
Notice of Allowance dated Nov. 30, 2018, issued in connection with U.S. Appl. No. 15/438,725, filed Feb. 21, 2017, 5 pages.
Notice of Allowance dated Oct. 30, 2019, issued in connection with U.S. Appl. No. 16/131,392, filed Sep. 14, 2018, 9 pages.
Notice of Allowance dated Oct. 30, 2020, issued in connection with U.S. Appl. No. 16/528,016, filed Jul. 31, 2019, 10 pages.
Notice of Allowance dated May 31, 2019, issued in connection with U.S. Appl. No. 15/717,621, filed Sep. 27, 2017, 9 pages.
Notice of Allowance dated Jun. 4, 2021, issued in connection with U.S. Appl. No. 16/528,265, filed Jul. 31, 2019, 17 pages.
Notice of Allowance dated Mar. 4, 2020, issued in connection with U.S. Appl. No. 16/444,975, filed Jun. 18, 2019, 10 pages.
Notice of Allowance dated Feb. 5, 2020, issued in connection with U.S. Appl. No. 16/178,122, filed Nov. 1, 2018, 9 pages.
Notice of Allowance dated Oct. 5, 2018, issued in connection with U.S. Appl. No. 15/211,748, filed Jul. 15, 2018, 10 pages.
Notice of Allowance dated Feb. 6, 2019, issued in connection with U.S. Appl. No. 16/102,153, filed Aug. 13, 2018, 9 pages.
Notice of Allowance dated Feb. 6, 2020, issued in connection with U.S. Appl. No. 16/227,308, filed Dec. 20, 2018, 7 pages.

(56) References Cited

OTHER PUBLICATIONS

Notice of Allowance dated Apr. 7, 2020, issued in connection with U.S. Appl. No. 15/098,760, filed Apr. 14, 2016, 7 pages.
Non-Final Office Action dated Apr. 23, 2021, issued in connection with U.S. Appl. No. 16/660,197, filed Oct. 22, 2019, 9 pages.
Non-Final Office Action dated Jun. 25, 2021, issued in connection with U.S. Appl. No. 16/213,570, filed Dec. 7, 2018, 11 pages.
Non-Final Office Action dated Jul. 8, 2021, issued in connection with U.S. Appl. No. 16/813,643, filed Mar. 9, 2020, 12 pages.
Non-Final Office Action dated Dec. 9, 2020, issued in connection with U.S. Appl. No. 16/271,550, filed Feb. 8, 2019, 35 pages.
Non-Final Office Action dated Jul. 9, 2021, issued in connection with U.S. Appl. No. 16/806,747, filed Mar. 2, 2020, 18 pages.
Non-Final Office Action dated Jun. 1, 2017, issued in connection with U.S. Appl. No. 15/223,218, filed Jul. 29, 2016, 7 pages.
Non-Final Office Action dated Nov. 2, 2017, issued in connection with U.S. Appl. No. 15/584,782, filed May 2, 2017, 11 pages.
Non-Final Office Action dated Nov. 3, 2017, issued in connection with U.S. Appl. No. 15/438,741, filed Feb. 21, 2017, 11 pages.
Non-Final Office Action dated Nov. 4, 2019, issued in connection with U.S. Appl. No. 16/022,662, filed Jun. 28, 2018, 16 pages.
Non-Final Office Action dated Sep. 5, 2019, issued in connection with U.S. Appl. No. 16/416,752, filed May 20, 2019, 14 pages.
Non-Final Office Action dated Feb. 7, 2017, issued in connection with U.S. Appl. No. 15/131,244, filed Apr. 18, 2016, 12 pages.
Non-Final Office Action dated Feb. 8, 2017, issued in connection with U.S. Appl. No. 15/098,892, filed Apr. 14, 2016, 17 pages.
Non-Final Office Action dated Mar. 9, 2017, issued in connection with U.S. Appl. No. 15/098,760, filed Apr. 14, 2016, 13 pages.
Non-Final Office Action dated Oct. 9, 2019, issued in connection with U.S. Appl. No. 15/936,177, filed Mar. 26, 2018, 16 pages.
Non-Final Office Action dated Jul. 1, 2020, issued in connection with U.S. Appl. No. 16/138,111, filed Sep. 21, 2018, 14 pages.
Non-Final Office Action dated Jan. 10, 2018, issued in connection with U.S. Appl. No. 15/098,718, filed Apr. 14, 2016, 15 pages.
Non-Final Office Action dated Jan. 10, 2018, issued in connection with U.S. Appl. No. 15/229,868, filed Aug. 5, 2016, 13 pages.
Non-Final Office Action dated Jan. 10, 2018, issued in connection with U.S. Appl. No. 15/438,725, filed Feb. 21, 2017, 15 pages.
Non-Final Office Action dated Sep. 10, 2018, issued in connection with U.S. Appl. No. 15/670,361, filed Aug. 7, 2017, 17 pages.
Non-Final Office Action dated Feb. 11, 2021, issued in connection with U.S. Appl. No. 16/876,493, filed May 18, 2020, 16 pages.
Non-Final Office Action dated Mar. 11, 2021, issued in connection with U.S. Appl. No. 16/834,483, filed Mar. 30, 2020, 11 pages.
Non-Final Office Action dated Oct. 11, 2019, issued in connection with U.S. Appl. No. 16/177,185, filed Oct. 31, 2018, 14 pages.
Non-Final Office Action dated Sep. 11, 2020, issued in connection with U.S. Appl. No. 15/989,715, filed May 25, 2018, 8 pages.
Non-Final Office Action dated Sep. 11, 2020, issued in connection with U.S. Appl. No. 16/219,702, filed Dec. 13, 2018, 9 pages.
Non-Final Office Action dated Apr. 12, 2021, issued in connection with U.S. Appl. No. 16/528,224, filed Jul. 31, 2019, 9 pages.
Non-Final Office Action dated Dec. 12, 2016, issued in connection with U.S. Appl. No. 15/098,718, filed Apr. 14, 2016, 11 pages.
Non-Final Office Action dated Feb. 12, 2019, issued in connection with U.S. Appl. No. 15/670,361, filed Aug. 7, 2017, 13 pages.
Non-Final Office Action dated Jan. 13, 2017, issued in connection with U.S. Appl. No. 15/098,805, filed Apr. 14, 2016, 11 pages.
Non-Final Office Action dated Nov. 13, 2018, issued in connection with U.S. Appl. No. 15/717,621, filed Sep. 27, 2017, 23 pages.
Non-Final Office Action dated Nov. 13, 2018, issued in connection with U.S. Appl. No. 16/160,107, filed Oct. 15, 2018, 8 pages.
Non-Final Office Action dated Nov. 13, 2019, issued in connection with U.S. Appl. No. 15/984,073, filed May 18, 2018, 18 pages.
Non-Final Office Action dated May 14, 2020, issued in connection with U.S. Appl. No. 15/948,541, filed Apr. 9, 2018, 8 pages.
Non-Final Office Action dated Sep. 14, 2017, issued in connection with U.S. Appl. No. 15/178,180, filed Jun. 9, 2016, 16 pages.
Non-Final Office Action dated Sep. 14, 2018, issued in connection with U.S. Appl. No. 15/959,907, filed Apr. 23, 2018, 15 pages.
Non-Final Office Action dated Apr. 15, 2020, issued in connection with U.S. Appl. No. 16/138,111, filed Sep. 21, 2018, 15 pages.
Non-Final Office Action dated Dec. 15, 2020, issued in connection with U.S. Appl. No. 17/087,423, filed Nov. 2, 2020, 7 pages.
Non-Final Office Action dated Jan. 15, 2019, issued in connection with U.S. Appl. No. 16/173,797, filed Oct. 29, 2018, 6 pages.
Non-Final Office Action dated Nov. 15, 2019, issued in connection with U.S. Appl. No. 16/153,530, filed Oct. 5, 2018, 17 pages.
Non-Final Office Action dated Mar. 16, 2018, issued in connection with U.S. Appl. No. 15/681,937, filed Aug. 21, 2017, 5 pages.
Non-Final Office Action dated Oct. 16, 2018, issued in connection with U.S. Appl. No. 15/131,254, filed Apr. 18, 2016, 16 pages.
Non-Final Office Action dated Sep. 17, 2020, issued in connection with U.S. Appl. No. 16/600,949, filed Oct. 14, 2019, 29 pages.
Non-Final Office Action dated Apr. 18, 2018, issued in connection with U.S. Appl. No. 15/811,468, filed Nov. 13, 2017, 14 pages.
Non-Final Office Action dated Jan. 18, 2019, issued in connection with U.S. Appl. No. 15/721,141, filed Sep. 29, 2017, 18 pages.
Non-Final Office Action dated Oct. 18, 2019, issued in connection with U.S. Appl. No. 15/098,760, filed Apr. 14, 2016, 27 pages.
Non-Final Office Action dated Sep. 18, 2019, issued in connection with U.S. Appl. No. 16/179,779, filed Nov. 2, 2018, 14 pages.
Non-Final Office Action dated Apr. 19, 2017, issued in connection with U.S. Appl. No. 15/131,776, filed Apr. 18, 2016, 12 pages.
Non-Final Office Action dated Dec. 19, 2019, issued in connection with U.S. Appl. No. 16/147,710, filed Sep. 29, 2018, 10 pages.
Non-Final Office Action dated Feb. 19, 2020, issued in connection with U.S. Appl. No. 16/148,879, filed Oct. 1, 2018, 15 pages.
Non-Final Office Action dated Sep. 2, 2020, issued in connection with U.S. Appl. No. 16/290,599, filed Mar. 1, 2019, 17 pages.
Non-Final Office Action dated Feb. 20, 2018, issued in connection with U.S. Appl. No. 15/211,748, filed Jul. 15, 2016, 31 pages.
Freiberger, Kari, "Development and Evaluation of Source Localization Algorithms for Coincident Microphone Arrays," Diploma Thesis, Apr. 1, 2010, 106 pages.
Giacobello et al. "A Sparse Nonuniformly Partitioned Multidelay Filter for Acoustic Echo Cancellation," 2013, IEEE Workshop on Applications of Signal Processing to Audio and Acoustics, Oct. 2013, New Paltz, NY, 4 pages.
Giacobello et al. "Tuning Methodology for Speech Enhancement Algorithms using a Simulated Conversational Database and Perceptual Objective Measures," 2014, 4th Joint Workshop on Hands-free Speech Communication and Microphone Arrays HSCMA, 2014, 5 pages.
Han et al. "Deep Compression: Compressing Deep Neural Networks with Pruning, Trained Quantization and Huffman Coding." ICLR 2016, Feb. 15, 2016, 14 pages.
Hans Speidel: "Chatbot Training: How to use training data to provide fully automated customer support", Jun. 29, 2017, pp. 1-3, XP055473185, Retrieved from the Internet: URL:https://www.crowdguru.de/wp-content/uploads/Case-Study-Chatbot-training-How-to-use-training-data-to-provide-fully-automated-customer-support.pdf [retrieved on May 7, 2018].
Helwani et al "Source-domain adaptive filtering for MIMO systems with application to acoustic echo cancellation", Acoustics Speech and Signal Processing, 2010 IEEE International Conference, Mar. 14, 2010, 4 pages.
Hirano et al. "A Noise-Robust Stochastic Gradient Algorithm with an Adaptive Step-Size Suitable for Mobile Hands-Free Telephones," 1995, International Conference on Acoustics, Speech, and Signal Processing, vol. 2, 4 pages.
Indian Patent Office, Examination Report dated May 24, 2021, issued in connection with Indian Patent Application No. 201847035595, 6 pages.
Indian Patent Office, Examination Report dated Feb. 25, 2021, issued in connection with Indian Patent Application No. 201847035625, 6 pages.
International Bureau, International Preliminary Report on Patentability and Written Opinion, dated Apr. 1, 2021, issued in connection with International Application No. PCT/US2019/052129, filed on Sep. 20, 2019, 13 pages.

(56) References Cited

OTHER PUBLICATIONS

International Bureau, International Preliminary Report on Patentability and Written Opinion, dated Jul. 1, 2021, issued in connection with International Application No. PCT/US2019/067576, filed on Dec. 19, 2019, 8 pages.
International Bureau, International Preliminary Report on Patentability and Written Opinion, dated Dec. 10, 2020, issued in connection with International Application No. PCT/US2019/033945, filed on May 25, 2018, 7 pages.
International Bureau, International Preliminary Report on Patentability and Written Opinion, dated Apr. 15, 2021, issued in connection with International Application No. PCT/US2019/054332, filed on Oct. 2, 2019, 9 pages.
International Bureau, International Preliminary Report on Patentability and Written Opinion, dated Mar. 25, 2021, issued in connection with International Application No. PCT/US2019/050852, filed on Sep. 12, 2019, 8 pages.
International Bureau, International Preliminary Report on Patentability and Written Opinion, dated Aug. 27, 2019, issued in connection with International Application No. PCT/US2018/019010, filed on Feb. 21, 2018, 9 pages.
International Bureau, International Preliminary Report on Patentability and Written Opinion, dated Jan. 7, 2021, issued in connection with International Application No. PCT/US2019/039828, filed on Jun. 28, 2019, 11 pages.
International Bureau, International Preliminary Report on Patentability and Written Opinion, dated Apr. 8, 2021, issued in connection with International Application No. PCT/US2019/052654, filed on Sep. 24, 2019, 7 pages.
International Bureau, International Preliminary Report on Patentability and Written Opinion, dated Apr. 8, 2021, issued in connection with International Application No. PCT/US2019/052841, filed on Sep. 25, 2019, 8 pages.
International Bureau, International Preliminary Report on Patentability and Written Opinion, dated Apr. 8, 2021, issued in connection with International Application No. PCT/US2019/053253, filed on Sep. 26, 2019, 10 pages.
International Bureau, International Preliminary Report on Patentability, dated Apr. 11, 2019, issued in connection with International Application No. PCT/US2017/0054063, filed on Sep. 28, 2017, 9 pages.
International Bureau, International Preliminary Report on Patentability, dated Jun. 17, 2021, issued in connection with International Application No. PCT/US2019/064907, filed on Dec. 6, 2019, 8 pages.
International Bureau, International Preliminary Report on Patentability, dated Mar. 2, 2021, issued in connection with International Application No. PCT/US2019/048558, filed on Aug. 28, 2019, 8 pages.
International Bureau, International Preliminary Report on Patentability, dated Feb. 20, 2020, issued in connection with International Application No. PCT/US2018/045397, filed on Aug. 6, 2018, 8 pages.
International Bureau, International Preliminary Report on Patentability, dated Apr. 23, 2019, issued in connection with International Application No. PCT/US2017/057220, filed on Oct. 18, 2017, 7 pages.
International Bureau, International Preliminary Report on Patentability, dated Mar. 31, 2020, issued in connection with International Application No. PCT/US2018053123, filed on Sep. 27, 2018, 12 pages.
International Bureau, International Preliminary Report on Patentability, dated Mar. 31, 2020, issued in connection with International Application No. PCT/US2018053472, filed on Sep. 28, 2018, 8 pages.
International Bureau, International Preliminary Report on Patentability, dated Mar. 31, 2020, issued in connection with International Application No. PCT/US2018053517, filed on Sep. 28, 2018, 10 pages.
International Bureau, International Preliminary Report on Patentability, dated Sep. 7, 2018, issued in connection with International Application No. PCT/US2017/018728, filed on Feb. 21, 2017, 8 pages.
International Bureau, International Preliminary Report on Patentability, dated Sep. 7, 2018, issued in connection with International Application No. PCT/US2017/018739, filed on Feb. 21, 2017, 7 pages.
International Bureau, International Search Report and Written Opinion dated Nov. 10, 2020, issued in connection with International Application No. PCT/US2020/044250, filed on Jul. 30, 2020, 15 pages.
International Bureau, International Search Report and Written Opinion dated Dec. 11, 2019, issued in connection with International Application No. PCT/US2019/052129, filed on Sep. 20, 2019, 18 pages.
International Bureau, International Search Report and Written Opinion dated Nov. 13, 2018, issued in connection with International Application No. PCT/US2018/045397, filed on Aug. 6, 2018, 11 pages.
International Bureau, International Search Report and Written Opinion dated Jan. 14, 2019, issued in connection with International Application No. PCT/US2018053472, filed on Sep. 28, 2018, 10 pages.
International Bureau, International Search Report and Written Opinion dated Jul. 14, 2020, issued in connection with International Application No. PCT/US2020/017150, filed on Feb. 7, 2020, 27 pages.
International Bureau, International Search Report and Written Opinion dated Jul. 17, 2019, issued in connection with International Application No. PCT/US2019/032934, filed on May 17, 2019, 17 pages.
International Bureau, International Search Report and Written Opinion dated Nov. 18, 2019, issued in connection with International Application No. PCT/US2019/048558, filed on Aug. 28, 2019, 11 pages.
International Bureau, International Search Report and Written Opinion dated Nov. 18, 2019, issued in connection with International Application No. PCT/US2019052841, filed on Sep. 25, 2019, 12 pages.
International Bureau, International Search Report and Written Opinion dated Mar. 2, 2020, issued in connection with International Application No. PCT/US2019064907, filed on Dec. 6, 2019, 11 pages.
International Bureau, International Search Report and Written Opinion dated Dec. 20, 2019, issued in connection with International Application No. PCT/US2019052654, filed on Sep. 24, 2019, 11 pages.
International Bureau, International Search Report and Written Opinion dated Sep. 21, 2020, issued in connection with International Application No. PCT/US2020/037229, filed on Jun. 11, 2020, 17 pages.
International Bureau, International Search Report and Written Opinion dated Oct. 22, 2020, issued in connection with International Application No. PCT/US2020/044282, filed on Jul. 30, 2020, 15 pages.
International Bureau, International Search Report and Written Opinion dated Apr. 23, 2021, issued in connection with International Application No. PCT/US2021/070007, filed on Jan. 6, 2021, 11 pages.
International Bureau, International Search Report and Written Opinion dated Jul. 24, 2018, issued in connection with International Application No. PCT/US2018/019010, filed on Feb. 21, 2018, 12 pages.
International Bureau, International Search Report and Written Opinion, dated Feb. 27, 2019, issued in connection with International Application No. PCT/US2018/053123, filed on Sep. 27, 2018, 16 pages.
International Bureau, International Search Report and Written Opinion dated Sep. 27, 2019, issued in connection with International Application No. PCT/US2019/039828, filed on Jun. 28, 2019, 13 pages.

(56) References Cited

OTHER PUBLICATIONS

International Bureau, International Search Report and Written Opinion dated Nov. 29, 2019, issued in connection with International Application No. PCT/US2019/053253, filed on Sep. 29, 2019, 14 pages.
International Bureau, International Search Report and Written Opinion dated Sep. 4, 2019, issued in connection with International Application No. PCT/US2019/033945, filed on May 24, 2019, 8 pages.
International Bureau, International Search Report and Written Opinion dated Dec. 6, 2019, issued in connection with International Application No. PCT/US2019050852, filed on Sep. 12, 2019, 10 pages.
International Bureau, International Search Report and Written Opinion dated Apr. 8, 2020, issued in connection with International Application No. PCT/US2019/067576, filed on Dec. 19, 2019, 12 pages.
International Searching Authority, International Search Report and Written Opinion dated Dec. 19, 2018, in connection with International Application No. PCT/US2018/053517, 13 pages.

* cited by examiner

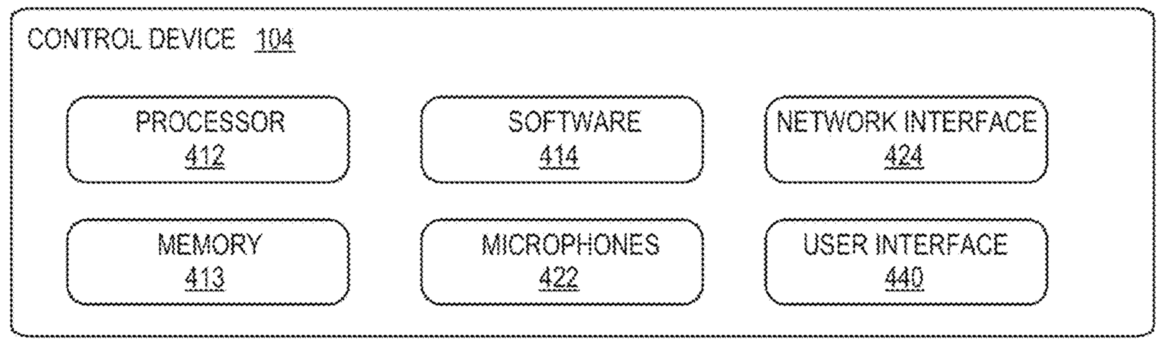
Fig. 4
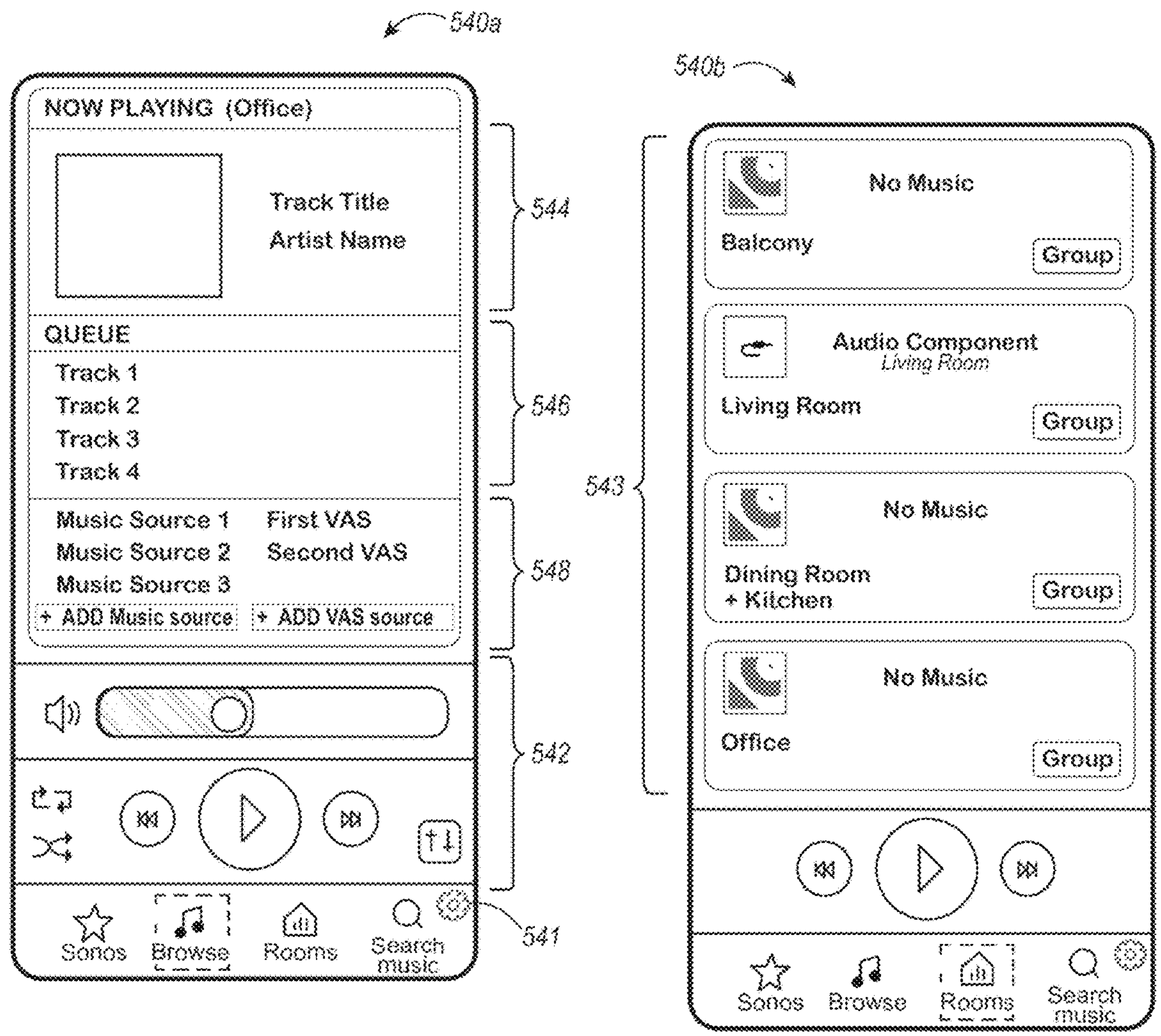
Fig. 5A
Fig. 5B

```
*****SCENARIO 1*****

NEW RECOGNITION DETECTED-----------------------------------

Noise Classifier:
        Noise Classifier Frame Counts - {ambient: 11; fan 12; . . . glass breaking: 127}
        RESULT: Noise Classifier indicates glass breaking

>>trigger=True
```

*Figure 14D*

```
*****SCENARIO 2*****

NEW RECOGNITION DETECTED-----------------------------------

Noise Classifier:
        Likely Zone/Room:
        SPL: High
        Directionality:
        Noise Classifier Frame Counts - {ambient: 11; HVAC 85; faucet: 54}
        RESULT: Noise Classifier indicates faucet

>>Trigger= False
```

*Figure 16*

```
*****SCENARIO 3*****

NEW RECOGNITION DETECTED-----------------------------------

Noise Classifier:
        Likely Zone/Room: Kitchen
        SPL:
        Directionality:
        Noise Classifier Frame Counts - {ambient: 5; microwave 80; faucet: 65}
        RESULT: Noise Classifier indicates microwave

>>Trigger= False
```

*Figure 17*

```
*****SCENARIO 4A*****

NEW RECOGNITION DETECTED--------------------------------------------

Noise Classifier:
        Likely Zone/Room:
        SPL:
        Directionality: dominant polar direction for dominant frame: 134 deg.
        Noise Classifier Frame Counts - {ambient: 11; speech: 40; glass breaking: 121}
        RESULT: Noise Classifier indicates glass breaking

>>Trigger=False
```

*Figure 18A*

```
*****SCENARIO 4B*****

NEW RECOGNITION DETECTED--------------------------------------------

Noise Classifier:
        Likely Zone/Room:
        SPL:
        Directionality: dominant polar direction for dominant frame: 65 deg.
        Noise Classifier Frame Counts - {ambient: 11; speech: 40; glass breaking: 121}
        RESULT: Noise Classifier indicates glass breaking

>>Trigger=True
```

*Figure 18B*

NOISE CLASSIFICATION FOR EVENT DETECTION

CROSS-REFERENCE TO RELATED APPLICATION

The present application is a continuation of U.S. patent application Ser. No. 16/528,016, filed Jul. 31, 2019, which is incorporated herein by reference in its entirety.

FIELD OF DISCLOSURE

The present technology relates to consumer goods and, more particularly, to methods, systems, products, features, services, and other elements directed to voice-assisted control of media playback systems or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 4 is a functional block diagram of an example controller device in accordance with aspects of the disclosure.

FIGS. 5A and 5B are controller interfaces in accordance with aspects of the disclosure.

FIG. 14D shows an exemplary output of an example NMD configured in accordance with aspects of the disclosure.

FIGS. 16-18B show exemplary output of an example NMD configured in accordance with aspects of the disclosure.

Figure 1A:
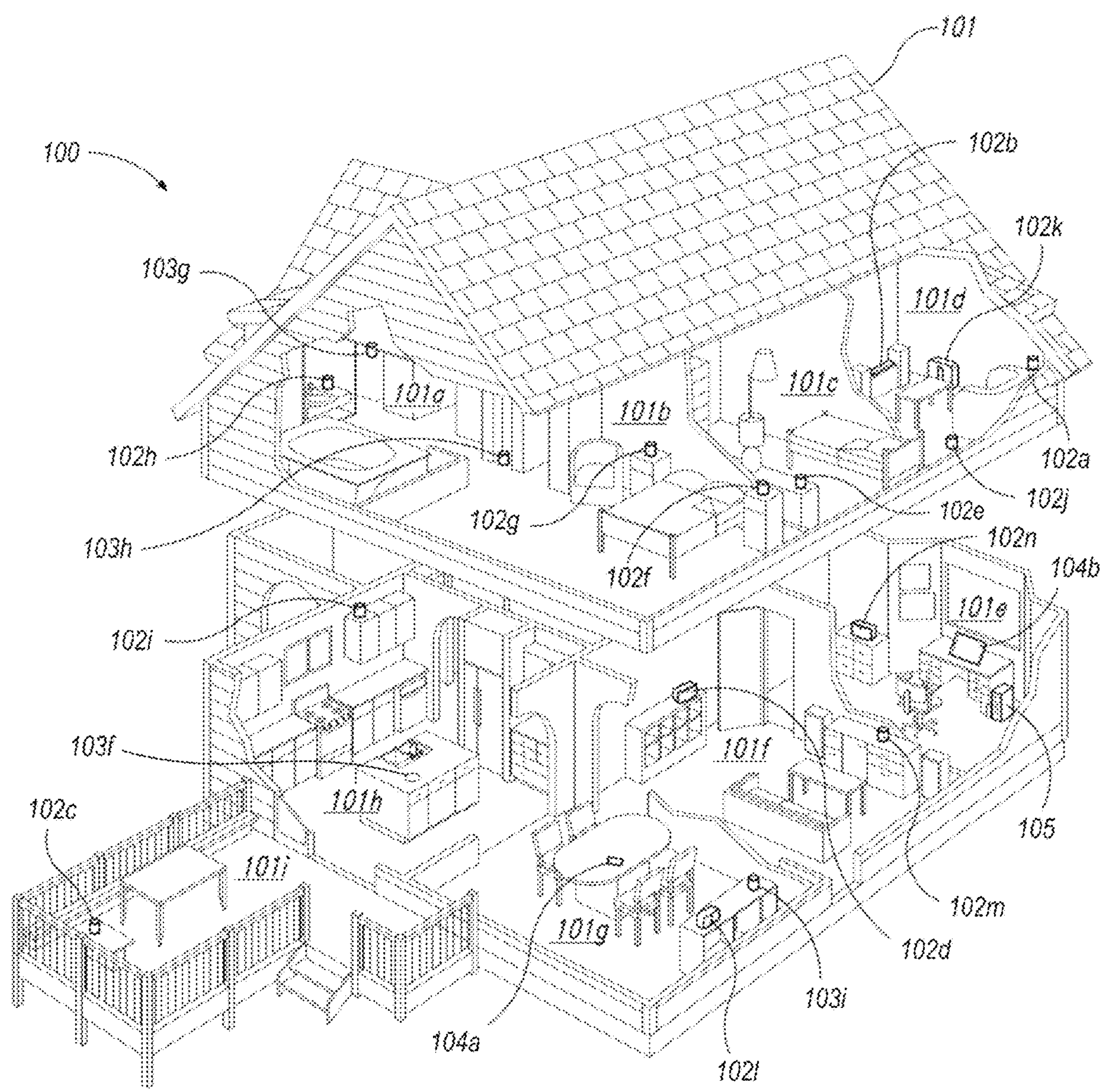
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element **103*a* is first introduced and discussed with reference to FIG. 1**A.

DETAILED DESCRIPTION

I. Overview

Network microphone devices may be used facilitate voice control of smart home devices, such as wireless audio playback devices, illumination devices, appliances, and home-automation devices (e.g., thermostats, door locks, etc.). An NMD is a networked computing device that typically includes an arrangement of microphones, such as a microphone array, that is configured to detect sound present in the NMD's environment. In some examples, an NMD may be implemented within another device, such as an audio playback device.

A voice input to such an NMD will typically include a wake word followed by an utterance comprising a user request. In practice, a wake word is typically a predetermined nonce word or phrase used to "wake up" an NMD and cause it to invoke a particular voice assistant service ("VAS") to interpret the intent of voice input in detected sound. For example, a user might speak the wake word "Alexa" to invoke the AMAZON® VAS, "Ok, Google" to invoke the GOOGLE® VAS, "Hey, Siri" to invoke the APPLE® VAS, or "Hey, Sonos" to invoke a VAS offered by SONOS®, among other examples. In practice, a wake word may also be referred to as, for example, an activation-, trigger-, wakeup-word or -phrase, and may take the form of any suitable word, combination of words (e.g., a particular phrase), and/or some other audio cue.

To identify whether sound detected by the NMD contains a voice input that includes a particular wake word, NMDs often utilize a wake-word engine, which is typically onboard the NMD. The wake-word engine may be configured to identify (i.e., "spot" or "detect") a particular wake word in recorded audio using one or more identification algorithms. Such identification algorithms may include pattern recognition trained to detect the frequency and/or time domain patterns that speaking the wake word creates. This wake-word identification process is commonly referred to as "keyword spotting." In practice, to help facilitate keyword spotting, the NMD may buffer sound detected by a microphone of the NMD and then use the wake-word engine to process that buffered sound to determine whether a wake word is present in the recorded audio.

When a wake-word engine detects a wake word in recorded audio, the NMD may determine that a wake-word event (i.e., a "wake-word trigger") has occurred, which indicates that the NMD has detected sound that includes a potential voice input. The occurrence of the wake-word event typically causes the NMD to perform additional processes involving the detected sound. These additional processes may include extracting detected-sound data from a buffer, among other possible additional processes, such as outputting an alert (e.g., an audible chime and/or a light indicator) indicating that a wake word has been identified. Extracting the detected sound may include reading out and packaging a stream of the detected-sound according to a particular format and transmitting the packaged sound-data to an appropriate VAS for interpretation.

In turn, the VAS corresponding to the wake word that was identified by the wake-word engine receives the transmitted sound data from the NMD over a communication network. A VAS traditionally takes the form of a remote service implemented using one or more cloud servers configured to process voice inputs (e.g., AMAZON's ALEXA, APPLE's SIRI, MICROSOFT's CORTANA, GOOGLE'S ASSISTANT, etc.). In some instances, certain components and functionality of the VAS may be distributed across local and remote devices.

When a VAS receives detected-sound data, the VAS processes this data, which involves identifying the voice input and determining intent of words captured in the voice input. The VAS may then provide a response back to the NMD with some instruction according to the determined intent. Based on that instruction, the NMD may cause one or more smart devices to perform an action. For example, in accordance with an instruction from a VAS, an NMD may cause a playback device to play a particular song or an illumination device to turn on/off, among other examples. In some cases, an NMD, or a media system with NMDs (e.g., a media playback system with NMD-equipped playback devices) may be configured to interact with multiple VASes. In practice, the NMD may select one VAS over another based on the particular wake word identified in the sound detected by the NMD.

In operation, the NMD is exposed to a variety of different types of noise, such as noise generated by traffic, appliances (e.g., fans, sinks, refrigerators, etc.), construction, interfering speech, etc. Certain types of noise can indicate the occurrence of an event requiring the user's attention. For example, the sound of glass breaking may indicate a home intrusion, the sound of running water might indicate a plumbing problem, or the sound of crying might indicate a hungry infant. As described in greater detail below, various techniques and devices disclosed herein are configured to analyze sound in an NMD's environment and detect a predetermined event. In some embodiments, for example, data and/or metadata associated with the sound detected by the NMD may be processed to classify one or more noises in the detected sound. If a type of noise is detected that indicates a predetermined event, the NMD may take an action that causes the user to be notified of the event. For example, in response to detecting an event, the NMD may transmit the metadata associated with the sound—and not the original audio content—to the cloud (e.g., remote servers associated with a VAS) for additional processing. In some instances, the NMD may additionally or alternatively perform a remediating action locally without transmitting any data to a VAS or other remote computing device, such as flashing a light, outputting an audio alert, etc.

To protect user privacy, it can be useful to rely only on sound metadata that does not reveal the original audio content (e.g., the content of recorded speech input or other detected sound data). The NMD can derive the sound metadata from the detected sound data in a manner that renders the original audio signal indecipherable if one only has access to the sound metadata. For example, by limiting the sound metadata to frequency-domain information that is averaged over many sampling frames, rather than time-domain information, the NMD can render the original detected sound data indecipherable via the sound metadata. As such, in some embodiments, the system can detect an event in the environment and act based on the event without infringing on user privacy by sending recorded audio content to the cloud. Likewise, in some embodiments the disclosed event detection systems may only be activated or included with the NMD when opted in by the user.

To decrease the false-positive or false-negative rate of event detection, consideration of certain information associated with the detected sound may be especially beneficial for improving the accuracy of the underlying noise classification. For example, one or more of the sound pressure level, the direction of the noise source relative to the NMD, and the likely zone or room in which the NMD is located may better help distinguish an innocuous noise (such as the sound of glass breaking from a television playing in the room) from a noise associated with a notable and/or atypical event (such as the sound of a window in the room breaking). Additionally or alternatively, additional contemporaneous information or data collected from the surrounding environment may be used to increase confidence in the event detection. For instance, in some embodiments the classification and/or event detection may be based at least in part on measurements provided by one or more sensors (incorporated with or separate from the NMD, such as a temperature sensor, a pressure sensor, and a moisture sensor, amongst others.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

II. Example Operation Environment

Figure 1B:
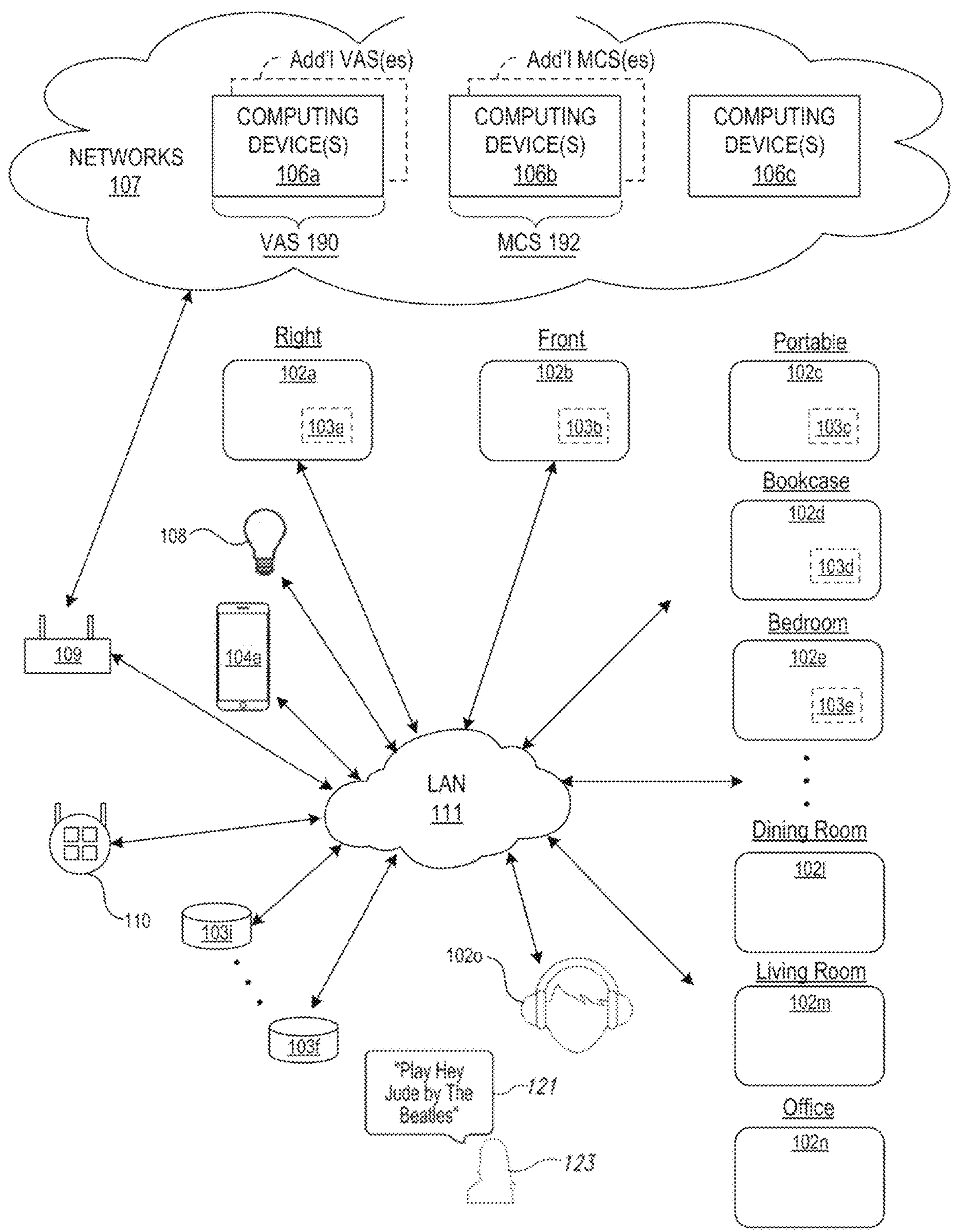
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101*a*, a master bedroom 101*b*, (referred to herein as "Nick's Room"), a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102*a*-102*o*), network microphone devices 103 (identified individually as "NMDs" 103*a*-102*i*), and controller devices 104*a* and 104*b* (collectively "controller devices 104"). Referring to FIG. 1B, the home environment may include additional and/or other computing devices, including local network devices, such as one or more smart illumination devices 108 (FIG. 1B), a smart alarm (not shown), a smart thermostat 110, and a local computing device 105 (FIG. 1A). In embodiments described below, one or more of the various playback devices 102 may be configured as portable playback devices, while others may be configured as stationary playback devices. For example, the headphones 102*o* (FIG. 1B) are a portable playback device, while the playback device 102*d* on the bookcase may be a stationary device. As another example, the playback device 102*c* on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102, 103, and 104 and/or other network devices of the MPS 100 may be coupled to one another via point-to-point connections and/or over other connections, which may be wired and/or wireless, via a network 111, such as a LAN including a network router 109. For example, the playback device 102*j* in the Den 101*d* (FIG. 1A), which may be designated as the "Left" device, may have a point-to-point connection with the playback device 102*a*, which is also in the Den 101*d* and may be designated as the "Right" device. In a related embodiment, the Left playback device 102*j* may communicate with other network devices, such as the playback device 102*b*, which may be designated as the "Front" device, via a point-to-point connection and/or other connections via the NETWORK 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106 are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 102 may take the form of or include an on-board (e.g., integrated) network microphone device. For example, the playback devices 102*a*-*e* include or are otherwise equipped with corresponding NMDs 103*a*-*e*, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103*f* and 103*g* may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102*d* because it is physically situated on a bookcase. Similarly, the NMD 103*f* may be assigned the named "Island" because it is physically situated on an island countertop in the Kitchen 101*h* (FIG. 1A). Some playback devices may be assigned names according to a zone or room, such as the playback devices 102*e*, 102*l*, 102*m*, and 102*n*, which are named "Bedroom," "Dining Room," "Living Room," and "Office," respectively. Further, certain playback devices may have functionally descriptive names. For example, the playback devices 102*a* and 102*b* are assigned the names "Right" and "Front," respectively, because these two devices are configured to provide specific audio channels during media playback in the zone of the Den 101*d* (FIG. 1A). The playback device 102*c* in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the network 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102*d* in the environment 101 (FIG. 1A) is in relatively close proximity to the NMD-equipped Living Room playback device 102*m*, and both devices 102*d* and 102*m* may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103*f* in the Kitchen 101*h* (FIG. 1A) may be assigned to the Dining Room playback device 102*l*, which is in relatively close proximity to the Island NMD 103*f*. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Application No.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the NETWORK 111 (FIG. 1B) may be eliminated and the single playback device 102 and/or the single NMD 103 may communicate directly with the remote computing devices 106-*d*. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
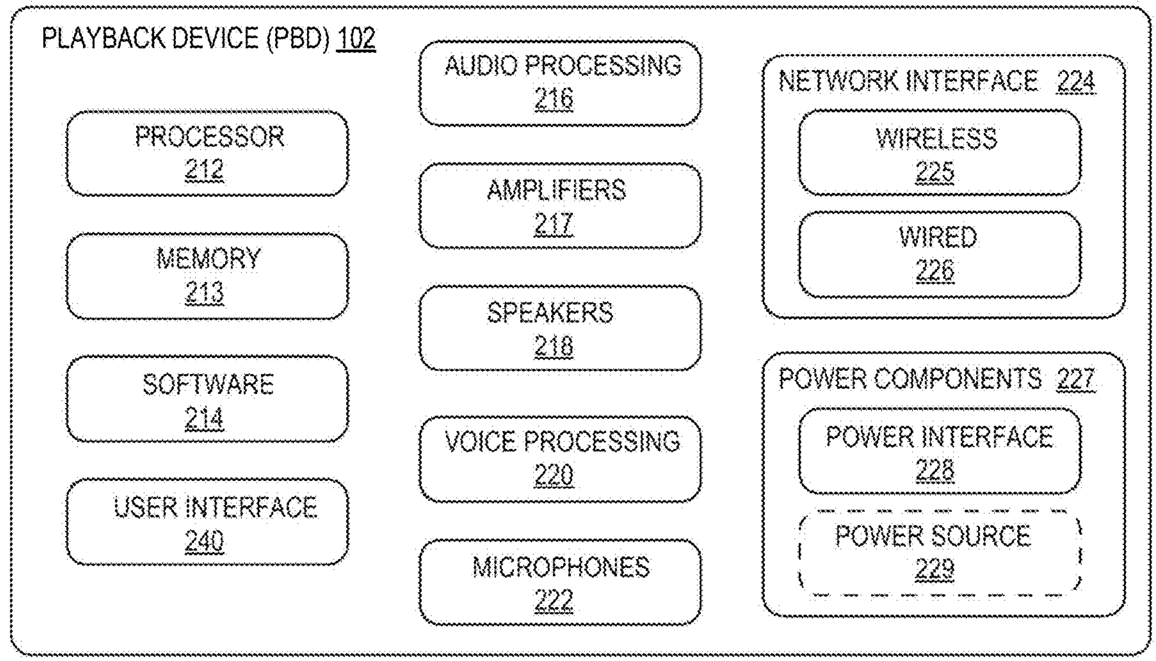
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device (s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212. As described in more detail below, in some embodiments voice processing components 220 can be configured to detect and/or classify noise in input sound data.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
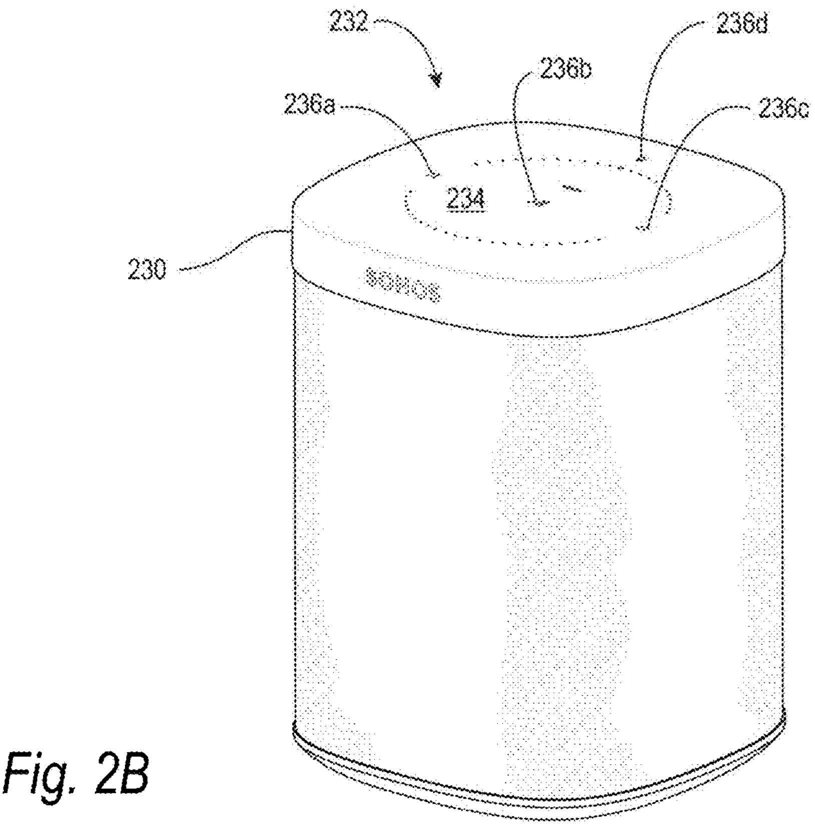
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236*a-c* for controlling audio playback, volume level, and other functions. The control area 232 also includes a button 236*d* for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the MPS 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

Figure 2C:
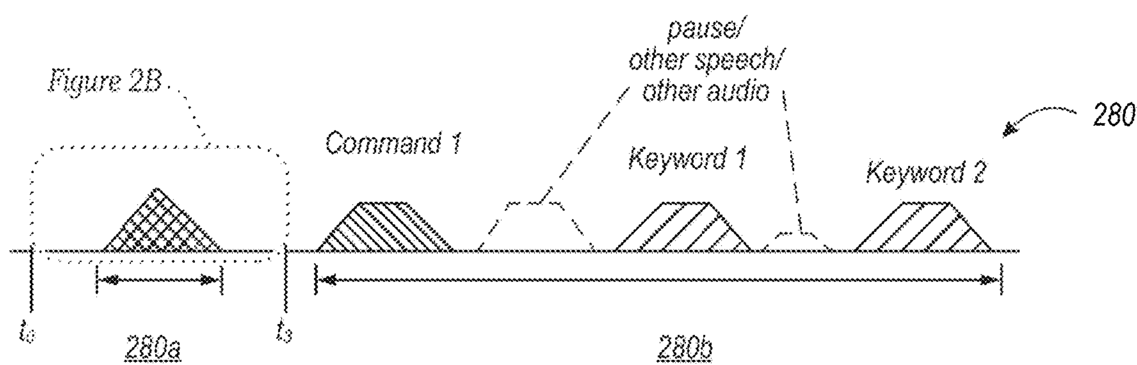
FIG. 2C is a diagram of an example voice input.

FIG. 2C is a diagram of an example voice input 280 that may be processed by an NMD or an NMD-equipped playback device. The voice input 280 may include a keyword portion 280*a* and an utterance portion 280*b*. The keyword portion 280*a* may include a wake word. The utterance portion 280*b* corresponds to detected sound that potentially comprises a user request following the keyword portion 280*a*. An utterance portion 280*b* can be processed to identify the presence of any words in detected-sound data by the NMD in response to the event caused by the keyword portion 280*a*. In various implementations, an underlying intent can be determined based on the words in the utterance portion 280*b*. For example, the words may correspond to one or more commands. A keyword in the voice utterance portion 280*b* may be, for example, a word identifying a particular device or group in the MPS 100. For instance, in the illustrated example, the keywords in the voice utterance portion 280*b* may be one or more words identifying one or more zones in which the music is to be played, such as the Living Room and the Dining Room (FIG. 1A). In some cases, the utterance portion 280*b* may include additional information, such as detected pauses (e.g., periods of non-speech) between words spoken by a user, as shown in FIG. 2C. The pauses may demarcate the locations of separate commands, keywords, or other information spoke by the user within the utterance portion 280*b*.

Based on certain command criteria, the NMD and/or a remote VAS may take actions as a result of identifying one or more commands in the voice input. Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

In some implementations, the MPS 100 is configured to temporarily reduce the volume of audio content that it is playing upon detecting a certain keyword, such as a wake word, in the keyword portion 280*a*. The MPS 100 may restore the volume after processing the voice input 280. Such a process can be referred to as ducking, examples of which are disclosed in U.S. patent application Ser. No. 15/438,749, incorporated by reference herein in its entirety.

Figure 2D:
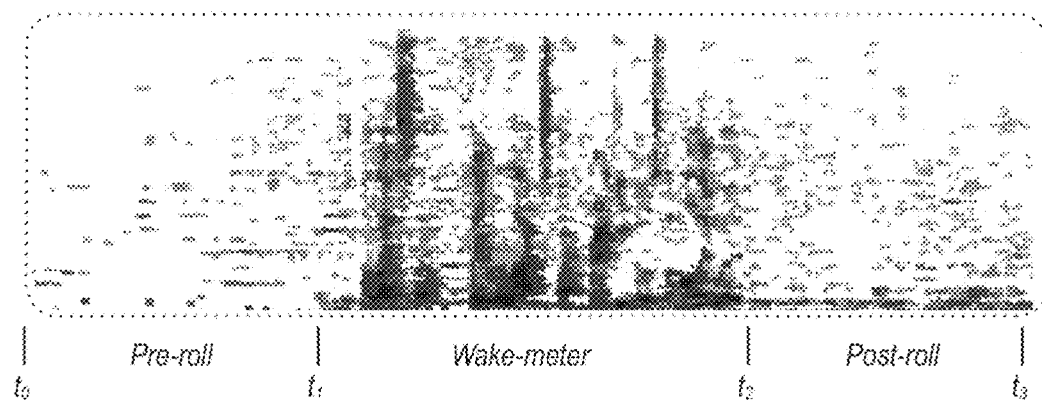
FIG. 2D is a graph depicting an example sound specimen in accordance with aspects of the disclosure.

FIG. 2D shows an example sound specimen. In this example, the sound specimen corresponds to the sound-data stream (e.g., one or more audio frames) associated with a spotted keyword, such as a keyword that is a predetermined wake word, in the keyword portion 280*a* of FIG. 2A. As illustrated, the example sound specimen comprises sound detected in an NMD's environment (i) immediately before a wake or command word was spoken, which may be referred to as a pre-roll portion (between times to and $t_1$), (ii) while a wake or command word was spoken, which may be referred to as a wake-meter portion (between times $t_1$ and $t_2$), and/or (iii) after the wake or command word was spoken, which may be referred to as a post-roll portion (between times $t_2$ and $t_3$). Other sound specimens are also possible. In various implementations, aspects of the sound specimen can be evaluated according to an acoustic model which aims to map mels/spectral features to phonemes in a given language model for further processing. For example, automatic speech recognition may include such mapping for keyword detection. Speech recognition for keyword detection may be tuned to accommodate a wide range of keywords (e.g., 5, 10, 100, 1,000, 10,000 keywords).

b. Example Playback Device Configurations

Figure 3B:
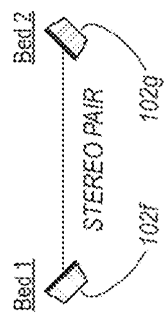
FIGS. 3A, 3B, 3C, 3D and 3E are diagrams showing example playback device configurations in accordance with aspects of the disclosure.
Figure 3C:
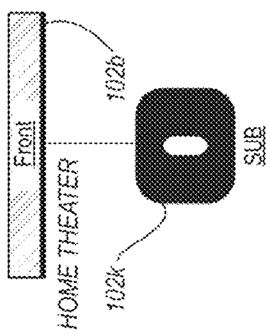
Figure 3D:
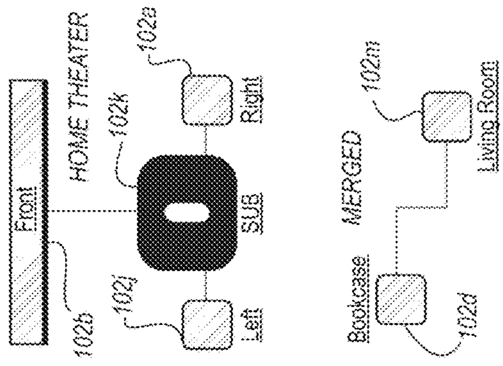
Figure 3E:
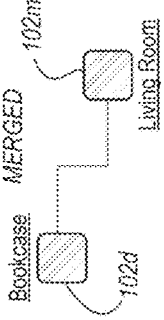
Figure 3A:
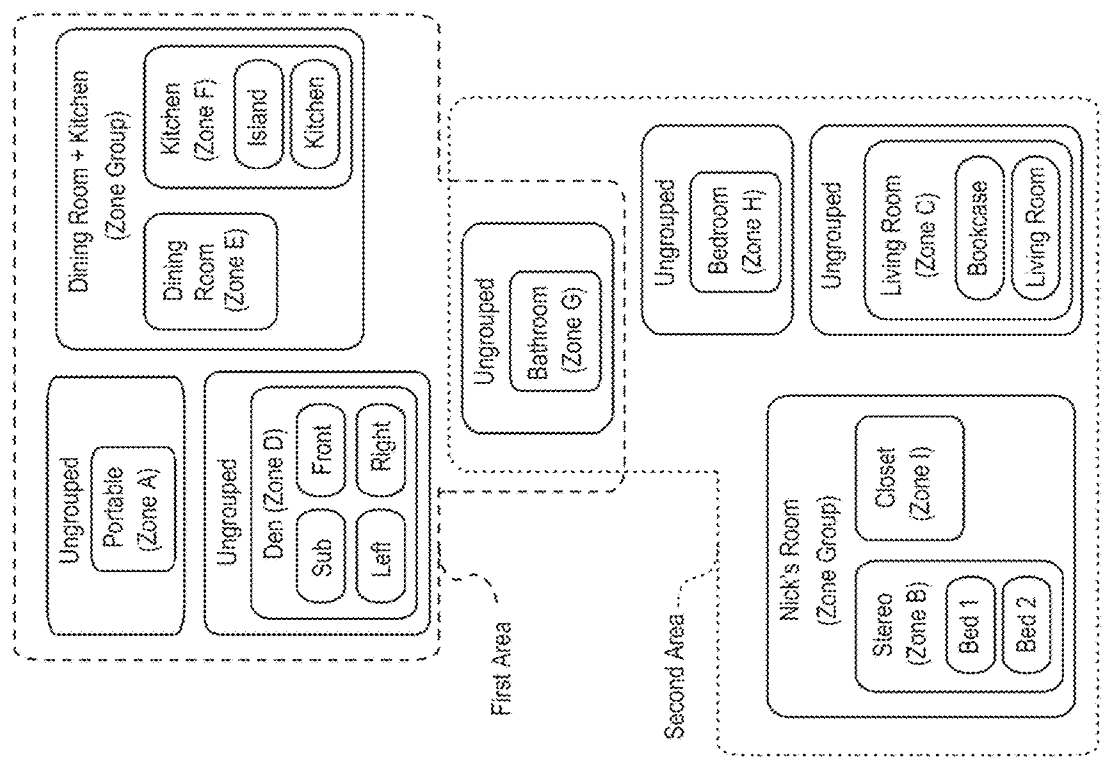

FIGS. 3A-3E show example configurations of playback devices. Referring first to FIG. 3A, in some example instances, a single playback device may belong to a zone. For example, the playback device 102*c* (FIG. 1A) on the Patio may belong to Zone A. In some implementations described below, multiple playback devices may be "bonded" to form a "bonded pair," which together form a single zone. For example, the playback device 102*f* (FIG. 1A) named "Bed 1" in FIG. 3A may be bonded to the playback device 102*g* (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102*d* named "Bookcase" may be merged with the playback device 102*m* named "Living Room" to form a single Zone C. The merged playback devices 102*d* and 102*m* may not be specifically assigned different playback responsibilities. That is, the merged playback devices 102*d* and 102*m* may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102*m* (as shown). In another example, Zone C may instead take on the name of the Bookcase device 102*d*. In a further example, Zone C may take on a name that is some combination of the Bookcase device 102*d* and Living Room device 102*m*. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102*f* in the master bedroom 101*h* (FIG. 1A) and the Bed 2 device may be the playback device 102*g* also in the master bedroom 101*h* (FIG. 1A).

As noted above, playback devices that are bonded may have different playback responsibilities, such as playback responsibilities for certain audio channels. For example, as shown in FIG. 3B, the Bed 1 and Bed 2 devices 102*f* and 102*g* may be bonded so as to produce or enhance a stereo effect of audio content. In this example, the Bed 1 playback device 102*f* may be configured to play a left channel audio component, while the Bed 2 playback device 102*g* may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102*b* named "Front" may be bonded with the playback device 102*k* named "SUB." The Front device 102*b* may render a range of mid to high frequencies, and the SUB device 102*k* may render low frequencies as, for example, a subwoofer. When unbonded, the Front device 102*b* may be configured to render a full range of frequencies. As another example, FIG. 3D shows the Front and SUB devices 102*b* and 102*k* further bonded with Right and Left playback devices 102*a* and 102*j*, respectively. In some implementations, the Right and Left devices 102*a* and 102*j* may form surround or "satellite" channels of a home theater system. The bonded playback devices 102*a*, 102*b*, 102*j*, and 102*k* may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102*d* and 102*m* in the Living Room merged, which would result in these devices being represented by the single UI entity of Zone C. In one embodiment, the playback devices 102*d* and 102*m* may playback audio in synchrony, during which each outputs the full range of audio content that each respective playback device 102*d* and 102*m* is capable of rendering.

In some embodiments, a stand-alone NMD may be in a zone by itself. For example, the NMD 103*h* from FIG. 1A is named "Closet" and forms Zone I in FIG. 3A. An NMD may also be bonded or merged with another device so as to form a zone. For example, the NMD device 103*f* named "Island" may be bonded with the playback device 102*i* Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the MPS 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102*a*, 102*b*, 102*j*, and 102*k*. Identifiers associated with the Dining Room may indicate that the Dining Room is part of Dining Room+Kitchen group and that devices 103*f* and 102*i* are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs. During operation, one or more playback zones in the environment of FIG. 1A may each be playing different audio content. For instance, the user may be grilling in the Patio zone and listening to hip hop music being played by the playback device 102*c*, while another user may be preparing food in the Kitchen zone and listening to classical music being played by the playback device 102*i*. In another example, a playback zone may play the same audio content in synchrony with another playback zone.

For instance, the user may be in the Office zone where the playback device 102*n* is playing the same hip-hop music that is being playing by playback device 102*c* in the Patio zone. In such a case, playback devices 102*c* and 102*n* may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102*c* from the Patio zone to the Office zone, the Office zone may now include both the playback devices 102*c* and 102*n*. In some cases, the user may pair or group the moved playback device 102*c* with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102*i* and 102*l* may render audio content in synchrony. As another example, bonded playback devices in the Den zone may be split into (i) a television zone and (ii) a separate listening zone. The television zone may include the Front playback device 102*b*. The listening zone may include the Right, Left, and SUB playback devices 102*a*, 102*j*, and 102*k*, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103*a* or 103*b* (FIG. 1B) to control the Den zone before it is separated into the television zone and the listening zone. Once separated, the listening zone may be controlled, for example, by a user in the vicinity of the NMD 103*a*, and the television zone may be controlled, for example, by a user in the vicinity of the NMD 103*b*. As described above, however, any of the NMDs 103 may be configured to control the various playback and other devices of the MPS 100.

c. Example Controller Devices

FIG. 4 is a functional block diagram illustrating certain aspects of a selected one of the controller devices 104 of the MPS 100 of FIG. 1A. Such controller devices may also be referred to herein as a "control device" or "controller." The controller device shown in FIG. 4 may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4, the controller device 104 also includes a user interface 440 that is generally configured to facilitate user access and control of the MPS 100. The user interface 440 may include a touch-screen display or other physical interface configured to provide various graphical controller interfaces, such as the controller interfaces 540*a* and 540*b* shown in FIGS. 5A and 5B. Referring to FIGS. 5A and 5B together, the controller interfaces 540*a* and 540*b* includes a playback control region 542, a playback zone region 543, a playback status region 544, a playback queue region 546, and a sources region 548. The user interface as shown is just one example of an interface that may be provided on a network device, such as the controller device shown in FIG. 4, and accessed by users to control a media playback system, such as the MPS 100. Other user interfaces of varying formats, styles, and interactive sequences may alternatively be implemented on one or more network devices to provide comparable control access to a media playback system.

The playback control region 542 (FIG. 5A) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 542 may also include selectable icons that, when selected, modify equalization settings and/or playback volume, among other possibilities.

The playback zone region 543 (FIG. 5B) may include representations of playback zones within the MPS 100. The playback zones regions 543 may also include a representation of zone groups, such as the Dining Room+Kitchen zone group, as shown.

In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 543 (FIG. 5B) may be dynamically updated as playback zone or zone group configurations are modified.

The playback status region 544 (FIG. 5A) may include graphical representations of audio content that is presently being played, previously played, or scheduled to play next in the selected playback zone or zone group. The selected playback zone or zone group may be visually distinguished on a controller interface, such as within the playback zone region 543 and/or the playback status region 544. The graphical representations may include track title, artist name, album name, album year, track length, and/or other relevant information that may be useful for the user to know when controlling the MPS 100 via a controller interface.

The playback queue region 546 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 5A and 5B, the graphical representations of audio content in the playback queue region 646 (FIG. 5A) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 548 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs **102*a* and 102*b* in the Living Room shown in FIG. 1A, and a second VAS to the NMD 103*f*** in the Kitchen. Other examples are possible.

d. Example Audio Content Sources

The audio sources in the sources region 548 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

Figure 6:
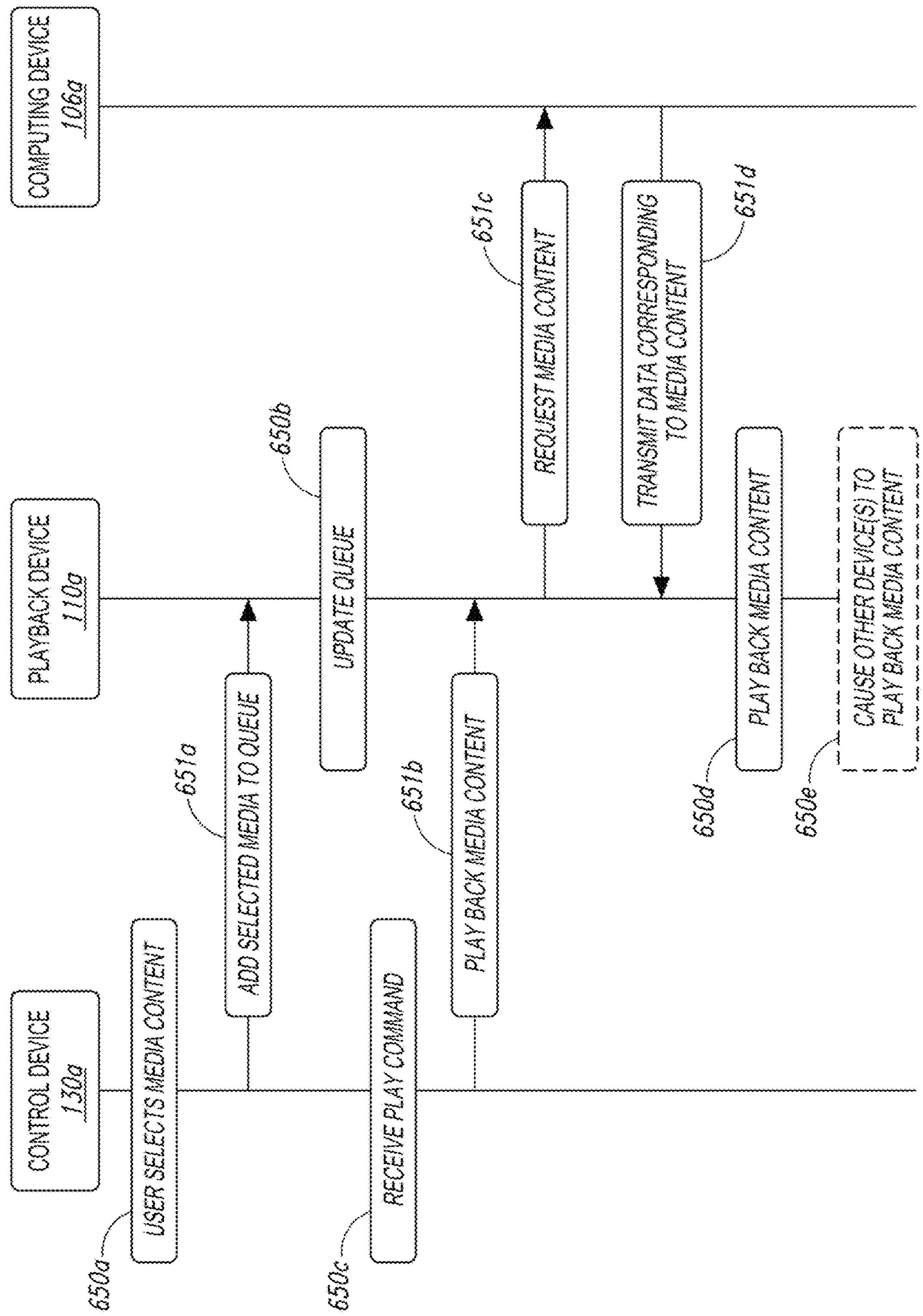
FIG. 6 is a message flow diagram of a media playback system.

FIG. 6 is a message flow diagram illustrating data exchanges between devices of the MPS 100. At step **650*a*, the MPS 100 receives an indication of selected media content (e.g., one or more songs, albums, playlists, podcasts, videos, stations) via the control device 104. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 104 transmits a message 651***a* to the playback device 102 (FIGS. 1A-1C) to add the selected media content to a playback queue on the playback device 102.

At step 650*b*, the playback device 102 receives the message 651*a* and adds the selected media content to the playback queue for play back.

At step 650*c*, the control device 104 receives input corresponding to a command to play back the selected media content. In response to receiving the input corresponding to the command to play back the selected media content, the control device 104 transmits a message 651*b* to the playback device 102 causing the playback device 102 to play back the selected media content. In response to receiving the message 651*b*, the playback device 102 transmits a message 651*c* to the computing device 106 requesting the selected media content. The computing device 106, in response to receiving the message 651*c*, transmits a message 651*d* comprising data (e.g., audio data, video data, a URL, a URI) corresponding to the requested media content.

At step 650*d*, the playback device 102 receives the message 651*d* with the data corresponding to the requested media content and plays back the associated media content.

At step 650*e*, the playback device 102 optionally causes one or more other devices to play back the selected media content. In one example, the playback device 102 is one of a bonded zone of two or more players (FIG. 1M). The playback device 102 can receive the selected media content and transmit all or a portion of the media content to other devices in the bonded zone. In another example, the playback device 102 is a coordinator of a group and is configured to transmit and receive timing information from one or more other devices in the group. The other one or more devices in the group can receive the selected media content from the computing device 106, and begin playback of the selected media content in response to a message from the playback device 102 such that all of the devices in the group play back the selected media content in synchrony.

III. Example Systems and Methods for Processing Sound

Figure 7:
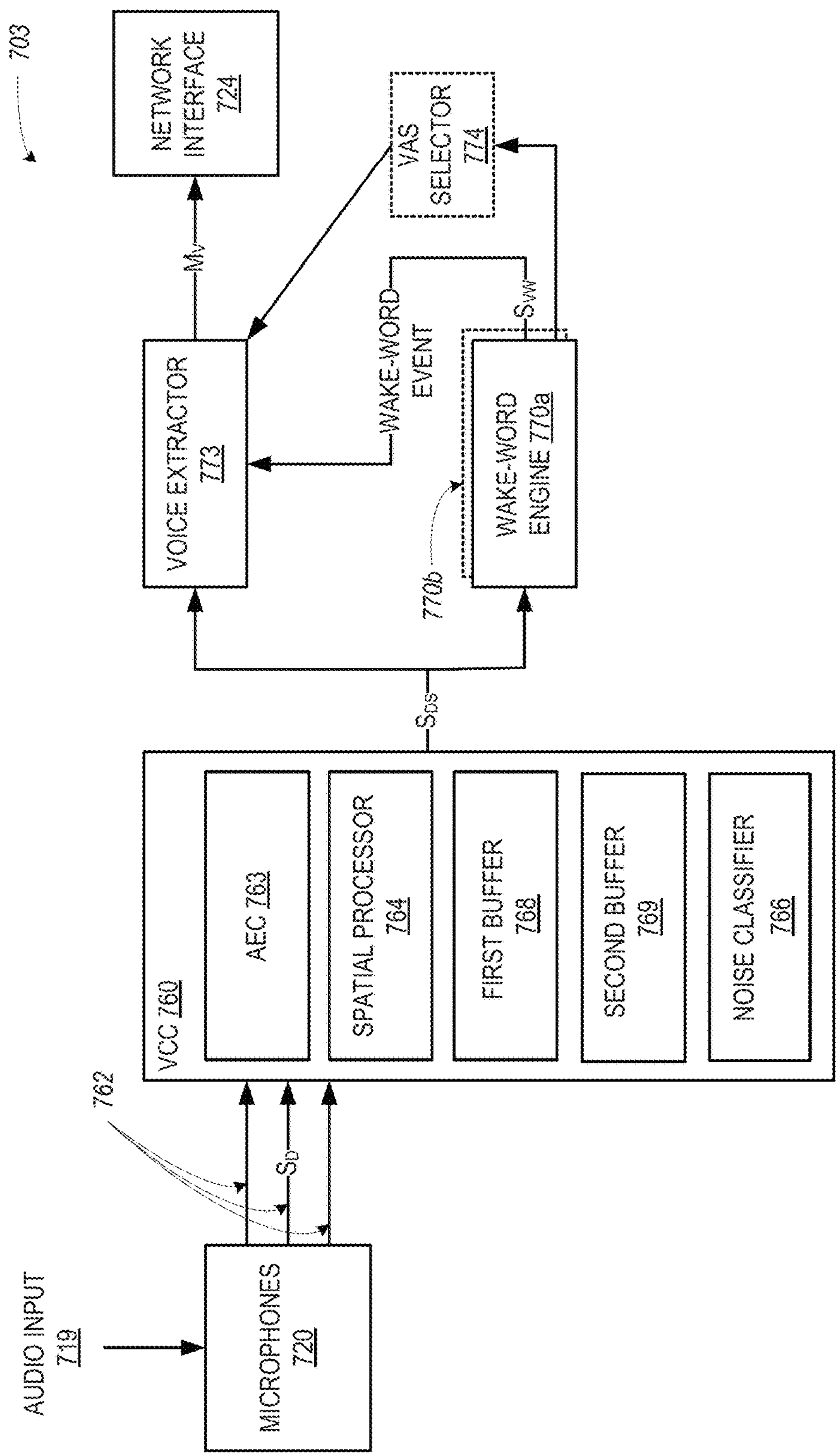
FIG. 7 is a functional block diagram of certain components of an example network microphone device in accordance with aspects of the disclosure.

FIG. 7 is functional block diagram showing aspects of an NMD 703 configured in accordance with embodiments of the disclosure. The NMD 703 may be generally similar to the NMD 103 and include similar components. As described in more detail below, the NMD 703 is configured to classify certain types of noise locally and perform an action based on the classification without transmitting voice recordings to the cloud (e.g., to servers of a voice assistant service). For example, the NMD 703 may be configured to capture metadata associated with detected sound—regardless of whether a wake word is present—and transmit only the metadata to the cloud if the classification meets certain criteria. For example, the NMD 703 may transmit metadata to a remote computing device if the noise classification indicates a predetermined event. Accordingly, the NMD 703 may monitor a user's environment for an event that may require the user's immediate attention without providing an audio recording of the user's environment to the cloud. In some aspects of the technology, however, the NMD 703 is also configured to process other voice inputs and/or other types of noises using a remote analyzer (such as a voice assistant service).

Referring to FIG. 7, the NMD 703 includes voice capture components ("VCC") 760, a voice extractor 773, and a keyword engine, such as a wake-word engine 770*a*, as shown in the illustrated example of FIG. 7. and. The wake-word engine 770*a* and the voice extractor 773 are operably coupled to the VCC 760. In various embodiments, the wake-word engine 770*a* may be associated with a particular VAS and may invoke that VAS when one or more VAS wake words are detected in a voice input. The NMD 703 further includes microphones 720 and the at least one network interface 724 as described above and may also include other components, such as audio amplifiers, a user interface, etc., which are not shown in FIG. 7 for purposes of clarity. The microphones 720 of the NMD 703 are configured to provide detected sound, SD, from the environment of the NMD 703 to the VCC 760. The detected sound SD may take the form of one or more analog or digital signals. In example implementations, the detected sound SD may be composed of a plurality signals associated with respective channels 762 that are fed to the VCC 760.

Each channel 762 may correspond to a particular microphone 720. For example, an NMD having six microphones may have six corresponding channels. Each channel of the detected sound SD may bear certain similarities to the other channels but may differ in certain regards, which may be due to the position of the given channel's corresponding microphone relative to the microphones of other channels. For example, one or more of the channels of the detected sound SD may have a greater signal to noise ratio ("SNR") of speech to background noise than other channels.

As further shown in FIG. 7, the VCC 760 includes an AEC 763, a spatial processor 764, first and second buffers 768 and 769, and a noise classifier 766. In operation, the AEC 763 receives the detected sound SD and filters or otherwise processes the sound to suppress echoes and/or to otherwise improve the quality of the detected sound SD. That processed sound may then be passed to the spatial processor 764.

The spatial processor 764 is typically configured to analyze the detected sound SD and identify certain characteristics, such as a sound's amplitude (e.g., decibel level), frequency spectrum, directionality, etc. In one respect, the spatial processor 764 may help filter or suppress ambient noise in the detected sound SD from potential user speech based on similarities and differences in the constituent channels 762 of the detected sound SD, as discussed above. As one possibility, the spatial processor 764 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 764 may be configured to determine a speech presence probability, examples of such functionality are disclosed in U.S. patent application Ser. No. 15/984,073, filed May 18, 2018, titled "Linear Filtering for Noise-Suppressed Speech Detection," which is incorporated herein by reference in its entirety.

In operation, the first and second buffers 768 and 769—one or both of which may be part of or separate from the memory 213 (FIG. 2A)—capture data corresponding to the detected sound SD. More specifically, the first and second buffers 768 and 769 capture detected-sound data that was processed by the upstream AEC 764 and spatial processor 764. The network interface 724 may then provide this information to a remote server that may be associated with the MPS 100.

In any event, the detected-sound data forms a digital representation (i.e., sound-data stream), SDS, of the sound detected by the microphones 720. In practice, the sound-data stream SDs may take a variety of forms. As one possibility, the sound-data stream SDs may be composed of frames, each of which may include one or more sound samples. The frames may be streamed (i.e., read out) from the first and/or second buffers 768 and 769 for further processing by downstream components, such as the noise classifier 766, the wake-word engines 770, and the voice extractor 773 of the NMD 703.

In some implementations, the first and/or second buffer 768 and 769 captures detected-sound data utilizing a sliding window approach in which a given amount (i.e., a given window) of the most recently captured detected-sound data is retained in the first and/or second buffers 768 and 769 while older detected sound data is overwritten when it falls outside of the window. For example, each of the first and/or second buffers 768 and 769 may temporarily retain 20 frames of a sound specimen at given time, discard the oldest frame after an expiration time, and then capture a new frame, which is added to the 19 prior frames of the sound specimen.

In practice, when the sound-data stream SDs is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, SNR, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

In operation, the second buffer 769 can store information (e.g., metadata or the like) regarding the detected sound SD that was processed by the upstream by at least one of the AEC 763, spatial processor 764, or the first buffer 768. Examples of such sound metadata include: (1) frequency response data, (2) echo return loss enhancement measures (3) voice direction measures; (4) arbitration statistics; and/or (5) speech spectral data. Other sound metadata may also be used to identify and/or classify noise in the detected-sound data SD. In at least some embodiments, the sound metadata may be transmitted separately from the sound-data stream SDs to the network interface 724. For example, the sound metadata may be transmitted from the second buffer 769 to one or more remote computing devices separate from the VAS which receives the sound-data stream SDS. Additionally or alternatively, the metadata may comprise spectral information that is temporally disassociated from the recorded audio. In some embodiments, for example, the metadata can be transmitted to a remote service provider for analysis when a predetermined event is detected, as described in more detail below.

In one aspect, the information stored in the second buffer 769 does not reveal the content of any speech but instead is indicative of certain unique features of the detected sound itself. In a related aspect, the information may be communicated between computing devices, such as the various computing devices of the MPS 100, without necessarily implicating privacy concerns. In practice, the MPS 100 can use this information classify noise and/or detect an event in the NMD's environment, as discussed below. In some implementations the second buffer 769 may comprise or include functionality similar to lookback buffers disclosed, for example, in U.S. patent application Ser. No. 15/989,715, filed May 25, 2018, titled "Determining and Adapting to Changes in Microphone Performance of Playback Devices"; U.S. patent application Ser. No. 16/141,875, filed Sep. 25, 2018, titled "Voice Detection Optimization Based on Selected Voice Assistant Service"; and U.S. patent application Ser. No. 16/138,111, filed Sep. 21, 2018, titled "Voice Detection Optimization Using Sound Metadata," which are incorporated herein by reference in their entireties.

In any case, downstream components of the NMD 703 may process the sound-data stream SDS. For instance, the wake-word engines 770 are configured to apply one or more identification algorithms to the sound-data stream SDs (e.g., streamed sound frames) to spot potential wake words in the detected-sound SD via, e.g., automatic speech recognition and related voice processing techniques.

Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wake-words.

For instance, when the wake-word engine 770*a* detects a potential wake word, the work-word engine 770*a* provides an indication of a "wake-word event" (also referred to as a "wake-word trigger"). In the illustrated example of FIG. 7, the wake-word engine 770*a* outputs a signal, Svw, that indicates the occurrence of a wake-word event to the voice extractor 773.

In multi-VAS implementations, the NMD 703 may include a VAS selector 774 (shown in dashed lines) that is generally configured to direct extraction by the voice extractor 773 and transmission of the sound-data stream SDs to the appropriate VAS when a given wake-word is identified by a particular wake-word engine (and a corresponding wake-word trigger), such as the wake-word engine 770*a* and at least one additional wake-word engine 770*b* (shown in dashed lines). In such implementations, the NMD 703 may include multiple, different wake word engines and/or voice extractors. Each wake-word engine may be supported by a respective VAS.

Similar to the discussion above, each wake-word engine 770 may be configured to receive as input the sound-data stream SDs from the one or more buffers 768 and apply identification algorithms to cause a wake-word trigger for the appropriate VAS. Thus, as one example, the wake-word engine 770*a* may be configured to identify the wake word "Alexa" and cause the NMD 703 to invoke the AMAZON VAS when "Alexa" is spotted. As another example, an additional wake-word engine 770*b* may be configured to identify the wake word "Ok, Google" and cause the NMD 520 to invoke the GOOGLE VAS when "Ok, Google" is spotted. In single-VAS implementations, the VAS selector 774 may be omitted.

In response to the wake-word event (e.g., in response to the signal Svw indicating the wake-word event), the voice extractor 773 is configured to receive and format (e.g., packetize) the sound-data stream SDs. For instance, the voice extractor 773 packetizes the frames of the sound-data stream SDs into messages. The voice extractor 773 transmits or streams these messages, Mv, that may contain voice input in real time or near real time to a remote VAS via the network interface 724.

The VAS is configured to process the sound-data stream SDS contained in the messages Mv sent from the NMD 703. More specifically, the NMD 703 is configured to identify a voice input in the audio input 719 based on the sound-data stream SDS. As described in connection with FIG. 2C, the voice input may include a keyword portion and an utterance portion. The keyword portion corresponds to detected sound that caused a keyword event (e.g., a wake-word event), or leads to a such an event when one or more certain conditions, such as certain playback conditions, are met. For instance, when the audio input 719 includes a VAS wake word (e.g., "Alexa," "Okay Google," etc.), the keyword portion corresponds to detected sound that caused the wake-word engine 770*a* to output the wake-word event signal Svw to the voice extractor 773. The utterance portion in this case corresponds to detected sound that potentially comprises a user request following the keyword portion. Although the keyword portion often times comes before the utterance portion within a given voice input, in some instances the keyword portion may additionally or alternatively come after the utterance portion and/or may be embedded between different portions of the utterance portion.

When a VAS wake-word event occurs, the VAS may first process the keyword portion within the sound data stream SDs to verify the presence of a VAS wake word. In some instances, the VAS may determine that the keyword portion comprises a false wake word (e.g., the word "Election" when the word "Alexa" is the target VAS wake word). In such an occurrence, the VAS may send a response to the NMD 703 with an instruction for the NMD 703 to cease extraction of sound data, which causes the voice extractor 773 to cease further streaming of the detected-sound data to the VAS. The wake-word engine 770*a* may resume or continue monitoring sound specimens until it spots another potential VAS wake word, leading to another VAS wake-word event. In some implementations, the VAS does not process or receive the keyword portion but instead processes only the utterance portion.

In any case, the VAS processes the utterance portion to identify the presence of any words in the detected-sound data and to determine an underlying intent from these words. The words may correspond to one or more commands, as well as certain keywords. The keyword may be, for example, a word in the voice input identifying a particular device or group in the MPS 100. For instance, in the illustrated example, the keyword may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the utterance portion may include additional information, such as detected pauses (e.g., periods of non-speech) between words spoken by a user, as shown in FIG. 2C. The pauses may demarcate the locations of separate commands, keywords, or other information spoke by the user within the utterance portion.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102, control one or more of these playback devices 102 (e.g., raise/lower volume, group/ungroup devices, etc.), or turn on/off certain smart devices, among other actions. After receiving the response from the VAS, the wake-word engine 770*a* of the NMD 703 may resume or continue to monitor the sound-data stream SDs until it spots another potential wake-word, as discussed above.

In general, the one or more identification algorithms that a particular keyword engine, such as the wake-word engine 770*a*, applies are configured to analyze certain characteristics of the detected sound stream SDs and compare those characteristics to corresponding characteristics of the particular wake-word engine's one or more particular wake words. For example, the wake-word engine 770*a* may apply one or more identification algorithms to spot spectral characteristics in the detected sound stream SDs that match the spectral characteristics of the engine's one or more wake words, and thereby determine that the detected sound SD comprises a voice input including a particular wake word.

In some implementations, the one or more identification algorithms may be third-party identification algorithms (i.e., developed by a company other than the company that provides the NMD 703). For instance, operators of a voice service (e.g., AMAZON) may make their respective algorithms (e.g., identification algorithms corresponding to AMAZON's ALEXA) available for use in third-party devices (e.g., the NMDs 103), which are then trained to identify one or more wake words for the particular voice assistant service. Additionally, or alternatively, the one or more identification algorithms may be first-party identification algorithms that are developed and trained to identify certain wake words that are not necessarily particular to a given voice service. Other possibilities also exist.

As noted above, the NMD 703 may include a noise classifier 766. The noise classifier 766 is configured to process sound metadata (frequency response, signal levels, etc.) to classify one or more noises in the detected sound SD and/or in the sound data stream SDS. As described in greater detail below, based on the classification, the NMD 703 may detect an event in the NMD's environment and, in some instances, cause the user to be notified of the event. For example, the NMD 703 may provide notification to the user locally (e.g., flashing a light, sounding an alarm, etc.) and/or may transmit the metadata to a remote computing device for further analysis and/or action.

The noise classifier 766 may include a neural network or other mathematical model configured to identify different types of noise in detected sound data or metadata. For example, in analyzing the sound metadata, the noise classifier 766 may compare one or more features of the sound metadata with known noise reference values or a sample population data with known noise. For example, any features of the sound metadata such as signal levels, frequency response spectra, etc. can be compared with noise reference values or values collected and averaged over a sample population. In some examples, analyzing the sound metadata includes projecting the frequency response spectrum onto an eigenspace corresponding to aggregated frequency response spectra from a population of NMDs. Further, projecting the frequency response spectrum onto an eigenspace can be performed as a pre-processing step to facilitate downstream classification. Additional details on processing the detected sound and/or the sound metadata are described below.

In some embodiments, the NMD 703 may optionally include additional or alternate keyword engines (not shown) in parallel with the wake-word engine 770*a*. In some implementations, a keyword functions as both an activation word and a command itself (i.e., rather than being utilized as a nonce word alone). For instance, example command keywords may correspond to playback commands (e.g., "play," "pause," "skip," etc.) as well as control commands ("turn on"), among other examples. Under appropriate conditions, based on detecting one of these command keywords, the NMD 703 perform a corresponding command. In some implementations a keyword engine may comprise or include functionality similar to keyword engines disclosed in in U.S. patent application Ser. No. 16/439,009, filed Jun. 12, 2019, titled "Network Microphone Device with Command Keyword Conditioning"; U.S. patent application Ser. No. 16/439,032, filed Jun. 12, 2019, titled "Network Microphone Device with Command Word Eventing"; and U.S. patent application Ser. No. 16/439,046, filed Jun. 12, 2019, titled "Conditional Wake Word Eventing Based on Environment," which are incorporated herein by reference in their entireties.

In some embodiments, one or more of the components described above can operate in conjunction with the microphones 720 to detect and store a user's voice profile, which may be associated with a user account of the MPS 100. In some embodiments, voice profiles may be stored as and/or compared to variables stored in a set of command information or data table. The voice profile may include aspects of the tone or frequency of a user's voice and/or other unique aspects of the user, such as those described in previously referenced U.S. patent application Ser. No. 15/438,749.

In some embodiments, one or more of the components described above can operate in conjunction with the microphones 720 to determine the location of a user in the home environment and/or relative to a location of one or more of the NMDs 103. Techniques for determining the location or proximity of a user may include one or more techniques disclosed in previously referenced U.S. patent application Ser. No. 15/438,749, U.S. Pat. No. 9,084,058 filed Dec. 29, 2011, and titled "Sound Field Calibration Using Listener Localization," and U.S. Pat. No. 8,965,033 filed Aug. 31, 2012, and titled "Acoustic Optimization." Each of these applications is herein incorporated by reference in its entirety.

IV. Example Methods of Classifying Noise for Event Detection

As noted above, the NMDs of the present technology (such as NMD 703) may include a noise classifier (such as noise classifier 766) configured to process metadata associated the detected sound. Different noise sources will produce different sounds, and those different sounds will have different associated sound metadata (e.g., frequency response, signal levels, etc.). The sound metadata associated with different noise sources can have a signature that differentiates one noise source from another. Accordingly, by identifying the different signatures, different noise sources can be classified by analyzing the sound metadata. In example implementations, the noise classifier 766 may analyze the sound metadata in the buffer 769 to classify noise in the detected sound SD.

Figure 8:
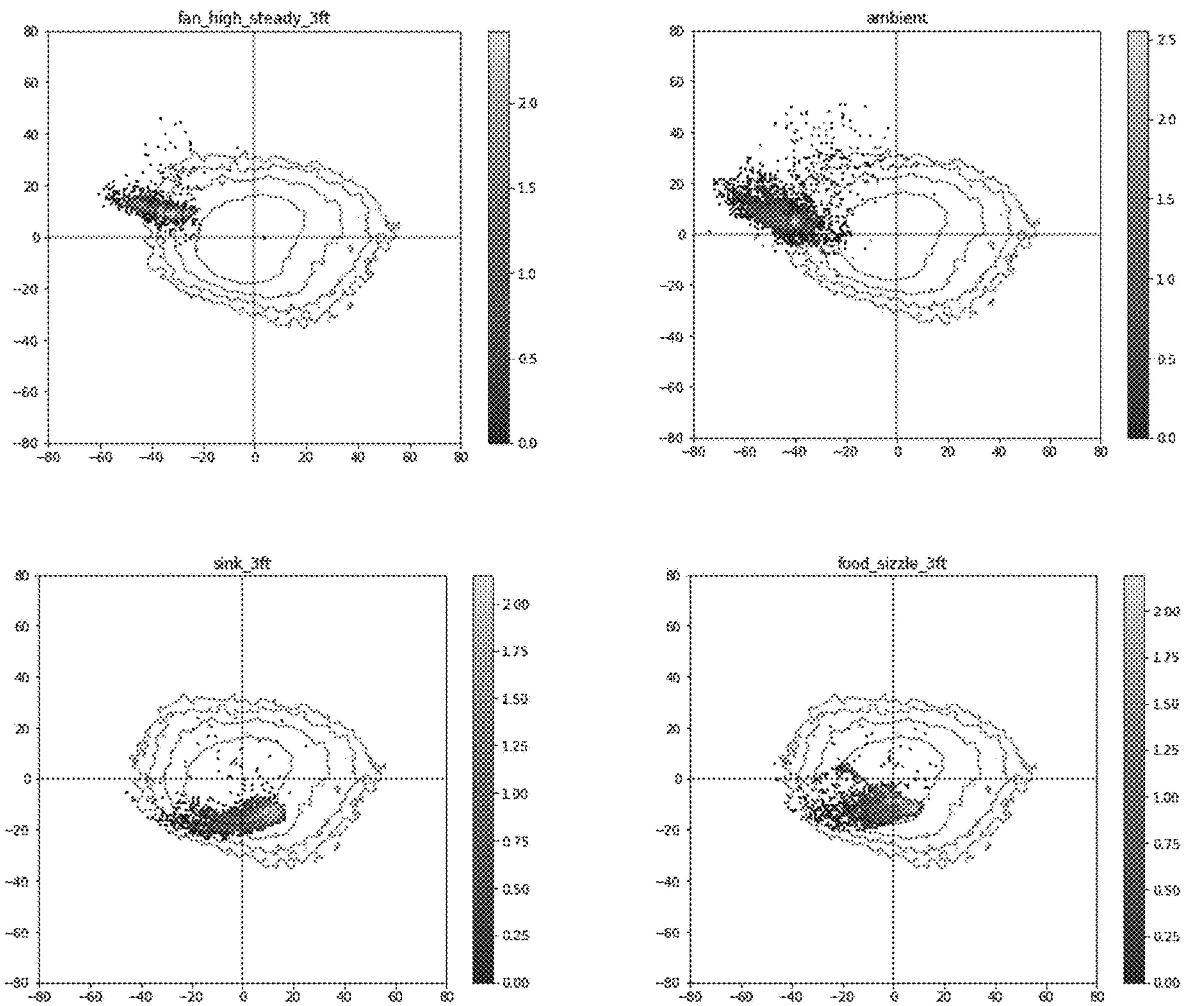
FIG. 8 illustrates the separation of the specific noises in the coordinate space defined by principal component analysis.

To illustrate, FIG. 8 depicts analyzed sound metadata associated with four noise sources: the upper left plot is the noise of a fan on a high setting positioned three feet from the NMD; the upper right plot is ambient noise; the lower left plot is a running sink positioned three feet from the NMD; and the lower right plot is the sizzle of cooking food three feet from the NMD. In some implementations, these signatures shown in the plots may be generated using principal component analysis. As described in more detail below with respect to FIGS. 10-13, collected data from a variety of NMDs provides an overall distribution of possible frequency response spectra. In general, principal component analysis (PCA) can be used to find the orthogonal basis that describes the variance in all the field data. This eigenspace is reflected in the contours shown in the plots of FIG. 8. Each dot in the plot represents a known noise value (e.g., a single frequency response spectrum from an NMD exposed to the noted noise source) that is projected onto the eigenspace. As seen in FIG. 8, these known noise values cluster together when projected onto the eigenspace, generating notably distinct signature distributions for the different sources of noise. As described in more detail below, this classification of noise can be used detect an event.

One classification of noise may be speech (e.g., far-field speech). Another classification may be a specific type of speech, such as background speech, an example of which is described in greater detail with reference to FIG. 9. Background speech may be differentiated from other types of voice-like activity, such as more general voice activity (e.g., cadence, pauses, or other characteristics) of voice-like activity.

Figure 9:
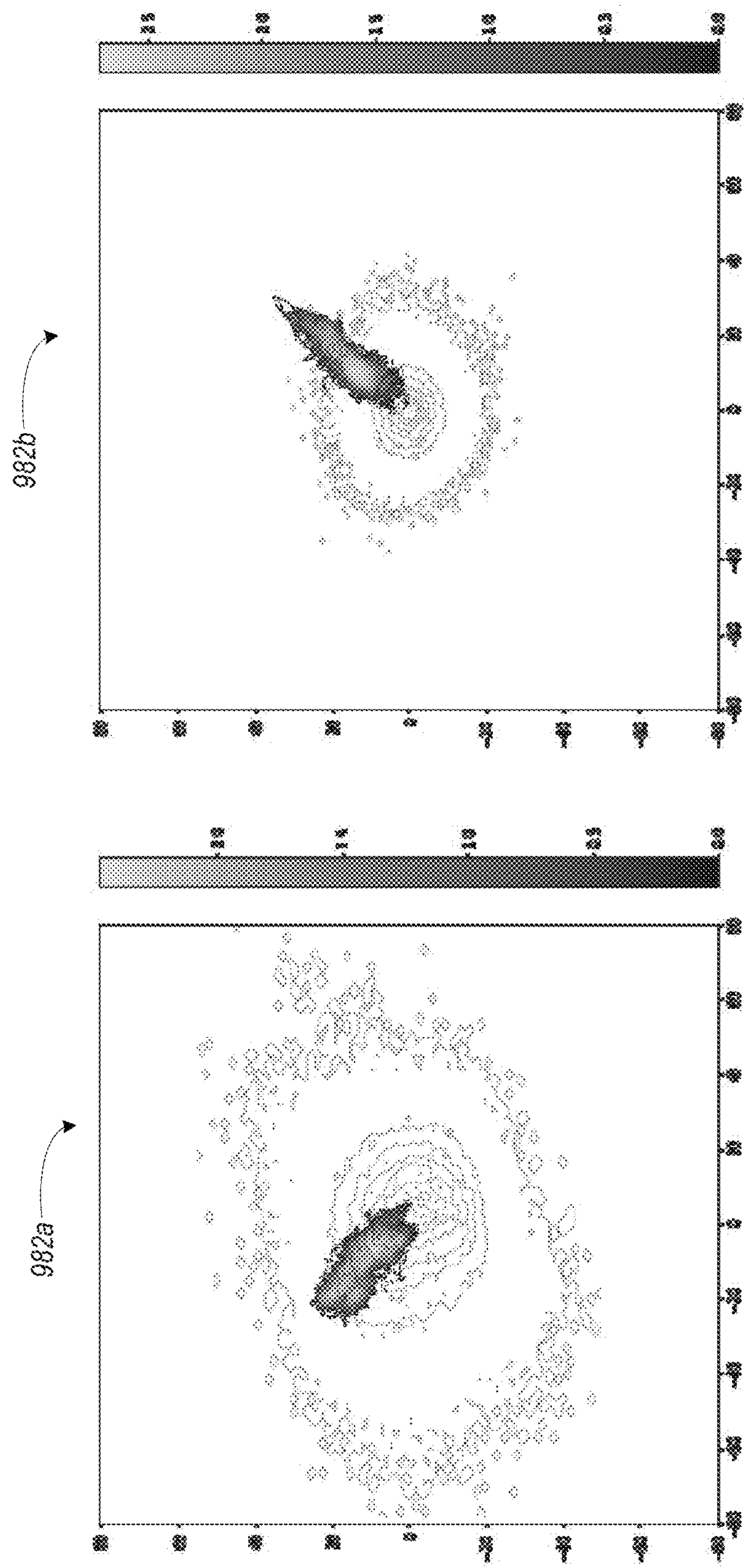
FIG. 9 shows example noise graphs illustrating analyzed sound metadata associated with background speech.

To illustrate, FIG. 9 shows a first plot 982*a* and a second plot 982*b*. The first plot 982*a* and the second plot 982*b* show analyzed sound metadata associated with background speech. These signatures shown in the plots are generated using principal component analysis (PCA). Collected data from a variety of NMDs provides an overall distribution of possible frequency response spectra. In general, principal component analysis can be used to find the orthogonal basis that describes the variance in all the field data. This eigenspace is reflected in the contours shown in the plots of FIG. 9. Each dot in the plot represents a known noise value (e.g., a single frequency response spectrum from an NMD exposed to the noted noise source) that is projected onto the eigenspace. As seen in FIG. 9, these known noise values cluster together when projected onto the eigenspace. In this example, the FIG. 9 plots are representative of a four-vector analysis, where each vector corresponds to a respective feature. The features collectively are a signature for background speech.

As noted above, one classification of sound may be background speech, such as speech indicative of far-field speech and/or speech indicative of a conversation not involving the NMD 703. The noise classifier 766 may output a signal and/or set a state variable indicating that background speech is present in the environment. The presence of voice activity (i.e., speech) in the pre-roll portion of the voice input indicates that the voice input might not be directed to the NMD 703, but instead be conversational speech within the environment. For instance, a household member might speak something like "our kids should have a play date soon" without intending to direct the command keyword "play" to the NMD 703.

Further, the noise classifier 766 may determine whether background speech is present in the environment based on one or more metrics. For example, the noise classifier 766 may determine a count of frames in the pre-roll portion of the voice input that indicate background speech. If this count exceeds a threshold percentage or number of frames, the noise classifier 766 may be configured to output the signal or set the state variable indicating that background speech is present in the environment. Other metrics may be used as well in addition to, or as an alternative to, such a count.

Figure 10:
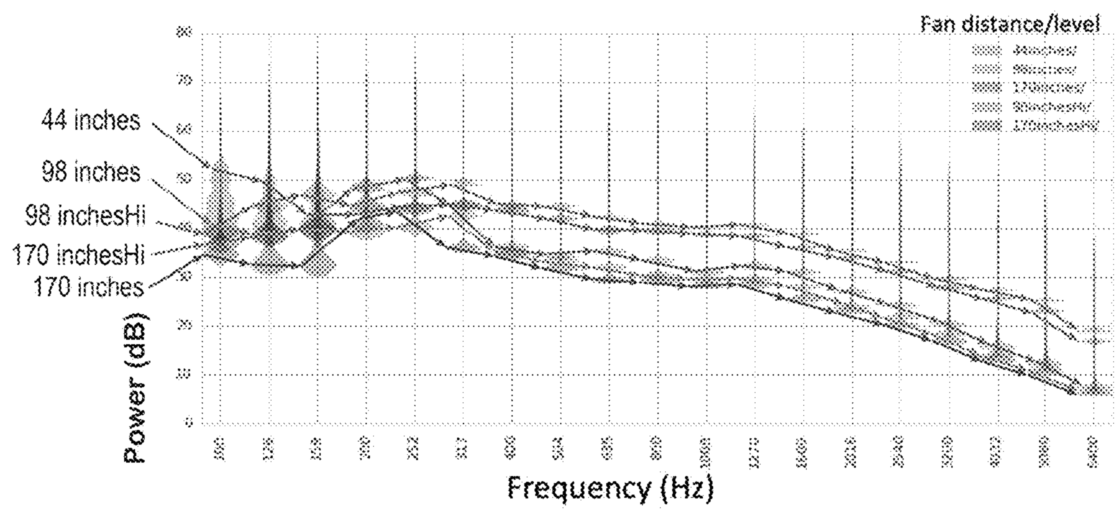
FIG. 10 is a graph of example spectra for fan noise at various distances.
Figure 11:
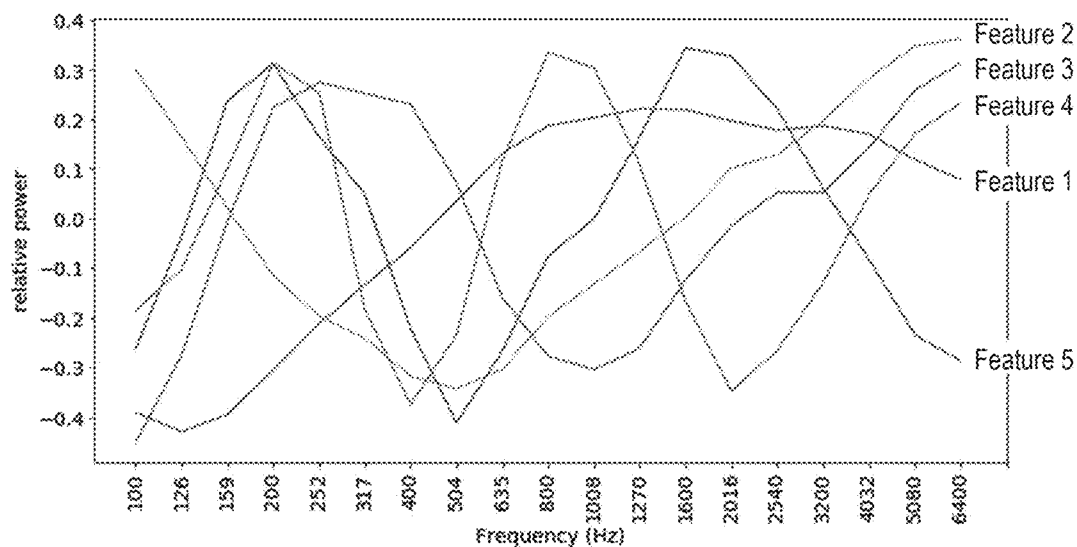
FIG. 11 is an example graph of basis vectors derived from principal component analysis of microphone spectral data.
Figure 12:
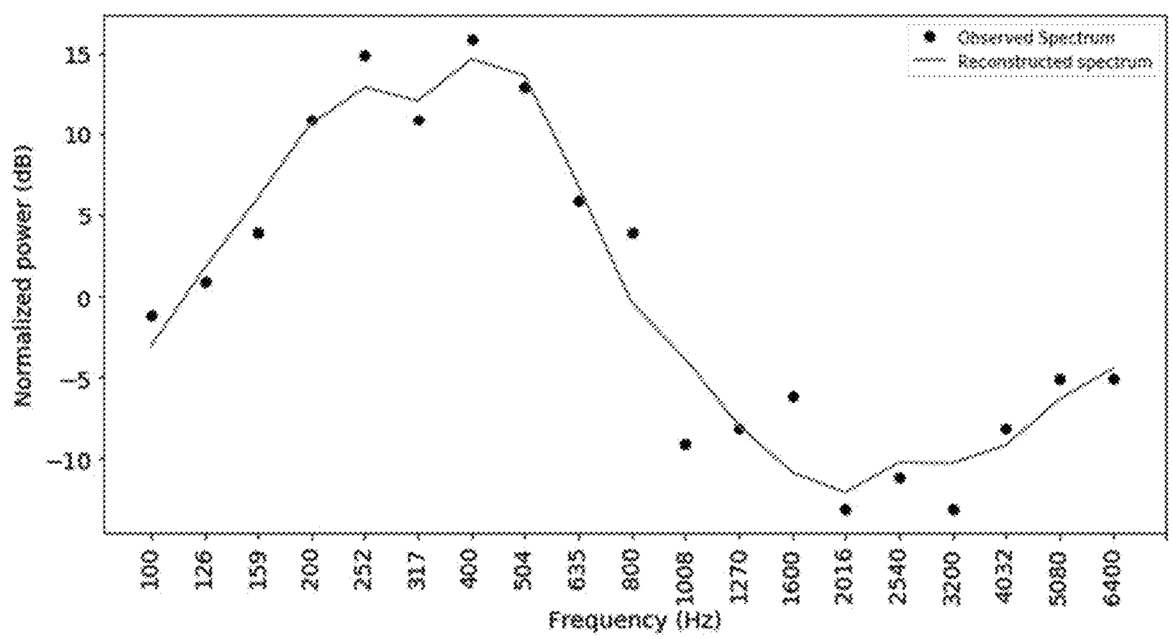
FIG. 12 is an example graph of a reconstructed spectrum for classifying noise data.

FIGS. 10-12 illustrate an example approach to comparing sound metadata with known noise reference values to classify noise in audio input captured by an NMD. As noted above, in some embodiments sound metadata captured by an NMD can include frequency response spectra, which can be averaged over time and sampled logarithmically along the frequency range.

Data collected from a variety of NMDs can provide an overall distribution of possible frequency response spectra. Each spectrum can then be normalized by subtracting the mean of all spectral bins without converting to linear space in power. This operation translates the spectrum vertically which, since all spectra of a similar source maintain a similar shape, causes all spectra to fall into a tighter distribution. This simple operation removes the variation associated with overall volume contribution, allowing noise to be classified independent of its volume.

FIG. 10 illustrates some example spectra that show the vertical translation of similar spectral shapes for noises measured from fans at varying fan speeds and varying distances from the NMD. Each group shows the distribution of measurements for a particular configuration. This behavior is consistent with the behavior of well understood noise types such as white noise or pink noise where the overall spectral shape of the noise is defined by the slope of the spectrum, not the absolute level. To generate the overall distribution of possible frequency response data, many such spectra can be collected via NMDs in user's homes or under controlled conditions.

The spectral data obtained from a large number of NMDs contains a large variety of possible noise types that are not known explicitly for each measurement. However, this large number of measurements can be used to define an orthogonal basis (eigenspace) using principal component analysis (PCA), which identifies the axes of highest variance. For example, using approximately 10 million measurements of spectral data collected from a number of NMDs in the field, microphone spectra can be averaged per spectral bin and then normalized as described above. PCA may then be used to define the orthogonal basis. FIG. 11 illustrates an example of some basis vectors that define an eigenspace. Although five basis vectors are illustrated, in various embodiments the number of basis vectors may vary, for example two, three, or four basis vectors, or alternatively, six, seven, eight, or more basis vectors.

This operation produces the set of matrices:

$$X=USV^T$$

Where X is the original vector space containing all of the field spectra. U is a unitary matrix, S is a diagonal matrix of singular values, and $V^T$ is the matrix of eigenvectors that define the axes of highest variance.

Using these eigenvectors (e.g., the basis vectors illustrated in FIG. 11), any newly observed spectrum N can be projected onto the new space by performing a dot product between the new spectrum and this basis, N'=NV. This calculation defines the eigenvalues for each spectrum which can be reconstructed as a linear combination of any subset of these eigenvectors and eigenvalues. FIG. 12 illustrates one of these spectra reconstructed with the subset of eigenvectors that describe the most variance in the population distribution. As shown in FIG. 12, the observed spectrum provides a plurality of discrete frequency response values. The reconstructed spectrum represents a combination of the basis vectors (e.g., the basis vectors shown in FIG. 11), with the strength of each basis vector being varied to best fit the observed spectrum. As shown, the reconstructed spectrum substantially corresponds to the observed spectrum. In operation, any newly received frequency response spectrum can be reconstructed using a linear combination of basis vectors (e.g., the basis vectors shown in FIG. 11).

Figure 13:
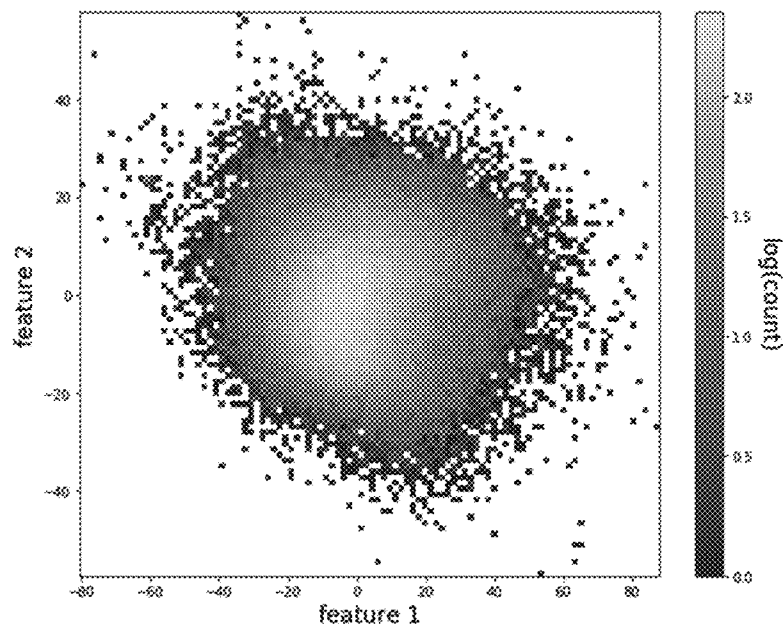
FIG. 13 is a graph of an example distribution of spectra captured from a large population of network microphone devices.

It may be impractical to classify every possible noise that might be encountered by an NMD in the field. However, the distribution of noises in the subsets of the above eigenspectra can be visualized. FIG. 13 illustrates the overall distribution of observed field spectra as strengths of the first two eigenvectors (e.g., the two of the basis vectors as shown in FIG. 11 that are most responsible for the observed variance). With respect to FIG. 13, "feature 1" is the strength of a first eigenvector in the reconstructed spectrum (e.g., the reconstructed spectrum shown in FIG. 12), and "feature 2" is the strength of a second eigenvector in the reconstructed spectrum (e.g., the reconstructed spectrum shown in FIG. 12). Although the plot in FIG. 13 illustrates values for two features (e.g., the strengths of two basis vectors in the reconstructed spectrum), the values for additional features may be used to classify noise. For example, there may be three, four, five, or more features, each corresponding to a strength of a different basis vector in the reconstructed spectrum. By evaluating a newly observed spectrum in terms of additional features, different noise types may be more readily distinguished from one another, thereby improving overall noise classification.

The separation between noise cases in the field is continuous with individual clusters of noises, and therefore may not be easily discernable. This is due to the small variation in every type of noise, which causes difficulty in identifying specific noise regions because each region is less distinct. The distribution of noises may be further illuminated using simulation software, taking a known set of recorded noises and generating spectra in a similar manner as in the field, but in a controlled and highly repeatable fashion. These known test sample spectra can then be projected onto the eigenspace as "test particles" that trace their presence in the distribution of field noises. In the plots of FIG. 8, the field density distributions are shown by the contour lines, and the individual points are test samples run through the simulation, showing different placement of the parameter space. As seen in FIG. 8, the different noise sources produce different clusters of points projected onto the eigenspace.

With this understanding of the data collected from a large number of NMDs, the relative prevalence of individual types of noises can be identified. Further, a classifier can be constructed using a neural network to identify noises in collected data from one or more NMDs. For example, the neural network can be trained on a set of known, labeled noises that are projected onto the population's eigenspace. These known, labeled noises can be processed by simulation software and can include many types of typical noises grouped into a handful of labels for classification such as "glass breaking," "ambient," "fan," "sink," "interfering speech," etc., each of which may provide sufficient insight to cause the NMD to perform an action, for example by outputting a notification to a user, transmitting sound metadata to remote computing devices for processing, or any other suitable action. In some embodiments, the classifier may be used to further understand the relative contributions of noise experienced by a particular device. For example, if a particular device experiences higher than average levels of fan noise, particular performance parameters of that NMD may be modified to accommodate the heightened fan noise, while another NMD that experiences higher than expected levels of traffic noise may be adjusted differently.

In some embodiments, the noise reference samples can be obtained by capturing samples under controlled conditions (e.g., capturing audio input from a fan at different positions with respect to an NMD) or from simulations designed to mimic known noise conditions. Alternatively or additionally, the noise reference samples can be obtained from user input. For example, a user may be instructed (e.g., via the control device 104) to generate a pre-identified noise, such as turning on a kitchen sink, turning on a ceiling fan, etc., and the NMD 703 may record the proceeding audio input. By capturing audio input under different conditions as indicated by the user, known noise reference values can be obtained and stored either locally by the NMD 703 or via remote computing devices.

In various embodiments, any number of different techniques for classification of noise using the sound metadata can be used, for example machine learning using decision trees, or Bayesian classifiers, neural networks, probability distributions (e.g., a softmax function) or any other classification techniques. Alternatively or additionally, various clustering techniques may be used, for example K-Means clustering, mean-shift clustering, expectation-maximization clustering, or any other suitable clustering technique. Techniques to classify noise may include one or more techniques disclosed in previously referenced U.S. application Ser. Nos. 16/439,009; 16/439,032; and 16/439,046; and U.S. application Ser. No. 16/227,308 filed Dec. 20, 2018, and titled "Optimization of Network Microphone Devices Using Noise Classification," which is herein incorporated by reference in its entirety.

Given the NMD's ability to classify noise, an NMD may perform an appropriate action in response to detecting certain noises indicative of a predetermined event. For example, for noises and/or events such as "glass breaking," "running water," "crying baby," etc., it may be beneficial for the NMD to cause the user to be notified of the noise and/or associated event. The notification may be communicated locally by flashing a light on the NMD (or any smart illumination device in the environment in communication with the MPS 100), outputting an alarm tone or message via one or more of the NMDs of the MPS 100, and other appropriate responses to get the user's attention.

Additionally or alternatively, based on the classification, the NMD may transmit metadata associated with the detected sound to a remote computing device for further analysis and/or action. To preserve user privacy, in some embodiments the NMD transmits only the metadata and does not transmit an audio recording. The remote computing device receiving the metadata may process the metadata (or other information transmitted by the NMD) cause the user to be notified of the detected classification and/or event. For example, the NMD may cause an alert to be displayed on the user's control device 104, cause the user to receive a phone call, and/or may cause an appropriate third party, such as a police department, to receive a notification. In some embodiments, the NMD may transmit the raw sound data and/or the audio recording of the detected sound to a remote computing device for additional processing by the remote computing device and/or for a human operator to review and analyze. In some aspects of the technology, the user may be given the option to access the real-time audio and/or video feed of the environment in which the event or noise source was detected (including audio and/or video specific zone/room of the environment).

In some embodiments, the system may include one or more noise packages comprising one or more classifications that individually or collectively indicate a predetermined event, thus triggering the system to cause the user to be notified. For example, a security package may include noise classifications such as "glass breaking," "door opening," "furniture moving," "siren," "firearm discharging," etc. As another example, the system may include an "environmental awareness package" comprising noise classifications individually or collectively indicative of a storm, hurricane, tornado, flood, and other natural or atmospheric disturbances. Such noise classifications may include "thunder," "lightning," "tornado warning siren," "strong wind," and others. To further illustrate, the system may include a "nursery package" comprising noise modifications individually and/or collectively indicative of a baby or child being under distress or otherwise in need of attention. Such noise classifications may include "crying baby," "coughing baby," "fall," and others.

In some aspects of the technology, one or more noise packages may be available to the user on an a la carte basis. For example, the user may select a desired package(s) from a list of noise packages provided via control device 104 (FIG. 1A). The noise packages may be provided locally on the NMD and/or via access to a remote computing device (such as a remote computing device associated with a VAS). The system may be configured such that the user may customize the individual noise packages to meet the user's specific needs. For instance, a noise package may include a list of default noise classifications that when detected will trigger the NMD to perform an action. The user may have the option of deselecting one or more of the default classifications and/or adding additional classifications so that the corresponding noise package can be tailored to the user's unique preferences or environment. For example, a user living in a city may not want the noise classification "siren" to be included in the "home intrusion" package (and thus trigger an alert when detected) since urban environments are commonly exposed to sirens that are not related to a home intrusion. In contrast, a user living in a suburban environment in which police sirens are rarely heard may want to include "siren" in the "home intrusion" noise package.

Additionally or alternatively, the system may be configured such that the user can select or modify whether detection of a particular noise classification triggers an alert based on time of day and/or proximity of the user to the environment. For example, some users may prefer that the detection of "door opening" only triggers an alert while the user is sleeping or away from the environment. Likewise, the user may choose to deactivate an entire noise package during certain periods of time and/or based on the user's proximity to the environment.

Figure 14A:
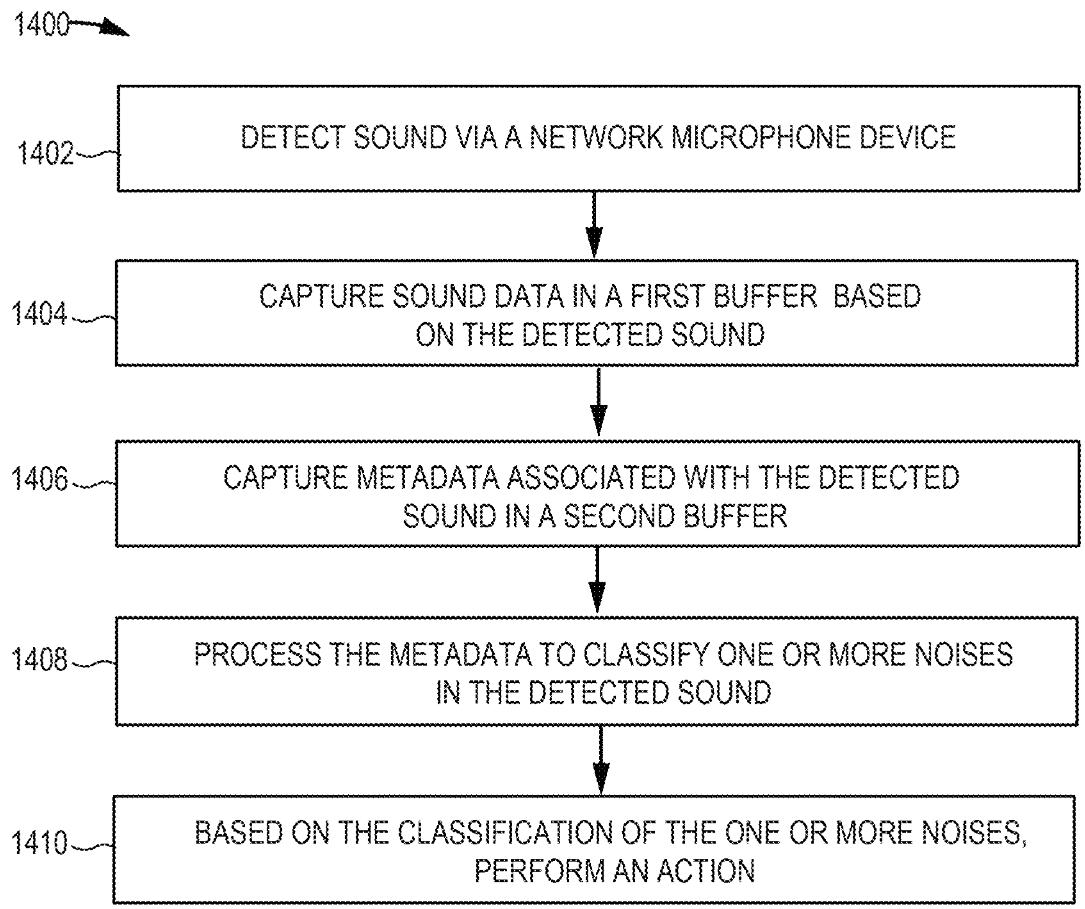
FIG. 14A is a functional flow diagram of example noise classification in accordance with aspects of the disclosure.

FIG. 14A is an example method 1400 for classifying noise to detect an event, for example via a noise classifier of the NMD (such as noise classifier 766 in FIG. 7). The method 1400 begins at block 1402 with the NMD detecting sound via individual microphones of the NMD. The sound may comprise only noise and not voice input, or the sound may comprise both noise and voice input. Next, method 1400 advances to block 1404, with the NMD capturing the detected sound in at least a first buffer. For example, the captured sound can be stored as sound data SD in the first buffer 768 (FIG. 7).

In block 1406, the NMD captures metadata associated with the detected sound in a buffer, such as the second buffer 769 (FIG. 7) or in other memory associated with the NMD (such as the first buffer 768). As noted above, to preserve user privacy, it can be useful to rely only on sound metadata that does not reveal the original audio content (e.g., the content of recorded speech input or other detected sound data). Examples of such sound metadata include: (1) frequency response data, (2) echo return loss enhancement measures, (3) voice direction measures; (4) arbitration statistics; and/or (5) speech spectral data. Other sound metadata may also be captured and stored in the second buffer 769.

Next, the method 1400 continues at block 1408 with processing the metadata to classify one or more noises in the detected sound. This analysis can be performed either locally by the NMD or remotely by one or more remote computing devices, or both. Processing the metadata may include any of the techniques described herein, for example those discussed with respect to FIGS. 8-13. For example, in some embodiments, analyzing the sound metadata may include projecting a frequency response spectrum onto an eigenspace corresponding to aggregated frequency response spectra from a population of NMDs.

In some implementations, processing the metadata includes comparing the fit of the observed noise signature to a reference signature for each of predetermined noise classifications to determine the likelihood of the sound sample belonging to each noise classification. Processing the metadata may include, for instance, applying a softmax layer or function to assign decimal probabilities to outputs of a noise classifier. For example, a softmax layer can be applied to classify the sound data in each frame of a given sound specimen to get a probability distribution of the noise classifications in the corresponding frame. The softmax layer normalizes the outputs derived from the frequency response spectra data (discussed above with reference to FIGS. 8-13) to generate a probability distribution of the noise classifications. Prior to applying softmax, some vector components may be negative, or greater than one, and might not sum to 1, but after applying softmax, each component will be in the interval (0,1) and the components will add up to 1, so that they can be interpreted as probabilities.

Figure 14B:
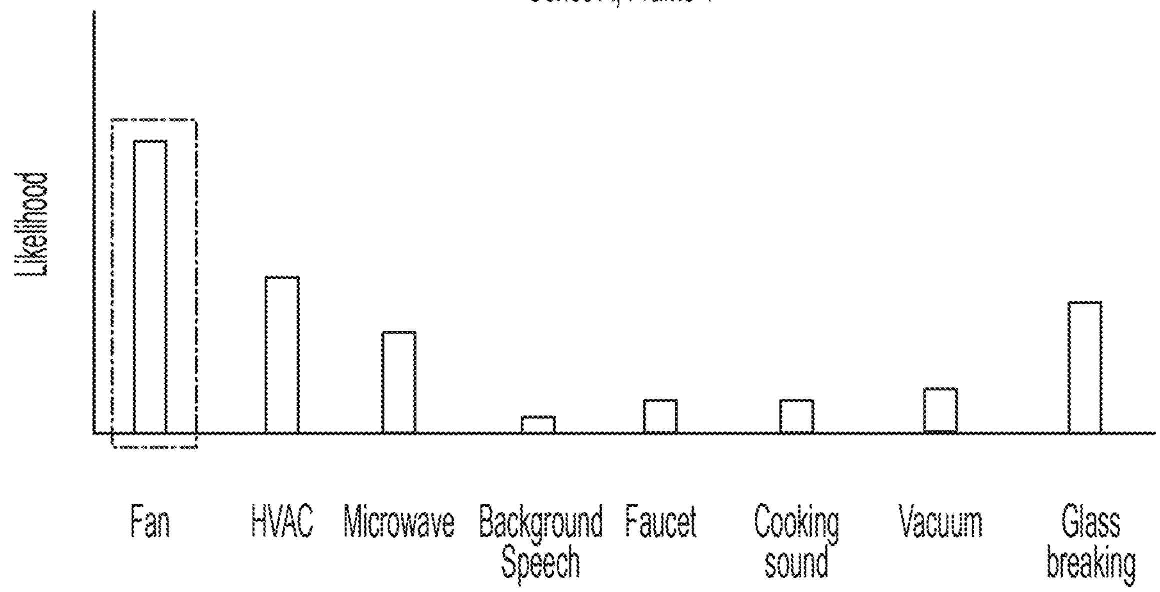
FIGS. 14B and 14C show example probability distributions for different sampling frames in accordance with aspects of the disclosure.

FIG. 14B depicts one example of a softmax layer applied by the system to one frame ("Frame 1") of a series of frames ("Series A") that together comprise a sound sample captured by the NMD. The plot of FIG. 14B shows the probability distribution for the following noise classifications: "fan," "HVAC," "microwave," "background speech," "faucet," "cooking sound," "vacuum," and "glass breaking." The softmax layer may utilize more or fewer noise classifications than those depicted in FIG. 14B. The softmax layer of Frame 1 indicates that "fan" has the greatest likelihood of correctly predicting the source of the noise reflected in the metadata of Frame 1. Based solely on the softmax layer of Frame 1, the system may determine that a fan is the most likely source of the noise in the sound sample and thus does not trigger action by the NMD.

Figure 14C:
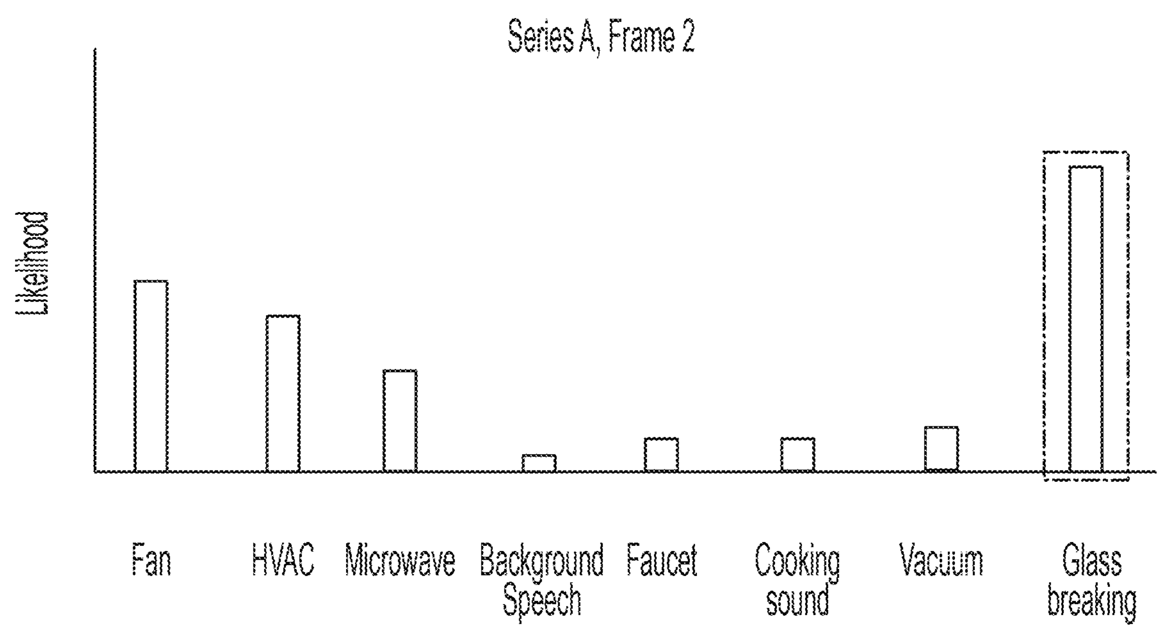

Looking at the softmax layer of only a single frame of a sound sample, however, does not provide absolute certainty that the noise classification is accurate. This is especially true the greater the number of noise classification signatures that the frequency response spectrum data is compared to. The more noise classifications utilized, the greater the computational complexity and the lower the resolution of the resulting classifications. As such, the noise classification having the greatest likelihood of being correct may often times vary between different frames of the same series. For example, FIG. 14C shows the softmax layer for the next frame in Series A, "Frame 2." In contrast to Frame 1, the softmax layer of Frame 2 indicates that "glass breaking" has the greatest likelihood of correctly predicting the source of the noise in the captured sound.

To increase the confidence of the noise classification, the system may consider the aggregate likelihoods of each noise classification over all or nearly all frames of a given series of frames to decrease the likelihood of a false-positive or a false-negative. FIG. 14D shows an example output of the system after analyzing 150 frames of a sound sample, two of which are Frames 1 and 2 shown in FIGS. 14B and 14C, respectively. As shown, the system includes a noise classifier (such as noise classifier 766 in FIG. 7) that has detected "ambient noise" in 11 of the 150 frames, "fan" in 12 of the 150 frames, and "glass breaking" in 127 of the 150 frames. Because "glass breaking" is the most likely noise source in more frames than any other noise source, the noise classifier determines that "glass breaking" is the best noise classification fit for the sound sample in Series A and triggers the NMD to perform an action ("Trigger=True"). Had the system relied only on Frame 2 (FIG. 14C) for the probability distribution, the system would have returned a false-negative ("fan") and not proceeded to notify the user.

Referring again to FIG. 14A, after processing the metadata to classify the sound data, the method 1400 continues in block 1410 with performing an action based on the classification of the one or more noises. As previously discussed, performing an action may include transmitting metadata associated with the sound sample to a remote computing device (e.g., a remote computing device associated with the cloud) and/or by performing an action locally via the NMD (e.g., flashing a light on the NMD, outputting an alarm tone or message via one or more of the NMDs of the MPS 100, etc.). For example, the NMD and/or the remote computing device may cause an alert to be displayed on the user's control device 104, may cause the user to receive a phone call, and/or may cause an appropriate third party, such as a police department, to receive a notification. In some embodiments, the NMD may transmit the raw sound data and/or the audio recording of the detected sound to a remote computing device for additional processing by the remote computing device and/or for a human operator to review and analyze. In some aspects of the technology, the user may be given the option to access the real-time audio and/or video feed of the environment in which the event or noise source was detected (including audio and/or video specific zone/room of the environment).

Figure 15A:
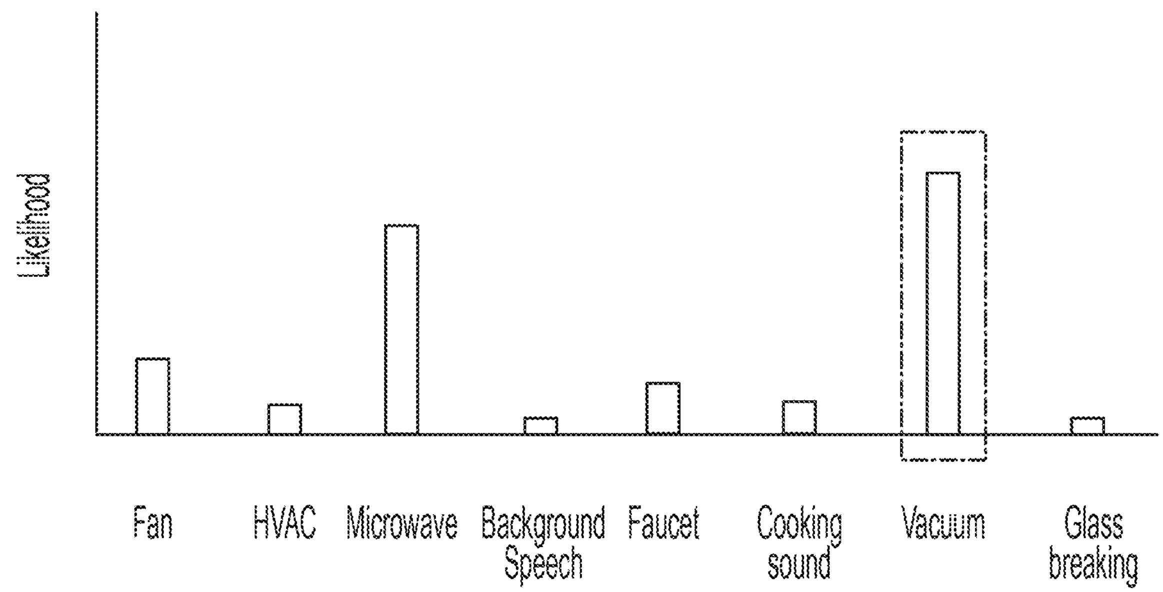
FIGS. 15A and 15B show example probability distributions for different sampling frames in accordance with aspects of the disclosure.
Figure 15B:
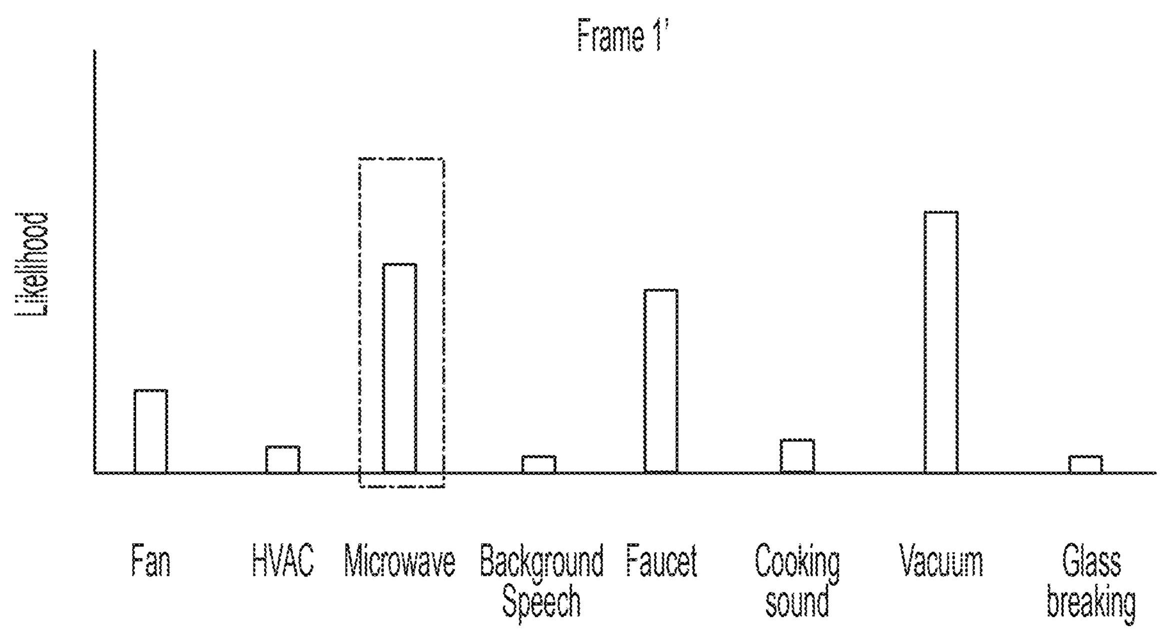

In some instances, it may be beneficial for the system to consider additional aspects of the NMD's environment before determining a classification and/or before performing an action. As depicted in FIGS. 15A and 15B, in some aspects of the technology the NMD may consider the relative probabilities of multiple classifiers in a given frame when selecting the dominant (or most likely) classification for that frame, for example by implementing a Bayesian classifier. FIG. 15A shows a single frame ("Frame 1") in which the softmax layer indicates the classification of "vacuum" has the greatest likelihood of being the correct classification. "Microwave" also has a relatively high likelihood of being the best fit, but the noise classifier chooses "vacuum" (denoted by the dashed box) because "vacuum" has the greater likelihood based on the probability distribution. FIG. 15B shows the softmax layer of a similar frame ("Frame 1") showing "vacuum" as having the greatest likelihood of being the correct classification, followed closely by "microwave." However, in contrast to Frame 1, the noise classifier chooses "microwave" as the dominant noise classification because of the relatively high likelihood of "faucet," and data indicating that microwaves and faucets are commonly found in the same room (such as a kitchen). Thus, based on the relatively high likelihoods of both “microwave” and “vacuum,” the noise classifier selects “microwave” as the dominant noise for the frame even though “vacuum” has a higher likelihood in a direct comparison.

The noise classifier may consider types of sound data other than that derived from frequency response spectrum information to improve confidence in the classification, either by bolstering selection based on the frame count or by eliminating certain classifications as options, or both. FIGS. 16-18B depict different scenarios in which these other types of sound data and/or metadata are considered.

FIG. 16 illustrates the output of the system in a scenario in which a noise classifier of the NMD is configured to analyze a sound pressure level (“SPL”) of the captured sound when determining a noise classification and/or whether to trigger a user alert. As shown in FIG. 16, the noise classifier has analyzed 150 frames of a sound sample and has detected “ambient noise” in 11 of the 150 frames, “HVAC” in 85 of the 150 frames, and “faucet” in 54 of the 150 frames. The noise classifier has also detected a high SPL. Even though the noise classification of “HVAC” has the most instances of being the most likely classification, the system eliminates “HVAC” as a possibility because the system knows that an HVAC system cannot produce an SPL as high as the one detected by the system. The high SPL is therefore likely attributable to another noise source, such as a jet flying overhead. Accordingly, the noise classifier selects the classification with the next highest likelihood (i.e., “faucet”), as shown in FIG. 16.

FIG. 17 illustrates the output of the system in a scenario in which the frame counts may be used to determine the likely zone/room of the source of the classified noise. In FIG. 17, because both “microwave” and “faucet” have relatively high frame counts and both are commonly found in a kitchen, the noise classifier determines that the likely zone/room is “kitchen.” In the present scenario the NMD does not perform an action based on the classification (“Trigger=False”). However, in those scenarios where the classification does trigger an alert, the user may be provided with the additional zone/room information as part of the notification. For example, if a window breaks in the kitchen, the user may receive a notification that the sound of “glass breaking” has been detected in the “Kitchen.”

FIGS. 18A and 18B illustrate output of an NMD configured to account for a location of the noise source relative to the NMD. Including such directional information in the noise classification analysis may improve the confidence of the classification and/or event detection by eliminating certain noise classifications that do not fit the directional data. For example, in the scenario of FIG. 18A, “glass breaking” is the dominant classification based on the frame count, but the noise classifier does not cause the NMD to perform an action because the directionality payload indicates the noise is not coming from the direction of the windows (i.e., “dominant polar direction for dominant frame: 134 deg.”). In FIG. 18B, however, an action is triggered because the directionality now indicates a noise event in the direction of the windows (i.e., “dominant polar direction for dominant frame: 65 deg.”).

Directionality data for the captured sound may be based on sound data captured from microphones on a single NMD and/or multiple NMDs in the environment. In some embodiments, the directionality of the detected additional sound is determined based on the relative positions of at least two microphones of the same NMD. In such embodiments, the microphones may be spaced apart from one another along the NMD. Additionally or alternatively, directionality of different appliances or structural components of the user’s environment (such as door, a window, etc.) may be determined during the initial calibration of the NMD when placed in the environment.

In some instances, the NMD may process auxiliary data from one or more sensors or other monitoring devices in the NMD’s environment to facilitate classification and/or event detection. For example, in some embodiments the NMD may include one or more sensors integrated with the housing of the NMD, and in some embodiments the NMD and/or MPS 100 may be in communication with one or more sensors positioned in the user’s environment but spaced apart from the NMD. In any event, the sensor may include a temperature sensor (such as smart thermostat 110 in FIG. 1A), a pressure sensor, a moisture sensor, a gas sensor, an accelerometer, an anemometer, an optical sensor (such as a motion sensor of a smart alarm), and others. Auxiliary sensor data may include one or more measured parameters, such as temperature, moisture, pressure, chemical content, movement, and others, including any derivative of the foregoing parameters (e.g., a change in the parameter over a certain period of time, a rate of change of the parameter over time, etc.).

The NMD may receive sensor data (such as one or more measurements or derivatives thereof) from the one or more sensors and process the sensor data to facilitate classification of the captured sound. In some embodiments, the NMD may make a classification based on the sound metadata in combination with a single parameter. For example, the NMD may classify a detected sound as “glass breaking,” but only alert the user if a change in barometric pressure is also detected. This way, the user is less likely to receive a false alarm. Additionally or alternatively, the NMD may make a classification based on sound metadata in combination with sensor data received from multiple different sensors. For instance, in response to detecting the sound of “high wind,” the NMD may only perform an action if the NMD also receives sensor data indicating a change in temperature and a change in pressure. Processing of the sensor data may occur before, simultaneously with, or after processing the sound metadata. Moreover, the NMD may receive sensor data intermittently, continuously, or only on request from the NMD in response to a particular noise classification.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

EXAMPLE 1

A method comprising detecting sound via one or more microphones of a network microphone device (NMD), wherein the detected sound includes a voice utterance; capturing first sound data in a first buffer of the NMD based on the detected sound; analyzing, via the NMD, the first sound data to detect a wake word; based on the analyzed first sound data, detecting the wake word; after detecting the wake word, transmitting at least the voice utterance to one or more remote computing devices associated with a voice assistant service; detecting additional sound via the one or more microphones; capturing second sound data in the first buffer based on the detected additional sound; analyzing, via the NMD, the second sound data to detect the wake word, wherein the wake word is not detected based on the analyzed second sound data; capturing metadata associated with the detected additional sound in a second buffer of the NMD; processing the metadata to classify one or more noises in the detected additional sound; and causing the NMD to perform an action based on the classification of the respective one or more noises.

EXAMPLE 2

The method of Example 1, wherein the second sound data transmitted to the one or more servers comprises recorded audio; and the metadata comprises spectral information that is temporally disassociated from the recorded audio.

EXAMPLE 3

The method of Example 1, wherein processing the metadata comprises transmitting the metadata to one or more other remote servers for analyzing the metadata.

EXAMPLE 4

The method of Example 1, wherein processing the metadata comprises locally analyzing the metadata and classifying the one or more noises via the NMD.

EXAMPLE 5

The method of Example 1, wherein classifying the one or more noises comprises comparing the metadata to reference metadata associated with known noise events.

EXAMPLE 6

The method of Example 1, wherein causing the NMD to perform an action comprises at least one of: playing back a sound via the NMD, sending a notification to a user's mobile computing device, or flashing a light.

EXAMPLE 7

The method of Example 1, wherein performing the NMD to perform an action includes causing the NMD to transmit an audio recording of the detected sound to a remote capturing device.

EXAMPLE 8

The method of Example 1, wherein processing the metadata includes determining a probability distribution of a plurality of predetermined noise classifications, wherein the probability distribution represents a likelihood of a particular predetermined noise classification correctly identifying a source of the one or more noises.

EXAMPLE 9

The method of Example 1, wherein processing the metadata includes applying a softmax function to the metadata to determine a likelihood of each of a plurality of noise classifications correctly identifying a source of the sound.

EXAMPLE 10

The method of Example 9, further comprising selecting a noise classification for the detected additional sound, wherein the selected noise classification does not have the greatest likelihood of correctly identifying a source of the one or more noises in the detected additional sound.

EXAMPLE 11

The method of Example 9, wherein application of the softmax function is performed on each frame of a sound sample, each frame comprising a portion of the sound sample.

EXAMPLE 12

The method of Example 11, further comprising determining a noise classification based on the probability distributions of a plurality of frames of the sound sample.

EXAMPLE 13

The method of Example 1, further comprising determining a likely zone/room associated with the detected additional sound based on the classification.

EXAMPLE 14

The method of Example 1, wherein causing the NMD to perform an action is based on at least one of a sound pressure level or a directionality of the detected additional sound.

EXAMPLE 15

The method of Example 14, wherein the NMD is a first NMD and the one or more microphones are first one or more microphones, and wherein the detected additional sound is captured on the first one or more microphones and second one or more microphones of a second NMD separated from the first NMD, and wherein the directionality of the detected additional sound is based on sound data associated with the detected additional sound from both the first NMD and the second NMD.

EXAMPLE 16

The method of Example 14, wherein the directionality of the detected additional sound is determined based on the relative positions of at least two of the one or more microphones.

EXAMPLE 17

The method of Example 1, wherein the classification is determined without transmitting, via the NMD, an audio recording of the detected sound to a remote computing device.

EXAMPLE 18

A network microphone device comprising one or more microphones configured to detect sound, one or more processors, and a tangible, non-tangible computer-readable medium having instructions stored thereon that are executable by the one or more processors to cause the network microphone device to perform the method of any of Examples 1 to 17.

EXAMPLE 19

A tangible, non-transitory, computer-readable medium having instructions stored thereon that are executable by one or more processors to cause a network microphone device to perform the method of any one of Examples 1 to 17.

The invention claimed is:

1. A playback device, comprising:
- one or more processors;
- one or more microphones;
- a first buffer;
- a second buffer;
- a tangible, non-transitory, computer-readable medium storing instructions executable by the one or more processors to cause the playback device to perform operations comprising:
  - detecting sound via one or more microphones of the playback device, wherein the detected sound incudes a voice utterance;
  - capturing sound data one or more buffers of the playback device based on the detected sound;
  - analyzing, via the playback device, the sound data to detect a wake word;
  - based on the analyzed first sound data, detecting the wake word;
  - after detecting the wake word, transmitting at least a first portion of the sound data associated with the voice utterance to one or more remote computing devices associated with a voice assistant service;
  - capturing metadata associated with a second portion of the sound data via the playback device, wherein the wake word is not detected based on the second portion of the sound data;
  - processing the metadata to classify one or more noises in the sound data; and
  - performing an action based on the classification of the respective one or more noises.

2. The playback device of claim 1, wherein the second portion of the sound data does not include the voice utterance.

3. The playback device of claim 1, wherein processing the metadata comprises locally analyzing the metadata and classifying the one or more noises via the NMD.

4. The playback device of claim 1, wherein classifying the one or more noises comprises comparing the metadata to reference metadata associated with known noise events.

5. The playback device of claim 1, wherein performing an action comprises at least one of: playing back a sound via the playback device, sending a notification to a user's mobile computing device, or flashing a light.

6. The playback device of claim 1, wherein causing the playback device to perform an action is based on at least one of a sound pressure level or a directionality of the sound.

7. The playback device of claim 1, wherein processing the metadata comprises transmitting the metadata to one or more other remote servers for analyzing the metadata.

8. The playback device of claim 1, wherein: the first portion of the sound data transmitted to the one or more servers comprises recorded audio; and the metadata comprises spectral information that is temporally disassociated from the recorded audio.

9. A method comprising:
- detecting sound via one or more microphones of a playback device, wherein the detected sound incudes a voice utterance;
- capturing sound data in one or more buffers of the playback device based on the detected sound;
- analyzing, via the playback device, the sound data to detect a wake word;
- based on the analyzed sound data, detecting the wake word;
- after detecting the wake word, transmitting a first portion of the sound data associated with the voice utterance to one or more remote computing devices associated with a voice assistant service;
- capturing metadata associated with a second portion of the sound data via the playback device, wherein the wake word is not detected based on the second portion of the sound data;
- processing the metadata to classify one or more noises in the sound data; and
- causing the playback device to perform an action based on the classification of the respective one or more noises.

10. The method of claim 9, wherein the second portion of the sound data does not include the voice utterance.

11. The method of claim 9, wherein:
- the first portion of the sound data transmitted to the one or more servers comprises recorded audio; and
- the metadata comprises spectral information that is temporally disassociated from the recorded audio.

12. The method of claim 9, wherein processing the metadata comprises transmitting the metadata to one or more other remote servers for analyzing the metadata.

13. The method of claim 9, wherein processing the metadata comprises locally analyzing the metadata and classifying the one or more noises via the playback device.

14. The method of claim 9, wherein classifying the one or more noises comprises comparing the metadata to reference metadata associated with known noise events.

15. The method of claim 9, wherein causing the playback device to perform an action comprises at least one of: playing back a sound via the playback device, sending a notification to a user's mobile computing device, or flashing a light.

16. The method of claim 9, wherein causing the playback device to perform an action is based on at least one of a sound pressure level or a directionality of the sound.

17. Tangible, non-transitory, computer-readable medium storing instructions executable by one or more processors to cause a playback device to perform operations comprising:

detecting sound via one or more microphones of the playback device, wherein the detected sound incudes a voice utterance;

capturing sound data one or more buffers of the playback device based on the detected sound;

analyzing the first sound data to detect a wake word;

based on the analyzed first sound data, detecting the wake word;

after detecting the wake word, transmitting at least a first portion of the sound data associated with the voice utterance to one or more remote computing devices associated with a voice assistant service;

capturing metadata associated with a second portion of the sound data via the playback device, wherein the wake word is not detected based on the second portion of the sound data;

processing the metadata to classify one or more noises in the sound data; and performing an action based on the classification of the respective one or more noises.

18. The tangible, non-transitory, computer-readable medium of claim 17, wherein the second portion of the sound data does not include the voice utterance.

19. The tangible, non-transitory, computer-readable medium of claim 17, wherein:

the first portion of the sound data transmitted to the one or more servers comprises recorded audio; and the metadata comprises spectral information that is temporally disassociated from the recorded audio.

20. The tangible, non-transitory, computer-readable medium of claim 17, wherein processing the metadata comprises transmitting the metadata to one or more other remote servers for analyzing the metadata.

21. The tangible, non-transitory, computer-readable medium of claim 17, wherein processing the metadata comprises locally analyzing the metadata and classifying the one or more noises via the playback device.

* * * * *

UNITED STATES PATENT AND TRADEMARK OFFICE

CERTIFICATE OF CORRECTION

PATENT NO. : 11,354,092 B2
APPLICATION NO. : 17/247736
DATED : June 7, 2022
INVENTOR(S) : D'Amato et al.

It is certified that error appears in the above-identified patent and that said Letters Patent is hereby corrected as shown below:

In the Claims

Column 39, Claim 1, Line 60, delete "incudes" and insert -- includes --, therefor.

Column 40, Claim 9, Line 41, delete "incudes" and insert -- includes --, therefor.

Column 41, Claim 17, Line 22, delete "incudes" and insert -- includes --, therefor.

Signed and Sealed this
Nineteenth Day of July, 2022

Katherine Kelly Vidal

Katherine Kelly Vidal
*Director of the United States Patent and Trademark Office*